United States Patent
Beddies et al.

(10) Patent No.: US 12,459,916 B2
(45) Date of Patent: Nov. 4, 2025

(54) SUBSTITUTED INDAZOLES USEFUL FOR TREATMENT AND PREVENTION OF ALLERGIC AND/OR INFLAMMATORY DISEASES IN ANIMALS

(71) Applicant: Bayer Pharma Aktiengesellschaft, Berlin (DE)

(72) Inventors: Gerald Beddies, Leverkusen (DE); Adrian Foster, Sandwich (GB); Ulrich Bothe, Berlin (DE); Nicole Schmidt, Wuppertal (DE); Ulf Boemer, Glienicke (DE); Reinhard Nubbemeyer, Berlin (DE); Maria De Lourdes Mottier, Langenfeld (DE)

(73) Assignee: Bayer Pharma Aktiengesellschaft, Berlin (DE)

(*) Notice: Subject to any disclaimer, the term of this patent is extended or adjusted under 35 U.S.C. 154(b) by 974 days.

(21) Appl. No.: 17/570,550

(22) Filed: Jan. 7, 2022

(65) Prior Publication Data
US 2022/0204474 A1 Jun. 30, 2022

Related U.S. Application Data

(63) Continuation of application No. 16/306,235, filed as application No. PCT/EP2017/062876 on May 29, 2017, now abandoned.

(30) Foreign Application Priority Data

Jun. 1, 2016 (EP) ..................................... 16172544

(51) Int. Cl.
C07D 401/12 (2006.01)
C07D 405/14 (2006.01)

(52) U.S. Cl.
CPC .......... *C07D 401/12* (2013.01); *C07D 405/14* (2013.01)

(58) Field of Classification Search
CPC ............................ C07D 401/12; C07D 405/14
See application file for complete search history.

(56) References Cited

U.S. PATENT DOCUMENTS

| | | | |
|---|---|---|---|
| 8,293,923 B2 | 10/2012 | Guckian et al. | |
| 9,540,392 B2 | 1/2017 | Kettschau | |
| 9,951,086 B2 | 4/2018 | Bothe | |
| 10,160,753 B2 | 12/2018 | Gummadi | |
| 10,308,634 B2* | 6/2019 | Bothe | C07D 401/12 |
| 10,501,437 B2 | 12/2019 | Thaler | |
| 10,793,545 B2 | 10/2020 | Bothe | |
| 2002/0103229 A1 | 8/2002 | Bhagwat et al. | |
| 2004/0053931 A1 | 3/2004 | Cox et al. | |
| 2007/0135461 A1 | 6/2007 | Rodgers et al. | |
| 2007/0185058 A1 | 8/2007 | Conte et al. | |
| 2007/0191344 A1 | 8/2007 | Choidas et al. | |
| 2008/0039459 A1 | 2/2008 | Folkes et al. | |
| 2009/0275623 A1 | 11/2009 | Ohrai et al. | |
| 2010/0094000 A1 | 4/2010 | Fukomoto et al. | |
| 2012/0053166 A1 | 3/2012 | Hamblin et al. | |
| 2012/0142696 A1 | 6/2012 | Selness et al. | |
| 2013/0261125 A1 | 10/2013 | Shipps et al. | |
| 2013/0274241 A1 | 10/2013 | Jorand-Lebrun et al. | |
| 2015/0133425 A1 | 5/2015 | Kettschau | |
| 2016/0311833 A1 | 10/2016 | Bothe | |
| 2016/0326151 A1 | 11/2016 | Gummadi | |
| 2018/0289685 A1 | 10/2018 | Bothe | |
| 2019/0125736 A1 | 5/2019 | Rausch et al. | |
| 2022/0249456 A1 | 8/2022 | Rausch et al. | |

FOREIGN PATENT DOCUMENTS

| | | |
|---|---|---|
| EP | 2489663 A1 | 8/2012 |
| WO | 2000001883 A1 | 1/2000 |
| WO | 2004013102 A1 | 2/2004 |
| WO | 2004113281 A1 | 12/2004 |
| WO | 2005082866 A2 | 9/2005 |
| WO | 2006061715 A2 | 6/2006 |
| WO | 2006116412 A2 | 11/2006 |
| WO | 2007/031265 A2 | 3/2007 |
| WO | 2007091107 A1 | 8/2007 |
| WO | 2008001883 A1 | 1/2008 |
| WO | 2009117421 A2 | 9/2009 |
| WO | 2011153588 A1 | 12/2011 |
| WO | 2012061926 A1 | 5/2012 |
| WO | 2012107475 A1 | 8/2012 |

(Continued)

OTHER PUBLICATIONS

Guglielmotti, A., et al. "Amelioration of rat adjuvant arthritis by therapeutic treatment with bindarit, an inhibitor of MCP-1 and TNF-α production." Inflammation Research 51 (2002): 252-258. (Year: 2002).*

Zheng, Lei, et al. "Discovery of novel N2-indazole derivatives as phosphodiesterase 4 inhibitors for the treatment of inflammatory bowel disease." European Journal of Medicinal Chemistry 277 (2024): 116710. (Year: 2024).*

Ahmad et al., "Increased Expression of the Interleukin-1 Receptor-Associated Kinase (IRAK)-1 is Associated-with Adipose Tissue Inflammatory State in Obesity", Diabetology and Metabolic Syndrome, vol. 7, No. 71, 2015, pp. 1-16.

Ashimori et al., "Novel 1,4-Dihydropyridine Calcium Antagonists. L Synthesis and Hypotensive Activity of 4-(Substituted Pyridyl)-1,4-dihydropyridine Derivatives", Chemical and Pharmaceutical Bulletin, vol. 38, No. 9, 1990, pp. 2446-2458.

(Continued)

*Primary Examiner* — James H Alstrum-Acevedo
*Assistant Examiner* — Justin Christopher Sanchez
(74) *Attorney, Agent, or Firm* — McBee Moore & Vanik IP, LLC

(57) ABSTRACT

The present application relates to the use of substituted indazoles for treatment and/or prophylaxis of allergic and/or inflammatory diseases in animals, especially for treatment and/or prophylaxis of atopic dermatitis, Flea Allergy Dermatitis, inflammatory bowel disease, osteoarthritis and inflammatory pain, non-infectious recurrent airway disease, insect hypersensitivity, asthma, respiratory disease, mastitis and endometritis in animals.

Figure 1:
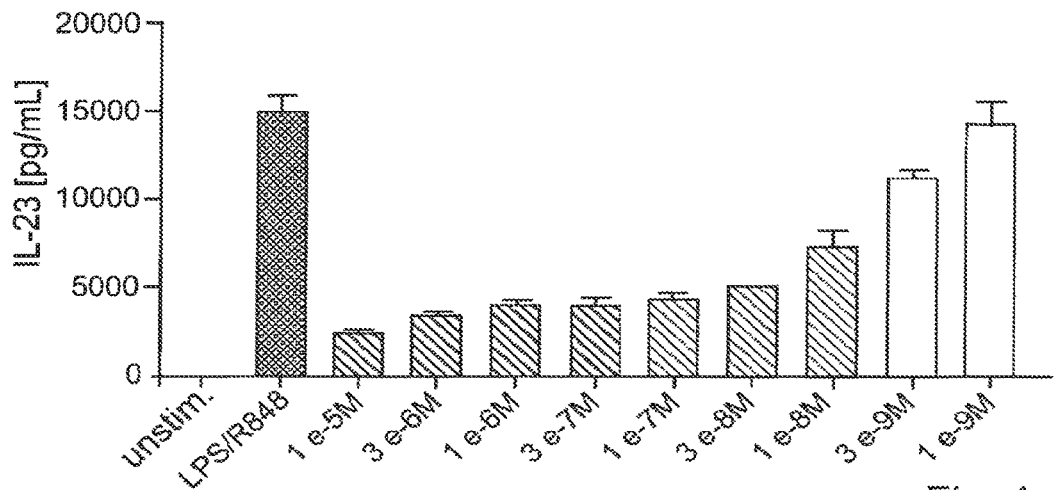

22 Claims, 5 Drawing Sheets
Specification includes a Sequence Listing.

(56) References Cited

FOREIGN PATENT DOCUMENTS

| WO | 2012112743 A1 | 8/2012 |
|---|---|---|
| WO | 2013106254 A1 | 7/2013 |
| WO | 2013/124158 A1 | 8/2013 |
| WO | 2013174744 A1 | 11/2013 |
| WO | 2015017336 A1 | 2/2015 |
| WO | 2015091426 A1 | 6/2015 |
| WO | 2015104662 A1 | 7/2015 |
| WO | 2015193846 A1 | 12/2015 |
| WO | 2016083433 A1 | 6/2016 |
| WO | 2016/174183 A1 | 11/2016 |
| WO | 2017186703 A1 | 11/2017 |
| WO | 2017207386 A1 | 12/2017 |
| WO | 2017207481 A1 | 12/2017 |

OTHER PUBLICATIONS

Beresford-Jones, W. P., "Prevalence of Fleas on Dogs and Cats in an Area of Central London", Journal of Small Animal Practice, vol. 22, 1981, pp. 27-29.

Cameron, et al., "Loss of Interleukin Receptor-Associated Kinase 4 Signaling Suppresses Amyloid Pathology and Alters Microglial Phenotype in a Mouse Model of Alzheimer's Disease", The Journal of Neuroscience, vol. 32, No. 43, Oct. 24, 2012, pp. 15112-15123.

Chiang, et al., "Immune Complex-Mediated Cell Activation from Systemic Lupus Erythematosus and Rheumatoid Arthritis Patients Elaborate Different Requirements for IRAK1/4 Kinase Activity across Human Cell Types", The journal of Immunology, vol. 186, Dec. 15, 2010, pp. 1279-1288.

Ciccia, et al., "Potential Involvement of IL-9 and Th9 Cells in the Pathogenesis of Rheumatoid Arthritis", Rheumatology, vol. 54, 2015, pp. 2264-2272.

Cottet, et al., "Further Metalations and Functionalizations of Chloro-, Bromo- and Iodo(trifluoromethyl)pyridines", Synthesis, No. 10, Jun. 23, 2004, pp. 1619-1624.

Cottet, et al., "Logistic Flexibility in the Preparation of Isomeric Halopyridinecarboxylic Acids", Tetrahedron,. vol. 60, Oct. 27, 2004, pp. 11869-11874.

Cottet, et al., "Recommendable Routes to Trifluoromethyl-Substituted Pyridine- and Quinolinecarboxylic Acids", European Journal of Organic Chemistry, 2003, pp. 1559-1568.

Cottet, et al., "Trifluoromethyl-Substituted Pyridines Through Displacement of Iodine by in situ Generated (Trifluoromethyl)copper", European Journal of Organic Chemistry, 2002, pp. 327-330.

Datta, et al., "Toll IL-1 Receptors Differ in Their Ability to Promote the Stabilization of Adenosine and Uridine-Rich Elements Containing mRNA", The Journal of Immunology, vol. 173, 2004, pp. 2755-2761.

Davidson, et al., "IRAK-4 Mutation (Q293X): Rapid Detection and Characterization of Defective Post-Transcriptional TLR/IL-1 R Responses in Human Mlyeloid and Non-Myeloid Cells", The Journal of Immunology. vol. 177, 2006, pp. 8202-8211.

Dinarello, Charles A., "Immunological and Inflammatory Functions of the Interleukin-1 Family", Annual Review of Immunology, vol. 27, 2009, pp. 519-550.

El-Faham, et al., "Peptide-Coupling Reagents", Amino Acids, Peptides and Proteins in Organic Chemistry, Chapter 12, 2011, 42 pages.

Flannery, et al., "The Interleukin-1 Receptor-Associated Kinases: Critical Regulators of Innate Immune Signalling", Biochemical Pharmacology, vol. 80, 2010. pp. 1981-1991.

Gadakh, et al., "Heteroaryl Hydroxycarbonylation: An Efficient, Robust, Practically Scalable Approach Using Formyl Acetate as the CO Source", Synthetic Communications, vol. 42, 2012, pp. 658-666.

Gerdes, et al., "3-0xatricydo[5.3.1.01,4]undec-4-en, Ein Stark Gespannter Vierring-Enolether", Chemische Berichte, vol. 113, 1980, pp. 1907-1920. (with English Abstract only}.

Gummadi, et al., "Indian Patent Application No. 146/CHE/2014, filed on Jan."10, 2014,. titled "Indazole Derivatives as IRAK4 Inhibitors", 40 pages.

Gummadl et al., "Indian Patent Application No. 3018ICHEi2014, filed on Jun. 20, 2014, titled Indazole Compounds as IRAK4 Inhibitors", 85 pages.

Halliwell, Richard, "Revised Nomenclature for Veterinary Allergy", Veterinary Immunology and Immunopathology, vol. 114, 2006, pp. 207-208.

Holtmann, et al., "The MAPK Kinase Kinase TAK1 Plays a Central Role in Coupling the Interleukin-1 Receptor to Both Transcriptional and RNA-targeted Mechanisms of Gene Regulation", The Journal of Biological Chemistry, vol. 276, No. 5, 2001, pp. 3508-3516.

Hynes, et al., "Advances in the Discovery of Small-Molecule IRAK4 Inhibitors", Annual Reports in Medicinal Chemistry, vol. 49, 2014, pp. 117-133.

International Search Report and Written Opinion received for PCT Patent Application No. PCT/EP2017/062876, mailed on Jul. 11, 2017, 12 pages.

Janeway, et al., "Innate Immune Recognition", Annual Review of Immunology, vol. 20, 2002, pp. 197-2016.

Kim, et al., "A Critical Role for IRAK4 Kinase Activity in Toll-like Receptor-Mediated Innate Immunity", The Journal of Experimental Medicine, Apr. 30, 2007, 12 pages.

Kim, et al., "The Critical Role of IL-1 Receptor-Associated Kinase 4-Mediated NF kB Activation in Modified Low-Density lipoprotein-Induced Inflammatory Gene Expression and Atherosclerosis", The Journal of Immunology, 2011, 11 pages.

Kollewe, et al., "Sequential Autophosphorylation Steps in the Interleukin-1 Receptor-associated Kinase-1 Regulate its Availability as an Adapter in Interleukin•1 Signaling", The Journal of Biological Chemistry, vol. 279, No. 7, Feb. 13, 2004, pp. 5227-5236.

Konishi et al., "Hemispheric Asymmetry in Human Lateral Prefrontal Cortex during Cognitive Set Shifting", Proceedings of the National Academy of Sciences, vol. 99, No. 11 , May 28, 2002 , pp. 7803-7808.

Ku, et al., "Selective Predisposition to Bacterial Infections in IRAK-4-Defidenl Children: IRAK-4-Dependent TLRs are Otherwise Redundant in Protective Immunity", The Journal of Experimental Medicine, vol. 204, No. 10, Oct. 1, 2007, pp. 2407-2422.

Liu, et al., "Oxidative Stress Induces Itch via Activation of Transient Receptor Potential Subtype Ankyrin 1 in Mice", Neuroscience Bulletin, vol. 28, No. 2, Apr. 1, 2012, pp. 145-154.

Maekawa, et al., "Survival and Cardiac Remodeling After Myocardial Infarction Are Critically Dependent on the Host Innate Immune Interleukin-1 Receptor-Associated Kinase-4 Signaling", Circulation, Oct. 6, 2009, pp. 1401-1414.

Malkov, et al., "A Long Range Chiral Relay via Tertiary Amide Group in Asymmetric Catalysis: New Amino Acid-Derived N,P-Ligands for Copper-Catalysed Conjugate Addition", Chemical Communications, 2003, pp. 1948-1949.

Marquez, et al., "Influence of the IL17A Locus in Giant Cell Arteritis Susceptibility", Annals of the Rheumatic Diseases, vol. 73, 2014 , pp. 1742-1745.

McGettrick, et al., "Toll-like Receptors: Key Activators of Leucocytes and Regulator of Haematopoiesis", British Journal of Haematology, vol. 139, 2007, pp. 185-193.

Morytko,. et al., "Synthesis and in Vitro Activity of N'-cyano-4-{2 -phenylacetyl)-N-o-tolylpiperazine• 1-carboximidamide P2X7, antagonists", Bioorganic and Medicinal Chemistry Letters, vol. 18, 2008, pp. 2093-2096.

Motshwene, et al., "An Oligomeric Signaling Platform Formed by the Toll-like Receptor Signal Transducers MyD88 and IRAK-4",. The Journal of Biological Chemistry, vol. 284, No. 37, Sep. 11, 2009, pp. 25404-25411.

Nutall, et al., "Canine Atopic Dermatitis—What Have we Learned?", Veterinary Record, Feb. 23, 2013, pp. 201-207.

O'Hara, et al., "Radical-Based Regioselective C—H Functionalization of Electron-Deficient Heteroarenes: Scope, Tunability, and Predictability", Journal of the American Chemical Society, vol. 135, No. 32, Jul. 17, 2013, pp. 12122-12134.

Olivry, et al., "Early Activation of Th2iTh22 Inflammatory and Pruritogenic Pathways in Acute Canine Atopic Dermatitis Skin Lesions", Journal of Investigative Dermatology, vol. 136, 2016, pp. 1961-1969.

(56) References Cited

OTHER PUBLICATIONS

Olivry, et al., "Treatment of Canine Atopic Dermatitis: 2015 Updated Guidelines from the International Committee on Allergic Diseases of Animals (ICADA)", BMC Veterinary Research, vol. 11, No. 210, 2015, 15 pages.

Pan, et al., "Differential Innate Immune Responses of Bovine Peripheral Blood Leukocytes to *Salmonella enterica* Serovars Dublin, Typhimurium, and Enteritidis", Veterinary Immunology and Immunopathology, vol. 165, 2015, pp. 14-21.

Price, et al., "Modular Syntheses of H1octapa and H2dedpa, and Yttrium Coordination Chemistry Relevant to 86Y/90Y Radiopharmaceuticals", Dalton Transactions, vol. 43, 2014, pp. 7176-7190.

Rekhter, et al., "Genetic Ablation of IRAK4 Kinase Activity Inhibits Vascular Lesion Formation", Biochemical and Biophysical Research Communication, vol. 367, 2008, pp. 642-64$.

Ryu, et al., "2-Allylialkenyl Substituted Pyridine C-Region Analogues of 2-(3-fluoro-4-methylsulfonylaminophenyl} propanamides as Highly Potent TRPV1 Antagonists", Bioorganic and Medicinal Chemistry Letters, vol. 24, 2014, pp. 4039-4043.

Schamber, et al., "Gene Expression in the Skin of Dogs Sensitized to the House Dust Mite Dermatophagoides Farinae", 83 (Genes-Genomes-Genetics), vol. 4, Oct. 2014, pp. 1787-1795.

Schmitz, et al., "Il-33, an Interleukin-1-like Cytokine that Signals via the Il-1 Receptor-Related Protein ST2 and Induces T Helper Type 2-Associated Cytokines", Immunity, vol. 23, Nov. 2005, pp. 479-490.

Scott, et al., "Muller and Kirk's Small Animal Dermatology", 6th Edition, 2001, 1552 pages.

Shimizu, et al., "Synthesis and Biological Activities of new 1a,25-dihydroxy-19-norvitamin D3 Analogs With Modifications in both the A-ring and the Side Chain", Bioorganic and Medicinal Chemistry, vol. 14, 2006, pp. 4277-4294.

Sohn, et al., "Interleukin-18 Is Associated with Increased Severity of Atopic Dermatitis in Children", Allergy and Asthma Proceedings, vol. 25, No. 3, May-Jun. 2004, pp. 181-184.

Staschke, et al., "IRAK4 Kinase Activity Is Required for Th17 Differentiation and Th17-Mediated Disease", The journal of Immunology, vol. 183, 2009, pp. 568-577.

Schmidt et al., "Crucial role for human Toll-like receptor 4 in the development of contact allergy to nickel," Nat. Immunol., 11(9):814-819 (2010).

Schmidt et al., "Detection of IL-1 alpha, IL-1 beta and IL-1 receptor antagonist in blister fluid of bullous pemphigold," J. Dermatol. Sci., 11(2):142-147 (1996).

Schrepf et al., "Toll-like receptor 4 and comorbid pain in Interstitial Cystitis/Bladder Pain Syndrome: a multidisciplinary approach to the study of chronic pelvic pain research network study," Brain. Behav. Immun., 49:66-74 (2015).

Scott et al. Eds., "Chapter 1. Structure and Function of the Skin", Muller and Kirk's Small Animal Dermatology, 6th Edition, 2001, pp. 1-70.

Scott et al. Eds., "Chapter 10: Endocrine and Metabolic Diseases", Muller and Kirk's Small Animal Dermatology, 6th Edition, 2001, pp. 780-885.

Scott et al. Eds., "Chapter 11: Acquired Alopecias", Muller and Kirk's Small Animal Dermatology, 6th Edition, 2001, pp. 887-912.

Scott et al. Eds., "Chapter 12: Congenital and Hereditary Defects", Muller and Kirk's Small Animal Dermatology, 6th Edition, 2001, pp. 913-1003.

Scott et al. Eds., "Chapter 13: Pigmentary s", Muller and Kirk's Small Animal Dermatology, 6th Edition, 2001, pp. 1005-1024.

Scott et al. Eds., "Chapter 14: Keratinization Defects", Muller and Kirk's Small Animal Dermatology, 6th Edition, 2001, pp. 1025-1054.

Scott et al. Eds., "Chapter 15: Psychogenic Skin Diseases", Muller and Kirk's Small Animal Dermatology, 6th Edition, 2001, pp. 1055-1072.

Scott et al. Eds., "Chapter 16: Environmental Skin Diseases", Muller and Kirk's Small Animal Dermatology, 6th Edition, 2001, pp. 1073-1111.

Scott et al. Eds., "Chapter 17: Nutritional Skin Diseases", Muller and Kirk's Small Animal Dermatology, 6th Edition, 2001, pp. 1112-1124.

Scott et al. Eds., "Chapter 18: Miscellaneous Skin Diseases", Muller and Kirk's Small Animal Dermatology, 6th Edition, 2001, pp. 1125-1183.

Scott et al. Eds., "Chapter 19: Diseases of Eyelids, Claws, Anal Sacs, and Ears", Muller and Kirk's Small Animal Dermatology, 6th Edition, 2001, pp. 1185-1235.

Scott et al. Eds., "Chapter 2: Diagnostic Methods", Muller and Kirk's Small Animal Dermatology, 6th Edition, 2001, pp. 71-206.

Scott et al. Eds., "Chapter 20; Neoplastic and Non Neoplastic Tumors", Muller and Kirk's Small Animal Dermatology, 6th Edition, 2001, pp. 1236-1414.

Scott et al. Eds., "Chapter 21: Dermatoses of Pet Rodents, Rabbits, and Ferrets", Muller and Kirk's Small Animal Dermatology, 6th Edition, 2001, pp. 1415-1458.

Scott et al. Eds., "Chapter 22: Chronology of Veterinary Dermatology (1900-2000)", Muller and Kirk's Small Animal Dermatology, 6th Edition, 2001, pp. 1459-1464.

Scott et al. Eds., "Chapter 3: Dermatologic Therapy", Muller and Kirk's Small Animal Dermatology, 6th Edition, 2001, pp. 207-273.

Scott et al. Eds., "Chapter 4; Bacterial Skin Diseases", Muller and Kirk's Small Animal Dermatology, 6th Edition, 2001, pp. 274-335.

Scott et al. Eds., "Chapter 5: Fungal Skin Diseases", Muller and Kirk's Small Animal Dermatology, 6th Edition, 2001, pp. 336-422.

Scott et al. Eds., "Chapter 6: Parasitic-Skin-Disease", Muller and Kirk's Small Animal Dermatology, 6th Edition, 2001, pp. 423-516.

Scott et al. Eds., "Chapter 7: Viral, Rickettsial, and Protozoal Skin Diseases", Muller and Kirk's Small Animal Dermatology, 6th Edition, 2001, pp. 517-542.

Scott et al. Eds., "Chapter 8: Skin Immune System and Allergic Skin Diseases", Muller and Kirk's Small Animal Dermatology, 6th Edition, 2001, pp. 543-666.

Scott et al. Eds., "Chapter 9: Immune Mediated Disorders", Muller and Kirk's Small Animal Dermatology, 6th Edition, 2001, pp. 667-779.

Scott et al. Eds., "Preface and Acknowledgments", Muller and Kirk's Small Animal Dermatology, 2001, 2 Pages.

Sedimbi et al., "IL-18 in inflammatory and autoimmune disease," Cell Mol. Life Sci., 70(24):4795-4808 (2013).

Seki et al., "Effect of Toll-like receptor 4 inhibitor on LPS-induced lung injury," Inflamm. Res., 59(10):837-845 (2010).

Selway et al., "Toll-like receptor 2 activation and comedogenesis: implications for the pathogenesis of acne," BMC Dermatol., 13:10 (2013).

Seneviratne et al., "Toll-like recept s and ac in atherosclerosis," Clin. Chim. Acta., 413(1-2):3-14 (2012).

Shi et al., "Monosodium urate crystals in inflammation and immunity," Immunol. Rev., 233(1):203-217 (2010).

Sikora et al., "Imbalance in cytokines from interleukin-1 family-role in pathogenesis of endometriosis," Am. J. Reprod. Immunol., 68(2):138-145 (2012).

Srivastava et al., "Augmentation of Therapeutic Responses in Melanoma by inhibition of IRAK-1,-4," Cancer Res., 72(23):6209-6216 (2012).

Stojsavljevic et al., "Adipokines and proinflammatory cytokines, the key mediators in the pathogenesis of nonalcoholic fatty liver disease," World J. Gastroenterol., 20(48):18070-18091 (2014).

Stokes et al., "Toll-like receptor signaling adapter proteins govern spread of neuropathic pain and recovery following nerve injury in male mice," J. Neuroinflammation., 10:148 (2013).

Sun et al., "Inhibition of Corneal Inflammation by the TLR4 Antagonist Eritoran Tetrasodium (E5564)," Invest. Ophthalmol. Vis. Sci., 50(3):1247-1254 (2009).

Szczepanski et al., "Triggering of Toll-like receptor 4 expressed on human head and neck squamous cell carcinoma promotes tumor development and protects the tumor from immune attack," Cancer Res., 69(7):3105-3113 (2009).

(56) References Cited

OTHER PUBLICATIONS

Talabot-Ayer et al., "Immune-mediated experimental arthritis in IL-33 deficient mice," Cytokine., 69(1):68-74 (2014).
Terhorst et al., "The role of toll-like receptors in host defenses and their relevance to dermatologic diseases,"Am. J. Clin. Dermatol., 11(1):1-10 (2010).
Thompson et al., "The Potential role of Toll-like receptors in programming of vascular dysfunction," Clin, Sci. (Lond), 125(1):19-25 (2013).
Timmers et al., "Toll-like receptor 4 mediates maladaptive left ventricular remodeling and impairs cardiac function after myocardial infarction," Circ. Res., 102(2):257-64 (2008).
Timper er al., "Safety, pharmacokinetics, and preliminary efficacy of a specific anti-IL-1alpha therapeutic antibody (MABp1) in patients with type 2 diabetes mellitus," J. Diabetes Complications, 29(7):956-960 (2015).
Treon et al., "MYD88 L265P somatic mutation in Waldenström's macroglobulinemia," N. Engl. J. Med., 367(9):826-833 (2012).
Vennegaard et al., "Epicutaneous exposure to nickel induces nickel allergy in mice via a MyD88-dependent and interleukin-1-dependent pathway," Contact Dermatitis, 71(4).224-32 (2014).
Vijmasi et al., "Topical administration of interleukin-1 receptor antagonist as a therapy for aqueous-deficient dry eye in autoimmune disease," Mol. Vis., 19:1957-1966 (2013).
Volin et al., "Interleukin-18: a mediator of inflammation and angiogenesis in rheumatoid arthritis," J. Interferon. Cytokine. Res., 31(10):745-751 (2011).
Walsh et al., "Pattern recognition receptors—molecular orchestrators of inflammation in inflammatory bowel disease," Cytokine Growth Factor Rev., 24(2):91-104 (2013).
Wang et al., "High expression of Toll-like receptor 4/myeloid differentiation factor 88 signals correlates with poor prognosis in colorectal cancer," Br. J. Cancer, 102(5):908-15 (2010).
Wang et al., "Toll-like receptor 4 antagonist attenuates intracerebral hemorrhage-induced brain injury," Stroke, 44(9):2545-2552 (2013).
Watt et al., "Plasma cytokine profiles in HIV-1 infected patients developing neuropathic symptoms shortly after commencing antiretroviral therapy: a case-control study," BMC Infect. Dis., 14:71 (2014).
Patty Khuly , My top 10 list of over the counter Human meds that can be used on Pets. (Year: 2011).
Amina Elsner , Animal testing (Year: 2004).
Eleanor Drummond et al .Alzheimer's Disease: Experimental Models and reality (Year: 2017).
Saridomichelakis et al., "An update on the treatment of canine atopic dermatitis", The Veterinary Journal, Sep. 16, 2015, vol. 207, pp. 29-37.
Zhang et al., "Preclinical experimental models of drug metabolism and disposition in drug discovery and development", Acta Pharmaceutica Sinica B, Nov. 21, 2012, vol. 2, No. 6, pp. 549-561.
Sterner-Kock, et al., "Morphological Characterization and Immunohistochemical Detection of the Proinflammatory Cytokines IL-1Beta, Il-17A, and TNF-Alfa in Lung Lesions Associated with Contagious Bovine Pleuropneumonia", Tropical Animal Health and Production, vol. 48, 2016, pp. 569-576.
Suginome, et al., "Product Class 7: Isocyanides and Related Compounds", Science of Synthesis 4.11, Section 19.7.1.1.1.1, 2018, 86 pages.
Sumimoto, et al., "Increased Plasma Tumour Necrosis Factor-a Concentration in Atopic Dermatitis", Archives of Disease in Childhood, vol. 67, 1992, pp. 277-279.
Sun, et al., "A Nationwide Survey of Mild Cognitive Impairment and Dementia, Including Very Mild Dementia, in Taiwan", PLOS One, vol. 9, Issue 6, Jun. 2014, 10 pages.
Suzuki, et al., "IL-1 Receptor-Associated Kinase 4 Is Essential for Il-18-Mediated NK and Th1 Cell Responses", The Journal of Immunology, vol. 170, 2003, pp. 4031-4035.
Suzuki, et al., "Severe Impairment of Interleukin-1 and Toll-like Receptor Signalling in Mice Lacking IRAK-4", Nature, vol. 416, Apr. 18, 2002, pp. 750-754.
Swamy, et al., "Mitsunobu and Related Reactions: Advances and Applications", Chemical Reviews, vol. 109, 2009, pp. 2551-2651.
Tamagawa-Mineoka, et al., "Increased Serum Levels of Interleukin 33 in Patients with Atopic Dermatitis", Journal of the American Academy of Dermatology, vol. 70, No. 5, Feb. 24, 2014, pp. 882-888.
Tewfik, et al., "Polymorphisms in Interleukin-1 Receptor-Associated Kinase 4 are Associated with Total Serum IgE", Allergy, vol. 64, 2009, pp. 746-753.
Tsuchiya et al., "Factors Affecting Molecular Weight of Enzymatically Synthesized Dextran1", Journal of the Chemical Society, vol. 77, May 5, 1955, pp. 2412-2419.
Valaperti, et al., "Innate Immune Interleukin-1 Receptor-Associated Kinase 4 Exacerbates Viral Myocarditis by Reducing CCR5+CD11 b+ Monocyte Migration and Impairing Interferon Production", Circulation, Oct. 1, 2013, pp. 1542-1554.
Valeur, et aL., "Amide Bond Formation: Beyond the Myth of Coupling Reagents", Chemical Society Reviews, vol. 38,. 2009, pp. 606-631.
Wan, et al., "The kinase TAK1 Integrates Antigen and Cytokine Receptor Signaling for T Cell Development, Survival and Function", Nature Immunology, \Jot 7, No. 8, Aug. 2006, pp. 851-85S.
Wang, et al., "Picroside II Protects Rat Kidney Against Ischemia/Reperfusion-Induced Oxidative Stress and Inflammation by the TLR4/NF-kB Pathway", Experimental and Therapeutic Medicine, vol. 9, 2015, pp. 1253-1258.
Wang, et al., "TAK1 is a Ubiquitin-Dependent Kinase of MKK and IKK", Nature, vol. 412, Jul. 19, 2001, pp. 346-351.
Wuts, et a!., "Greene's Protective Groups in Organic Synthesis", 4th Edition, John Wiley and Sons, 2007, 3 pages.
Zambrano-Zaragoza,. et al., "Th17 Cells in Autoimmune and Infectious Diseases", International Journal of Inflammation, vol. 2014, Aug. 3, 2014, 13 pages.
Zheng, et al., "Variant Innate Immune Responses of Mammary Epithelial Cells to Challenge by *Staphylococcus aureus, Escherichia coli* and the Regulating Effect of Taurine on these Bioprocesses", Free Radical Biology and Medicine, vol. 96, 2016, pp. 166-180.
Li et al., "IL-33 promotes ST2-dependent lung fibrosis by the induction of alternatively activated macrophages and innate lymphoid cells in mice," J. Allergy Clin. Immunol., 134(6):1422-1432 (2014).
Li et al., "Protective effect of neutralizing anti-IL-18a monoclonal antibody on a mouse model of acute graft-versus-host disease," Oncol. Rep., 34(4):2031-2039 (2015).
Li et al., "Toll-like receptors as therapeutic targets for autoimmune connective tissue diseases," Pharmacol. Ther., 138(3):441-451 (2013).
Liang et al., "Myeloid differentiation factor 88 promotes growth and metastasis of human hepatocellular carcinoma," Clin. Cancer Res., 19(11):2905-2916 (2013).
Lim et al., "MyD88 Deficiency Ameliorates ß-Amyloidosis in an Animal Model of Alzheimer's Disease," Am. J. Pathol., 179(3):1095-1103 (2011).
Liu et al., "New insights into the mechanisms of itch: are pain and itch controlled by distinct mechanisms?," Pflugers Arch-Eur. J. Physiol., 465:1671-1685 (2013).
Liu et al., "Severe influenza A(H1N1)pdm09 infection induces thymic atrophy through activating innate CD8(+)CD44(hi) T cells by upregulating IFN-?," Cell Death Dis., 5(10):e1440 (2014).
Liu et al., "Toll-like receptor 5 deficiency attenuates interstitial cardiac fibrosis and dysfunction induced by pressure overload by inhibiting inflammation and the endothelial-mesenchymal transition," Biochim. Biophys. Acta., 1852(11):2456-2466 (2015).
Liu-Bryan et al., "Innate immunity conferred by Toll-like receptors 2 and 4 and myeloid differentiation factor 88 expression is pivotal to monosodium urate monohydrate crystal-induced inflammation," Arthritis Rheum., 52(9):2936-2946 (2005).
Lloyd, "IL-33 family members and asthma—bridging innate and adaptive immune responses," Curr. Opin. Immunol., 22(6):800-806 (2010).
Lugrin et al., "Cutting edge: IL-1a is a crucial danger signal triggering acute myocardial inflammation during myocardial infarction," J. Immunol., 194(2):499-603 (2015).

(56) References Cited

OTHER PUBLICATIONS

Margaritopoulos et al., "Investigation of Toll-like receptors in the pathogenesis of fibrotic and granulomatous disorders: a bronchoalveolar lavage study," Fibrogenesis Tissue Repair, 3:20 (2010).
Martínez-González et al., "Human mesenchymal stem cells overexpressing the IL-33 antagonist soluble IL-1 receptor-like-1 attenuate endotoxin-induced acute lung injury," Am. J. Respir Cell Mol. Biol., 49(4):552-562 (2013).
Miller, "Toll-like receptors in skin," Adv. Dermatol., 24:71-87 (2008).
Min et al., "Baicalin Protects Keratinocytes from Toll-like Receptor-4 Mediated DNA Damage and Inflammation Following Ultraviolet Irradiation." Photochem. Photobiol., 91(6):1435-1443 (2015).
Minkis et al., "Interleukin 1 receptor antagonist deficiency presenting as infantile pustulosis mimicking infantile pustular psoriasis," Arch. Dermatol., 148(6):747-752 (2012).
Miura et al., "Role of gut microbiota and Toll-like receptors in nonalcoholic fatty liver disease," World J. Gastroenterol., 20(23):7381-7391 (2014).
Miura et al., "Toll-like receptor 9 promotes steatohepatitis by induction of interleukin-1beta in mice," Gastroenterology, 139:323-334 (2010).
Nadigel et al., "Cigarette smoke increases TLR4 and TLR9 expression and induces cytokine production from CD8(+) T cells in chronic obstructive pulmonary disease," Respir Res., 12(1):149 (2011).
Nakanishi et al., "IL-33, but not IL-25, is crucial for the development of house dust mite antigen-induced allergic rhinitis," PLoS One, 8(10):e78099 (2013).
Narayanan et al., "Interleukin-1 receptor-1-deficient mice show attenuated production of ocular surface inflammatory cytokines in experimental dry eye," Cornea, 27(7):811-817 (2008).
Ngo et al . . . "Oncogenically active MYD88 mutations in human lymphoma." Nature, 470(7332):115-119 (2011).
Nickerson et al., "TLR9 regulates TLR7- and MyD88-dependent autoantibody production and disease in a murine model of lupus," J. Immunol., 184(4):1840-1848 (2010).
Nicotra et al., "Toll-Like Receptors in Chronic Pain," Exp. Neurol., 234(2):316-329 (2012).
Niebuhr et al., "Dysregulation of toll-like receptor-2 (TLR-2)-Induced effects in monocytes from patients with atopic dermatitis: impact of the TLR-2 R753Q polymorphism," Allergy, 63(6):728-734 (2008).
Noelker et al., "Toll like receptor 4 mediates cell death in a mouse MPTP model of Parkinson disease," Sci. Rep., 3:1393 (2013).
Nordstrom et al., "Beneficial effect of interleukin 1 inhibition with anakinra in adult-onset Still's disease. An open, randomized, multicenter study," J. Rheumatol., 39(10):2008-2011 (2012).
Nozaki et al., "Polymorphisms of interleukin-1 beta and beta 3-adrenergic receptor in Japanese patients with nonalcoholic steatohepatitis," Alcohol. Clin. Exp. Res., 28(s2):106S-110S (2004).
Ochi et al., "MyD88 inhibition amplifies dendritic cell capacity to promote pancreatic carcinogenesis via Th2 cells," J. Exp. Med., 209(9):1671-87 (2012).
Office Action received for European Patent Application No. 17725976, mailed on Oct. 18, 2019, 4 pages.
Okiyama et al., "T lymphocytes and muscle condition act like seeds and soil in a murine polymyositis model," Arthritis. Rheum., 64(11):3741-3749 (2012).
Ouziel et al., "The ST2 pathway is involved in acute pancreatitis: a translational study in humans and mice," Am. J. Pathol . . . 180(6):2330-2339 (2012).
Oyama et al., "Reduced myocardial ischemia-reperfusion injury in toll-like receptor 4-deficient mice," Circulation, 109(6):784-789 (2004).
Park et al., "Toll-like receptor signaling regulates cisplatin-induced mechanical allodynia in mice," Cancer Chemother Pharmacol., 73(1):25-34 (2014).

Pauwels et al., "Role of IL-1a and the Nlrp3/caspase-1/IL-1ß axis in cigarette smoke-induced pulmonary inflammation and COPD," Eur. Respir. J., 38(5):1019-1028 (2011).
Pettersson et al., "Setting up TRAPS," Ann. Med., 44(2):109-118 (2012).
Piggott et al., "MyD88-dependent induction of allergic Th2 responses to intranasal antigen," J. Clin. Invest., 115(2):459-467 (2005).
Puente et al., "Whole-genome sequencing identifies recurrent mutations in chronic lymphocytic leukemia," Nature, 475(7354):101-105 (2011).
Qi et al., "Retinal ischemia/reperfusion injury is mediated by Toll-like receptor 4 activation of NLRP3 inflammasornes," Invest. Ophthalmol. Vis. Sci., 55(9):5466-5475 (2014).
Qiu et al., "Anti-interleukin-33 inhibits cigarette smoke-induced lung inflammation in mice," Immunology, 138(1):76-82 (2013).
Rakoff-Nahoum et al., "Role of toll-like receptors in spontaneous commensal-dependent colitis," Immunity, 25(2):319-329 (2006).
Ramirez et al., "Toll-like receptors and diabetes complications: recent advances," Curr. Diabetes Rev., 8(6):480-488 (2012).
Redfern et al., "Toll-like receptors in ocular surface disease," Exp. Eye Res., 90(6):679-687 (2010).
Rey et al., "Chronic neuropathic pain-like behavior and brain-borne IL-1ß," Ann. N.Y. Acad. Sci., 1262(1):101-107 (2012).
Roger et al., "Protection from lethal gram-negative bacterial sepsis by targeting Toll-like receptor 4," Proc. Natl. Acad. Sci. U.S.A., 106(7):2348-2352 (2009).
Roh et al., "Toll-like receptors in alcoholic liver disease, non-alcoholic steatohepatitis and carcinogenesis," J. Gastroenterol. Hepatol., 28 Suppl 1(01):38-42 (2013).
Ruperto et al., "Two randomized trials of canakinumab in systemic juvenile idiopathic arthritis," N. Engl. J. Med., 367(25):2396-406 (2012).
Saluja et al., "The role of the IL-33/IL-1RL 1 axis in mast cell and basophil activation in allergic disorders," Mol. Immunol., 63(1):80-85 (2015).
Santulli et al., "Serum and peritoneal interleukin-33 levels are elevated in deeply infiltrating endometriosis," Hum. Reprod., 27(7):2001-2009 (2012).
Scanzello et al., "Innate immune system activation in osteoarthritis: is osteoarthritis a chronic wound?," Curr. Opin. Rheumatol., 20(5):565-672 (2008).
Saridomichelakis, M.N. et al., An update on the treatment of canine atopic dermatitis. The Veterinary Journal, Sep. 16, 2015, vol. 207, pp. 29-37 Whole document especially for table 3.
Zhang, D. et al., Preclinical experimental models of drug metabolism and disposition in drug discovery and development. Acta Pharmaceutica Sinica B, Nov. 21, 2012, vol. 2, No. 6, pp. 549-561 Whole document especially for table 2.
Abbate et al., "Effects of interleukin-1 blockade with anakinra on adverse cardiac remodeling and heart failure after acute myocardial infarction [from the Virginia Commonwealth University—Anakinra Remodeling Trial (2) (VCU-ART2) pilot study]," Am. J. Cardiol., 111(10):1394-1400 (2013).
Abbate et al., "Interleukin-1 blockade with anakinra to prevent adverse cardiac remodeling after acute myocardial infarction (Virginia Commonwealth University Anakinra Remodeling Trial [VCU-ART] Pilot study)," Am. J. Cardiol., 105(10):1371-1377 (2010).
Akash et al., "Interleukin-1 receptor antagonist: a new therapy for type 2 diabetes mellitus," J. Pharm. Sci., 101(5):1647-1658 (2012).
Akcay et al., "IL-33 exacerbates acute kidney injury," J. Am. Soc. Nephrol., 22(11):2057-2067 (2011).
Akoum et al., "Imbalance in the expression of the activating type I and the inhibitory type II interleukin 1 receptors in endometriosis," Hum. Reprod., 22(5):1464-1473 (2007).
Allhorn et al., "TLR3 and TLR4 expression in healthy and diseased human endometrium," Reprod. Biol. Endocrinol., 6:40 (2008).
Aurigene Discovery Technologies Limited, "Indazole Compounds as IRAK4 Inhibitors," Application No. 3018/CHE/2014, (2014), 85 pages.
Aurigene Discovery Technologies Limited, "Indazole Derivatives as IRAK4 Inhibitors," Application No. 146/CHE/2014, (2014), 40 pages.

(56) References Cited

OTHER PUBLICATIONS

Ballak et al., "IL-1 family members in the pathogenesis and treatment of metabolic disease: Focus on adipose tissue inflammation and insulin resistance," Cytokine, 75(2):280-290 (2015).
Bauer et al., "High mobility group box 1 contributes to the pathogenesis of experimental pulmonary hypertension via activation of Toll-like receptor 4," Mol. Med., 18(1):1509-1518. (2012).
Becker et al., "Opioid doses and increased risk for overdose," Ann. Intern. Med., 153(1):59-67 (2010).
Benias et al., "Hepatic expression of toll-like receptors 3, 4, and 9 in primary biliary cirrhosis and chronic hepatitis C," Clin. Res. Hepatol. Gastroenterol., 36(5):448-454 (2012).
Béraud et al., "Misfolded a-synuclein and Toll-like receptors: therapeutic targets for Parkinson's disease," Parkinsonism Relat. Disord., 18 Suppl 1(01):S17-20 (2012).
Bijani et al., "Toll-like receptor signaling pathways in cardiovascular diseases: challenges and opportunities," Int. Rev. Immunol., 31(5):379-395 (2012).
Bomfim et al., "Toll-like receptor 4 contributes to blood pressure regulation and vascular contraction in spontaneously hypertensive rats," Clin. Sci. (Lond), 122(11):535-543 (2012).
Bomfim et al., "Toll-like receptor 4 reduces vascular inflammation in spontaneously hypertensive rats," Life Sci., 122:1-7 (2015).
Brenner et al., "Targeted treatment of pyoderma gangrenosum in PAPA (pyogenic arthritis, pyoderma gangrenosum and acne) syndrome with the recombinant human interleukin-1 receptor antagonist anakinra," Br. J. Dermatol., 161(5):1199-1201 (2009).
Brough et al., "Regulation of interleukin-1 in acute brain injury." Trends Pharmacol. Sci., 32(10):617-622 (2011).
Buckley et al., "IRAK-4 inhibitors. Part II: a structure-based assessment of imidazo[1,2-a]pyridine binding," Bioorg. Med. Chem. Lett., 18(11):3291-3295 (2008).
Bunting et al., "Interleukin-33 drives activation of alveolar macrophages and airway inflammation in a mouse model of acute exacerbation of chronic asthma," Biomed Res. Int., 2013:250938 (2013).
Byers et al., "Long-term IL-33-producing epithelial progenitor cells in chronic obstructive lung disease," J. Clin. Invest., 123(9):3967-82 (2013).
Candia et al., "Toll-like receptor-2 expression is upregulated in antigen-presenting cells from patients with psoriatic arthritis: a pathogenic role for innate immunity?," J. Rheumatol., 34(2):374-379 (2007).
Cario et al., "Toll-like receptors in inflammatory bowel diseases: a decade later," Inflamm. Bowel. Dis., 16(9):1583-1597 (2010).
Carrasco et al., "Toll-like receptor (TLR) 2 is upregulated on peripheral blood monocytes of patients with psoriatic arthritis: a role for a gram-positive inflammatory trigger?," Clin. Exp. Rheumatol., 29(6):958-962 (2011).
Carty et al., "Evaluating the role of Toll-like receptors in diseases of the central nervous system," Bioche Pharmacol., 81(7):825-837 (2011).
Caso et al., "Biological treatments in Behçet's disease: beyond anti-TNF therapy," Mediators Inflamm., 2014:107421 (2014).
Ceccarelli et al., "Toll-like receptor-mediated signaling cascade as a regulator of the inflammation network during alcoholic liver disease," World J. Gastroenterol., 20(44):16443-16451 (2014).
Cevikbas et al., "IL-33: a novel danger signal system in atopic dermatitis," J. Invest. Dermatol., 132(5):1326-1329 (2012).
Chang et al., "Recent advances in Toll-like receptors and anterior uveitis," Clin. Exp. Ophthalmol., 40(8):821-828 (2012).
Chen et al., "Involvement of TLR7 MyD88-dependent signaling pathway in the pathogenesis of adult-onset Still's disease," Arthritis Res. Ther., 15(2):R39 (2013).
Chen et al., "Significance of TLR4/MyD88 expression in breast cancer," Int. J. Clin. Exp. Pathol., 8(6):7034-7039 (2015).
Choi et al., "MYD88 expression and L265P mutation in diffuse large B-cell lymphoma," Hum. Pathol., 44(7):1376-1381 (2013).
Chopra et al., "Treatment of Complex Regional Pain Syndrome (CRPS) using low dose naltrexone (LDN)," J. Neuroimmune Pharmacol., 8(3):470-476 (2013).

Christensen et al., "Toll-like receptor 7 and TUR9 dictate autoantibody specificity and have opposing inflammatory and regulatory roles in a murine model of lupus," Immunity, 25(3):417-428 (2006).
Christia et al., "Targeting inflammatory pathways in myocardial infarction," Eur. J. Clin. Invest., 43(9):986-995 (2013).
Cordiglieri et al., "Innate immunity in myasthenia gravis thymus: pathogenic effects of Toll-like receptor 4 signaling on autoimmunity," J. Autoimmun., 52:74-89 (2014).
Couillin et al., "IL-1R1/MyD88 signaling is critical for elastase-induced lung inflammation and emphysema," J. Immunol., 183(12):8195-8202 (2009).
Cruz et al., "Toll-like receptors: dysregulation in vivo in patients with acute respiratory distress syndrome," Rev. Alerg. Mex., 51(6):210-217 (2004).
Csak et al., "Deficiency in myeloid differentiation factor-2 and toll-like receptor 4 expression attenuates nonalcoholic steatohepatitis and fibrosis in mice," Am. J. Physiol. Gastrointest Liver Physiol, 300(3):G433-G441 (2011).
D'Elia et al., "Successful treatment of subacute constrictive pericarditis with interleukin-18 receptor antagonist (anakinra)," Clin. Exp. Rheumatol., 33(2):294-295 (2015).
Dasu et al., "Toll-like receptors and diabetes: a therapeutic perspective." Clin. Sci. (Lond), 122(5):203-214 (2012).
David et al., "A toll-like receptor 9 antagonist reduces pain hypersensitivity and the inflammatory response in spinal cord injury," Neurobiol. Dis., 54:194-205 (2013).
Davies, "Indazole derivatives: the synthesis of various amino- and hydroxy-indazoles and derived sulphonic acids." Journal of the Chemical Society, 2412-2423 (1955).
Denes et al., "Central and haematopoietic interleukin-1 both contribute to ischaemic brain injury in mice," Dis. Model Mech., 6(4):1043-1048 (2013).
Deng et al., "Toll-like receptor 4 mediates acute lung injury induced by high mobility group box-1," PLoS One, 8(5):e64375 (2013).
Deng et al., "Toll-like receptors 4 and 5 induce distinct types of vasculitis," Circ. Res., 104(4):488-95 (2009).
Devaraj et al., "Knockout of toll-like receptor-2 attenuates both the proinflammatory state of diabetes and incipient diabetic nephropathy," Arterioscler Thromb Vasc. Biol., 31(8):1796-1804 (2011).
Dinarello, "A clinical perspective of IL-1ß as the gatekeeper of inflammation," Eur. J. Immunol., 41(5):1203-1217 (2011).
Dispenza et al., "Systemic isotretinoin therapy normalizes exaggerated TLR-2-mediated innate immune responses in acne patients," J. Invest. Dermatol., 132(9):2198-2205 (2012).
Dubaniewicz, "Microbial and human heat shock proteins as 'danger signals' in sarcoidosis," Hum. Immunol., 74(12):1550-1558 (2013).
Wolf et al., "Interleukin-1 signaling is required for induction and maintenance of postoperative incisional pain: genetic and pharmacological studies in mice," Brain Behav. Immun., 22(7):1072-1077 (2008).
Wollina et al., "Acne inversa (Hidradenitis suppurativa): A review with a focus on pathogenesis and treatment," Indian Dermatol Online J., 4(1):2-11 (2013).
Won et al., "The Glial-Neuronal GRK2 Pathway Participates in the Development of Trigeminal Neuropathic Pain in Rats," J. Pain., 15(3):250-261 (2014).
Wong et al., "Experimental Autoimmune Prostatitis Induces Microglial Activation in the Spinal Cord," Prostate, 75(1):50-59 (2015).
Xiang et al., "Association of Toll-like receptor signaling and reactive oxygen species: a potential therapeutic target for posttrauma acute lung injury," Mediators Inflamm., 2010:916425 (2010).
Xiang et al., "Role of Toll-like receptor/MYD88 signaling in neurodegenerative diseases," Rev. Neurosci., 26(4):407-14 (2015).
Yamada et al., "Targeting IL-1 in Sjögren's syndrome," Expert Opin Ther Targets, 7(4):393-401 (2013).
Yang et al., "IL-1 receptor antagonist-mediated therapeutic effect in murine myasthenia gravis is associated with suppressed serum proinflammatory cytokines, C3, and anti-acetylcholine receptor IgG1," J. Immunol., 175(3):2018-25 (2005).
Yang et al., "Toll-like receptors in liver fibrosis: cellular crosstalk and mechanisms," Front. Physiol., 3:138 (2012).

(56) References Cited

OTHER PUBLICATIONS

Yap et al., "The role of cytokines in the pathogenesis of systemic lupus erythematosus—from bench to bedside," Nephrology (Cartton), 18(4):243-55 (2013).
Ye et al., "Toll-like receptor-4 mediates obesity-induced nonalcoholic steatohepatitis through activation of X-box binding protein-1 in mice," Gut., 61(7):1058-67 (2012).
Yin et al., "Adenovirus-mediated delivery of soluble ST2 attenuates ovalbumin-induced allergic asthma in mice," Clin. Exp. Immunol., 170(1):1-9 (2012).
Zhang et al., "Increased expression of Toll-like receptors 4 and 9 in human lung cancer," Mol. Biol. Rep., 36(6):1475-81 (2009).
Zhao et al., "Altered biliary epithelial cell and monocyte responses to lipopolysaccharide as a TLR ligand in patients with primary biliary cirrhosis," Scand. J. Gastroenterol., 46(4):485-94 (2011).
Zhao et al., "Spinal interleukin-33 and its receptor ST2 contribute to bone cancer-induced pain in mice." Neuroscience, 253:172-182 (2013).
Zhao et al., "Toll-like receptors and prostate cancer," Front. Immunol., 5:352 (2014).
Zhu et al., "A novel antagonist of Toll-like receptors 7, 8 and 9 suppresses lupus disease-associated parameters in NZBW/F1 mice," Autoimmunity, 46(7):419-28 (2013).
Zong et al., "Anakinra treatment in patients with refractory inflammatory myopathies and possible predictive response biomarkers: a mechanistic study with 12 months follow-up," Ann. Rheum. Dis. ,73(5):913-20 (2014).
Falck-Hansen et al., "Toll-like Receptors in Atherosclerosis," Int. J. Mol. Sci., 14:14008-14023(2013).
Fang et al., "Toll-like receptor and its roles in myocardial ischemic/reperfusion injury," Med. Sci. Monit., 17(4):RA100-109 (2011).
Foster et al., "IL-36 Promotes Myeloid Cell Infiltration, Activation, and inflammatory Activity in Skin," J. Immunol., 192:6053-6061 (2014).
Frangogiannis, "Inflammation in cardiac injury, repair and regeneration," Wolters Kluwer Health Inc., 30(3):240-245, (2015).
Freeman et al., "Lung CD8+ T cells in COPD have increased expression of bacterial TLRs." Respiratory Research, 14:1-13 (2014).
Fresno et al., "Toll-like receptors, inflammation, metabolism and obesity," Archives of Physiology and Biochemistry, 117(3):151-164 (2011).
Gambuzza et al., "Targeting Toll-like receptors: Emerging therapeutics for multiple sclerosis management," J. Neuroimmunology, 239:1-12 (2011).
Gilliet et al., "Psoriasis Triggered by Toll-like Receptor 7 Agonist Imiquimod in the Presence of Dermal Plasmacytoid Dendritic Cell Precursors," Arch Dermatol, 140:1490-1495 (2004).
Goh et al., "Intrinsic danger: activation of Toll-like receptors in rheumatoid arthritis," Rheumatology 51:7-23 (2012).
Gresnight et al., "Biology of IL36 cytokines and their role in disease," Seminars in Immunology, 25:458-465 (2013).
Guerrero et al., "Toll-like receptor 2/MyD88 signaling mediates zymosan-induced joint hypernociception in mice: Participation of TNF-(Alpha), IL-1(Beta) and CXCL1/KC," European Journal of Pharmacology, 674:51-57 (2012).
Gul et al., "Interleukin-1(Beta)-regulating antibody XOMA 052 (gevokizumab) in the treatment of acute exacerbations of resistant uveitis of Behcet's disease: an open-label pilot study," Ann. Rheum. Dis., 71:563-566 (2012).
Guo et al., "Toll-like receptor 2 siRNA suppresses corneal inflammation and attenuates Aspergillus fumigatus keratitis in rats," Immunology and Cell Biology, 90:352-357 (2012).
Haenuki et al., "A critical role of IL-33 in experimental allergic rhinitis," J. Allergy Clin. Immunol., 130:184-194 (2012).
Han et al., "Interleukin-33 Mediates Formalin-Induced Inflammatory Pain In Mice," Neuroscience, 241:59-66 (2013).
Hao et al., "Inflammasomes in inflammatory bowel disease pathogenesis," Curr, Opin. Gastroenterol, 29(4):363-369 (2013).
Heimesaat et al., "MyD88/TLR9 mediated immunopathology and gut microbiota dynamics in a novel murine model of intestinal graft-versus-host disease," Gut, 59:1079-1087 (2010).
Heimesaat et al., "Shift Towards Pro-inflammatory Intestinal Bacteria Aggravates Acute Murine Colitis via Toll-like Receptors 2 and 4," PLoS One, 2(7):e662 (2007).
Henderson et al., "Monogenic IL-1 mediated autoinflammatory and immunodeficiency syndromes: Finding the right balance in response to danger signals," Clinical Immunology, 135:210-222 (2010).
Hernanz et al., "Toll-like receptor 4 contributes to vascular remodelling and endothelial dysfunction in angiotensin Il-induced hypertension," British Journal of Pharmacology, 172:3159-3176 (2015).
Hilberath et al., "Resolution of Toll-like receptor 4-mediated acute lung injury is linked to eicosanoids and suppressor of cytokine signaling 3," The FASEB, 25(6):1827-1835 (2018).
Hoffmann, "The Potential Role of Cytokines and T Cells in Alopecia Areata," Journal of Investigative Dermatology Symposium Proceedings, 4:235-238 (1999).
Holle et al., "Toll-like receptor TLR2 and TLR9 ligation triggers neutrophil activation in granulomatosis with polyangiitis," Rheumatology, 52:1183?-1189 (2013).
Hughes, "Amino Acids, Peptides and Proteins in Organic Chemistry," Building Blocks, Catalysis and Coupling Chemistry, 3:407-444 (2011).
Imaoka et al., "Interleukin-18 production and pulmonary function in COPD," Eur. Respir. J., 31(2):287-297 (2008).
International Preliminary Report on Patentability received for PCT Patent Application No. PCT/EP2017/062876, mailed on Dec. 13, 2018, 7 pages.
Jain et al., "Effectiveness and Safety of Anakinra for Management of Refractory Pericarditis," Am. J. Cardiol., 116:1277-1279 (2015).
Jeyaseelan et al., "Distinct Roles of Pattern Recognition Receptors CD14 and Toll-Like Receptor 4 in Acute Lung Injury," Infection and Immunity, 73(3):1754-1763 (2005).
Jialal et al., "Global toll-like receptor 4 knockout results in decreased renal inflammation, fibrosis and podocytopathy," Journal of Diabetes and Its Complications, 28:755-761 (2014).
Kaarniranta et al., "Age-related macular degeneration: activation of innate im nity system via pattern recognition receptors," J. Mol. Med., 87:117-123 (2009).
Kamari et al., "Lack of interleukin-1(Alpha) or interleukin-1b inhibits transformation of steatosis to steatohepatitis and liver fibrosis in hypercholesterolemic mice," Journal of Hepatology, 55:1086-1094 (2011).
Kang et al., "IL-18 Is Induced and IL-18 Receptor a Plays a Critical Role in the Pathogenesis of Cigarette Smoke-Induced Pulmonary Emphysema and Inflammation," J. Immunol., 178:1948-1959 (2007).
Kaplan et al., "Effectiveness of interleukin-1 receptor antagonist (Anakinra) on cerulein-induced experimental acute pancreatitis in rats," Scandinavian Journal of Gastroenterology, 49(9):1124-1130 (2014).
Kawayama et al., "Interleukin-18 in Pulmonary Inflammatory Diseases," J. Interferon & Cytokine ReseaRch, 32(10):443-451 (2012).
Kezic et al., "Endotoxin-induced uveitis is primarily dependent on radiation-resistant cells and on MyD88 but not TRIF," J. Leukoc. Biol, 90:305-311 (2011).
Kfoury et al., "MyD88 in DNA Repair and Cancer Cell Resistance to Genotoxic Drugs," J. Natl. Cancer Inst., 105:937-946 (2013).
Khan et al., "Toll-like receptor system and endometriosis," J. Obstet. Gynaecol. Res., 39(8):1281-1292 (2013).
Kim et al., "Expression and significance of the TLR4/MyD88 signaling pathway in ovarian epithelial cancers," World Journal of Surgical Oncology, 10(193):1-8 (2012).
Kim et al., "Expression of TLR2, TLR4, and TLR9 in dermatomyositis and polymyositis," Clin. Rheumatol., 29:273-279 (2010).
Kim et al., "Toll-Like Receptors in Peripheral Nerve Injury and Neuropathic Pain," Current Topics in Microbiology and Immunology, 336:169-186 (2009).
Kitazawa et al., "Blocking IL-1 Signaling Rescues Cognition, Attenuates Tau Pathology, and Restores Neuronal (Beta)-Catenin Pathway Function in an Alzheimer's Disease Model," The Journal of Immunology, 187:6539-6649 (2011).

(56) References Cited

OTHER PUBLICATIONS

Kobori et al., "Interleukin-33 expression is specifically enhanced in inflamed mucosa of ulcerative colitis," J. Gastroenterol., 45:999-1007 (2010).

Koning, "Schnitzler's syndrome: lessons from 281 cases," Clin. Transl. Allergy, 4:41 (2014).

Kovach et al., "Toll like receptors in diseases of the lung," International Immunopharmacology, 11:1399-1406 (2011).

Kreisel et al., "Innate immunity and organ transplantation: focus on lung transplantation," European Society for Organ Transplantation, 26:2-10 (2013).

Kwok et al., "Increased Responsiveness of Peripheral Blood Mononuclear Cells to In Vitro TLR 2, 4 and 7 Ligand Stimulation in Chronic Pain Patients," PLOS One, 7(8):e44232 (2012).

Lawson et al., "Abnormal interleukin 1 receptor types I and II gene expression in eutopic and ectopic endometrial tissues of women with endometriosis," J. Reprod. Immunol., 77(1):75-84 (2008).

Lee et al., "Absence of toll-likereceptor 4 (TLR4) extends survival in the hSOD1 G93A mouse model of amyotrophic lateral sclerosis," J. Neuroinflammation, 12:90 (2015).

Lee et al., "Expression of toll-like receptor 4 contributes to corneal inflammation in experimental dry eye disease," Invest. Ophthalmol. Vis. Sci., 53(9):5632-5640 (2012).

Leventhal et al., "Toll-like receptors in transplantation: sensing and reacting to injury," Kidney Int., 81(9):826-832 (2012).

\* cited by examiner

SUBSTITUTED INDAZOLES USEFUL FOR TREATMENT AND PREVENTION OF ALLERGIC AND/OR INFLAMMATORY DISEASES IN ANIMALS

CROSS-REFERENCE TO RELATED APPLICATIONS

This application is a continuation of U.S. application Ser. No. 16/306,235, filed 30 Nov. 2018, which is the U.S. national phase of International Application No. PCT/EP2017/062876, filed 29 May 2017, which claims priority to European Patent Application No. 16172544.5, filed 1 Jun. 2016, the entire contents of each of which are hereby incorporated by reference.

REFERENCE TO SEQUENCE LISTING SUBMITTED AS A COMPLIANT ASCII TEXT FILE (.txt)

Pursuant to the EFS-Web legal framework and 37 C.F.R. § 1.821-825 (see M.P.E.P. § 2442.03(a)), a Sequence Listing in the form of an ASCII-compliant text file (entitled "2920951-210001_Sequence_Listing_ST25.txt" created on 1 Mar. 2022, and 889 bytes in size) is submitted concurrently with the instant application, and the entire contents of the Sequence Listing are incorporated herein by reference.

The present application relates to the use of novel substituted indazoles for treatment and/or prophylaxis of allergic and/or inflammatory diseases in animals and to the use thereof for production of medicaments for treatment and/or prophylaxis of allergic and/or inflammatory diseases in animals, especially of atopic dermatitis and/or Flea Allergy Dermatitis, and especially in domestic animals, particularly in dogs.

The present invention relates to the use of novel substituted indazoles of the general formula (I) which inhibit interleukin-1 receptor-associated kinase 4 (IRAK4).

Human IRAK4 (interleukin-1 receptor-associated kinase 4) plays a key role in the activation of the immune system. Therefore, this kinase is an important therapeutic target molecule for the development of inflammation-inhibiting substances. IRAK4 is expressed by a multitude of cells and mediates the signal transduction of Toll-like receptors (TLRs), except TLR3, and receptors of the interleukin (IL)-1β family consisting of the IL-1R (receptor), IL-18R, IL-33R and IL-36R (Janeway and Medzhitov, Annu. Rev. Immunol., 2002; Dinarello, Annu. Rev. Immunol., 2009; Flannery and Bowie, Biochemical Pharmacology, 2010).

Neither IRAK4 knockout mice nor human cells from patients lacking IRAK4 react to stimulation by TLRs (except TLR3) and the IL-1β family (Suzuki, Suzuki, et al., Nature, 2002; Davidson, Currie, et al., The Journal of Immunology, 2006; Ku, von Bernuth, et al., JEM, 2007; Kim, Staschke, et al., JEM, 2007).

The binding of the TLR ligands or the ligands of the IL-1β family to the respective receptor leads to recruitment and binding of MyD88 [Myeloid differentiation primary response gene (88)] to the receptor. As a result, MyD88 interacts with IRAK4, resulting in the formation of an active complex which interacts with and activates the kinases IRAK1 or IRAK2 (Kollewe, Mackensen, et al., Journal of Biological Chemistry, 2004; Precious et al., J. Biol. Chem., 2009). As a result of this, the NF (nuclear factor)-κB signalling pathway and the MAPK (mitogen-activated protein kinase) signal pathway is activated (Wang, Deng, et al., Nature, 2001). The activation both of the NF-κB signal pathway and of the MAPK signal pathway leads to processes associated with different immune processes. For example, there is increased expression of various inflammatory signal molecules and enzymes such as cytokines, chemokines and COX-2 (cyclooxygenase-2), and increased mRNA stability of inflammation-associated genes, for example COX-2, IL-6 (interleukin-6), IL-8 (Holtmann, Enninga, et al., Journal of Biological Chemistry, 2001; Datta, Novotny, et al., The Journal of Immunology, 2004). Furthermore, these processes may be associated with the proliferation and differentiation of particular cell types, for example monocytes, macrophages, dendritic cells, T cells and B cells (Wan, Chi, et al., Nat Immunol, 2006; McGettrick and J. O'Neill, British Journal of Haematology, 2007).

The central role of IRAK4 in the pathology of various inflammatory disorders had already been shown by direct comparison of wild-type (WT) mice with genetically modified animals having a kinase-inactivated form of IRAK4 (IRAK4 KDKI). IRAK4 KDKI animals have an improved clinical picture in the animal model of multiple sclerosis, atherosclerosis, myocardial infarction and Alzheimer's disease (Rekhter, Staschke, et al., Biochemical and Biophysical Research Communication, 2008; Maekawa, Mizue, et al., Circulation, 2009; Staschke, Dong, et al., The Journal of Immunology, 2009; Kim, Febbraio, et al., The Journal of Immunology, 2011; Cameron, Tse, et al., The Journal of Neuroscience, 2012). Furthermore, it was found that deletion of IRAK4 in the animal model protects against virus-induced myocarditis by an improved anti-viral reaction with simultaneously reduced systemic inflammation (Valaperti, Nishii, et al., Circulation, 2013). It has also been shown that the expression of IRAK4 correlates with the disease activity of Vogt-Koyanagi-Harada syndrome (Sun, Yang, et al., PLoS ONE, 2014). In addition, the high relevance of IRAK4 for immune complex-mediated IFNα (interferon-alpha) production by plasmacytoid dendritic cells, a key process in the pathogenesis of systemic lupus erythematosus (SLE), has been shown (Chiang et al., The Journal of Immunology, 2010). Furthermore, the signalling pathway is associated with obesity (Ahmad, R., P. Shihab, et al., Diabetology & Metabolic Syndrome, 2015).

As well as the essential role of IRAK4 in congenital immunity, there are also hints that IRAK4 influences the differentiation of Th17 T cells, components of adaptive immunity. In the absence of IRAK4 kinase activity, fewer IL-17-producing T cells (Th17 T cells) are generated compared to WT mice. The inhibition of IRAK4 enables the prophylaxis and/or treatment of atherosclerosis, type 1 diabetes mellitus, rheumatoid arthritis, spondyloarthritis (especially psoriatic spondyloarthritis and Bekhterev's disease), lupus erythematosus, psoriasis, vitiligo, giant cell arteritis, chronic inflammatory bowel disorder and viral disorders, for example HIV (human immunodeficiency virus), hepatitis virus (Staschke, et al., The Journal of Immunology, 2009; Marquez, et al., Ann Rheum Dis, 2014; Zambrano-Zaragoza, et al., International Journal of Inflammation, 2014; Wang, et al., Experimental and Therapeutic Medicine, 2015; Ciccia, et al., Rheumatology, 2015).

Due to the central role of IRAK4 in the MyD88-mediated signal cascade of TLRs (except TLR3) and the IL-1 receptor family, the inhibition of IRAK4 can be utilized for the prophylaxis and/or treatment of disorders mediated by the receptors mentioned.

The prior art discloses a multitude of IRAK4 inhibitors (see, for example, Annual Reports in Medicinal Chemistry (2014), 49, 117-133).

U.S. Pat. No. 8,293,923 and US20130274241 disclose IRAK4 inhibitors having a 3-substituted indazole structure. There is no description of 2-substituted indazoles.

WO2013106254 and WO2011153588 disclose 2,3-disubstituted indazole derivatives.

WO2007091107 describes 2-substituted indazole derivatives for the treatment of Duchenne muscular dystrophy. The compounds disclosed do not have 6-hydroxyalkyl substitution.

WO2015091426 describes indazoles, such as Example 64, substituted at the 2 position by a carboxamide side chain.

Example 64

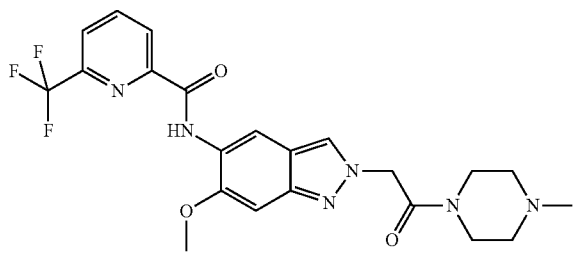

WO2015104662 discloses 2-substituted indazoles of the following general formula:

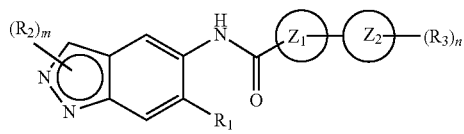

in which $R_2$ is an alkyl or cycloalkyl group. There are explicit descriptions of 2-substituted indazoles having a methyl, 2-methoxyethyl and cyclopentyl group at the 2 position (Examples 1, 4 and 76). Also described by Example 117 is an indazole derivative having a hydroxyethyl substituent at the 1 position. However, no indazole derivatives having a 3-hydroxy-3-methylbutyl substituent at the 1 position or 2 position are described.

Indazoles having a hydroxyl-substituted alkyl group in the 2 position are encompassed generically by the general formula, but are not disclosed explicitly in WO2015104662.

Indazoles having an alkyl group in the 2 position where the alkyl group is additionally substituted by a methylsulphonyl group are not encompassed by the general formula and the definitions of the $R_2$ substituents in WO2015104662.

In addition to the above-described substitution pattern on the indazole in 1 and 2 positions, WO2015104662 describes indazoles having substitution at the 6 position for which $R_1$ is defined as follows: alkyl, cyano, $—NR_aR_b$ or optionally substituted groups selected from cycloalkyl, aryl or heterocyclyl, where the substituents are independently alkyl, alkoxy, halogen, hydroxyl, hydroxyalkyl, amino, aminoalkyl, nitro, cyano, haloalkyl, haloalkoxy, $—OCOCH_2—O—$alkyl, $—OP(O)(O\text{-alkyl})_2$ or $—CH_2—OP(O)(O\text{-alkyl})_2$. For indazole compounds in which $R_1$ is an alkyl group, the effective filing date is 7 Jan. 2015 (international filing date of WO2015104662). The Indian applications 146/CHE/2014 and 3018/CHE/2014 whose priority is claimed do not disclose any indazole compounds for which $R_1$ is an alkyl group.

Thus, indazole compounds of the following general formula:

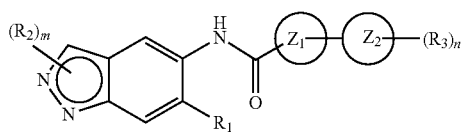

in which $R_1$ is an optionally substituted alkyl group are described for the first time on 7 Jan. 2015 and hence after the priority date of the present application.

Examples of substituents at the 6 position described in WO2015104662 for $R_1$ are cyclopropyl, cyclohexyl, cyano, 3-fluorophenyl and saturated heterocyclic substituents. Indazoles having a hydroxyl-substituted alkyl group at position 6 are not described explicitly in WO2015104662.

The compounds used in the present invention are also described in copending patent application PCT/EP2015/077596, published as WO2016083433 on 2 Jun. 2016.

Current treatment options for allergic and/or inflammatory diseases in animals, for example for allergic skin diseases, typically include the use of steroids and cyclosporine—both are associated with side effects. Recently a janus-kinase (JAK) inhibitor has been approved for use in Canine Atopic Dermatitis (CAD) that symptomatically provides relief from pruritus, however, the dosing regimen may again be limited by side effects. The treatment of CAD with a disease modifying agent and without treatment-related side effects remains an unmet medical need.

The problem addressed by the present invention is that of providing a better treatment option for inflammatory and/or allergic diseases in animals.

The present IRAK4 inhibitors are especially suitable for treatment and for prevention of inflammatory disorders in animals characterized by an overreacting immune system. Particular mention should be made here of Canine Atopic Dermatitis, Flea Allergy Dermatitis in dogs and cats, inflammatory bowel disease in dogs and cats, osteoarthritis and inflammatory pain in dogs, cats, horses and cattle, non-infectious recurrent airway disease in horses (also known as chronic obstructive pulmonary disease, heaves), insect hypersensitivity in horses (also known as sweet itch, summer eczema), feline asthma, bovine respiratory disease, mastitis and endometritis in cattle, and swine respiratory disease.

Atopic dermatitis, for example, is a common disease in companion animals, particularly in cats and dogs.

As one specific example, Canine atopic dermatitis (CAD) is one of the commonest diseases of dogs. CAD can affect patients from an early age, recurring throughout their lifetime. In a study of Lund et al. 1999, that investigated 31,484 dogs in 52 private practices in the US, the prevalence of CAD was 8.7%. CAD is the second most common cause of canine pruritus after Flea Allergy Dermatitis (FAD). Canine atopic dermatitis can be defined as a 'genetically predisposed inflammatory and pruritic allergic skin disease with characteristic clinical features associated with IgE, most commonly directed against environmental allergens' (Halliwell, Veterinary Immunology and Immunopathology, 2006), like dust mites and pollen, which are incredibly difficult for pets to avoid, since dust mites are virtually everywhere and pollen permeates the air outdoors.

Canine atopic dermatitis is a complex and multifactorial disease involving immune dysregulation, allergic sensitisation, skin barrier defects, microbial colonization and environmental factors.

IgE is not a prerequisite for the development of the clinical signs in all cases, and a separate clinical entity known as atopic-like dermatitis was defined as 'an inflammatory and pruritic skin disease with clinical features identical to those seen in Canine Atopic Dermatitis in which an IgE response to environmental or other allergens cannot be documented' (Nuttall et al., Vet. Record, 2013).

The most common symptoms of Canine Atopic Dermatitis include itching, excessive scratching, rubbing on the carpet, hair loss, greasy or flaky skin with a foul odor, excessive chewing on the paws and areas such as the groin and armpits. Over time, the skin that is scratched can develop hot spots—raw, inflamed areas—that may become infected.

At present, the treatment of acute flares of atopic dermatitis (AD) should involve the search for, and then elimination of, the cause of the flares, bathing with mild shampoos, and controlling pruritus and skin lesions with interventions that include topical and/or oral glucocorticoids or oclacitinib. For chronic CAD, the first steps in management are the identification and avoidance of flare factors, as well as ensuring that there is adequate skin and coat hygiene and care; this might include more frequent bathing and possibly increasing essential fatty acid intake. The medications currently most effective in reducing chronic pruritus and skin lesions are topical and oral glucocorticoids, oral ciclosporin, oral oclacitinib, and, where available, injectable recombinant interferons. Allergen-specific immunotherapy and proactive intermittent topical glucocorticoid applications are the only interventions likely to prevent or delay the recurrence of flares of AD. (Olivry et al., BMC Veterinary Research, 2015)

As another specific example, Flea allergy dermatitis (FAD) or flea bite hypersensitivity is the most common dermatologic disease of domestic dogs (Scott et al., In: Muller and Kirk's Small Animal Dermatology, 2001), caused by the by far most prevalent flea on dogs and cats: *Ctenocephalides felis* (Beresford-Jones, J Small Animal Practice, 1981; Chesney, Veterinary Record, 1995). Cats also develop FAD, which is one of the major causes of feline miliary dermatitis.

FAD is most prevalent in the summer, although in warm climates flea infestations may persist throughout the year. In north temperate regions, the close association of pets and their fleas with human dwellings creates conditions that permit a year-round problem. Temperature extremes and low humidity tend to inhibit flea development.

When feeding, fleas inject saliva that contains a variety of histamine-like compounds, enzymes, polypeptides, and amino acids that span a wide range of sizes (40-60 kD) and induce Type I, Type IV, and basophil hypersensitivity. Flea-naive dogs exposed intermittently to flea bites develop either immediate (15 min) or delayed (24-48 hr) reactions, or both, and detectable levels of both circulating IgE and IgG antiflea antibodies. Dogs exposed continuously to flea bites have low levels of these circulating antibodies and either do not develop skin reactions or develop them later and to a considerably reduced degree. This could indicate that immunologic tolerance may develop naturally in dogs continually exposed to flea bites. Although the pathophysiology of FAD in cats is poorly understood, similar mechanisms may exist.

The cat flea (*Ctenocephalides felis*) causes severe irritation in animals and people, and is responsible for Flea Allergy Dermatitis. Typical symptoms are: pruritus, inflammation of the skin and skin lesions (erythema, scales, papules, crusts and lichenification). These lesions are most commonly seen along the back and at the base of the tail.

As the condition progresses there may be hair loss, broken hairs, oozing or crusty sores, pimply bumps and general redness and inflammation of the skin. The sores can be very painful. In severe cases the skin becomes thickened and dark, predominantly in the area on the dog's back at the base of the tail. The dog, itself, causes the damage with self mutilation due to the severe itching.

In general, prevention and treatment of flea infestation is the treatment option of choice. Most commonly neonicotinoids, like imidacloprid, or gamma-aminobutyric acid (GABA)-gated chloride channel blockers, like fipronil, are used. In cases where symptoms of skin allergic dermatitis do not resolve, current treatments mentioned under CAD, like topical and oral glucocorticoids, oral ciclosporin, oral oclacitinib are used.

The present invention provides compounds of the general formula (I)

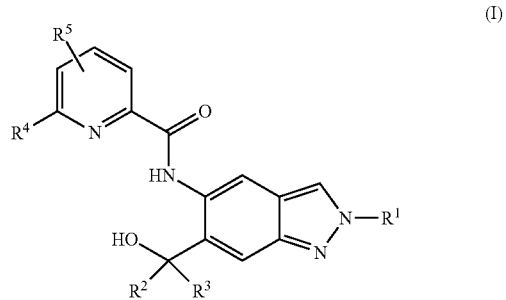

in which:

$R^1$ is $C_1$-$C_6$-alkyl, where the $C_1$-$C_6$-alkyl group is unsubstituted or mono- or polysubstituted identically or differently by
  halogen, hydroxyl, an unsubstituted or mono- or poly-halogen-substituted $C_3$-$C_6$-cycloalkyl, or an $R^6$, $R^7SO_2$, $R^7SO$ or $R^8O$ group,
or a group selected from:

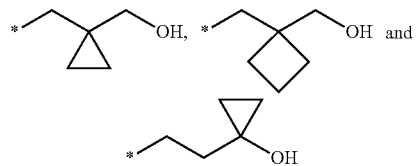

where * represents the bonding site of the group to the rest of the molecule;

$R^2$ and $R^3$ always have the same definition and are both either hydrogen or $C_1$-$C_6$-alkyl;

$R^4$ is halogen, cyano, an unsubstituted or a singly or multiply, identically or differently substituted $C_1$-$C_6$-alkyl or an unsubstituted or a singly or multiply, identically or differently substituted $C_3$-$C_6$-cycloalkyl, and the substituents are selected from the group of halogen and hydroxyl;

$R^5$ is hydrogen, halogen or an unsubstituted or mono- or poly-halogen-substituted $C_1$-$C_6$-alkyl;

$R^6$ is an unsubstituted or mono- or di-methyl-substituted monocyclic saturated heterocycle having 4 to 6 ring atoms, which contains a heteroatom or a heterogroup from the group of O, S, SO and $SO_2$;

R$^7$ is $C_1$-$C_6$-alkyl, where the $C_1$-$C_6$-alkyl group is unsubstituted or mono- or polysubstituted identically or differently by halogen, hydroxyl or $C_3$-$C_6$-cycloalkyl, or R$^7$ is $C_3$-$C_6$-cycloalkyl;

R$^8$ is $C_1$-$C_6$-alkyl, where the $C_1$-$C_6$-alkyl group is unsubstituted or mono- or polysubstituted identically or differently by halogen;

and the diastereomers, enantiomers, metabolites, salts, solvates or solvates of the salts thereof, for use in the treatment and/or prophylaxis of allergic and/or inflammatory diseases in animals.

In the case of the mentioned use of the synthesis intermediates and working examples of the invention described hereinafter, any compound specified in the form of a salt of the corresponding base or acid is generally a salt of unknown exact stoichiometric composition, as obtained by the respective preparation and/or purification process. Unless specified in more detail, additions to names and structural formulae, such as "hydrochloride", "trifluoroacetate", "sodium salt" or "x HCl", "x CF$_3$COOH", "x Na$^+$" should not therefore be understood in a stoichiometric sense in the case of such salts, but have merely descriptive character with regard to the salt-forming components present therein.

This applies correspondingly if synthesis intermediates or working examples or salts thereof were obtained in the form of solvates, for example hydrates, of unknown stoichiometric composition (if they are of a defined type) by the preparation and/or purification processes described.

Present compounds are the compounds of the formula (I) and the salts, solvates and solvates of the salts thereof, the compounds that are encompassed by formula (I) and are of the formulae mentioned below and the salts, solvates and solvates of the salts thereof and the compounds that are encompassed by the formula (I) and are mentioned below as embodiments and the salts, solvates and solvates of the salts thereof if the compounds that are encompassed by the formula (I) and are mentioned below are not already salts, solvates and solvates of the salts.

Preferred salts in the context of the present invention are physiologically acceptable salts of the present compounds. However, the present disclosure also encompasses salts which themselves are unsuitable for pharmaceutical applications but which can be used, for example, for the isolation or purification of the present compounds.

Physiologically acceptable salts of the present compounds include acid addition salts of mineral acids, carboxylic acids and sulphonic acids, for example salts of hydrochloric acid, hydrobromic acid, sulphuric acid, phosphoric acid, methanesulphonic acid, ethanesulphonic acid, toluenesulphonic acid, benzenesulphonic acid, naphthalenedisulphonic acid, acetic acid, trifluoroacetic acid, propionic acid, lactic acid, tartaric acid, malic acid, citric acid, fumaric acid, maleic acid and benzoic acid.

Physiologically acceptable salts of the present compounds also include salts of conventional bases, by way of example and with preference alkali metal salts (e.g. sodium and potassium salts), alkaline earth metal salts (e.g. calcium and magnesium salts) and ammonium salts derived from ammonia or organic amines having 1 to 16 carbon atoms, by way of example and with preference ethylamine, diethylamine, triethylamine, ethyldiisopropylamine, monoethanolamine, diethanolamine, triethanolamine, dicyclohexylamine, dimethylaminoethanol, procaine, dibenzylamine, N-methylmorpholine, arginine, lysine, ethylenediamine and N-methylpiperidine.

Solvates in the context of the invention are described as those forms of the present compounds which form a complex in the solid or liquid state by coordination with solvent molecules. Hydrates are a specific form of the solvates in which the coordination is with water.

The present compounds may, depending on their structure, exist in different stereoisomeric forms, i.e. in the form of configurational isomers or else, if appropriate, of conformational isomers (enantiomers and/or diastereomers, including those in the case of atropisomers). The present invention therefore encompasses the use of enantiomers and diastereomers, and the respective mixtures thereof. The stereoisomerically homogeneous constituents can be isolated from such mixtures of enantiomers and/or diastereomers in a known manner; chromatography processes are preferably used for this purpose, especially HPLC chromatography on an achiral or chiral phase.

If the present compounds can occur in tautomeric forms, the present invention encompasses the use of all the tautomeric forms.

The present invention also encompasses the use of all suitable isotopic variants of the present compounds. An isotopic variant of an present compound is understood here as meaning a compound in which at least one atom within the present compound has been exchanged for another atom of the same atomic number, but with a different atomic mass than the atomic mass which usually or predominantly occurs in nature. Examples of isotopes which can be incorporated into an present compound are those of hydrogen, carbon, nitrogen, oxygen, phosphorus, sulphur, fluorine, chlorine, bromine and iodine, such as 2H (deuterium), 3H (tritium), 13C, 14C, 15N, 17O, 18O, 32P, 33P, 33S, 34S, 35S, 36S, 18F, 36Cl, 82Br, 123I, 124I, 129I and 131I. Particular isotopic variants of an present compound, such as, in particular, those in which one or more radioactive isotopes have been incorporated, may be beneficial, for example, for the examination of the mechanism of action or of the active ingredient distribution in the body; because of the comparative ease of preparability and detectability, particularly compounds labelled with 3H or 14C isotopes are suitable for this purpose. In addition, the incorporation of isotopes, for example of deuterium, may lead to particular therapeutic benefits as a consequence of greater metabolic stability of the compound, for example an extension of the half-life in the body or a reduction in the active dose required; such modifications of the present compounds may therefore in some cases also constitute a preferred embodiment of the use of the present invention. Isotopic variants of the present compounds can be prepared by the processes known to those skilled in the art, for example by the methods described further below and the procedures described in the working examples, by using corresponding isotopic modifications of the respective reagents and/or starting compounds.

The present invention further provides the use of all the possible crystalline and polymorphous forms of the present compounds, where the polymorphs may be present either as single polymorphs or as a mixture of a plurality of polymorphs in all concentration ranges.

The present invention additionally also encompasses the use of prodrugs of the present compounds. The term "prodrugs" in this context refers to compounds which may themselves be biologically active or inactive but are converted (for example metabolically or hydrolytically) to present compounds during their residence time in the body.

In the context of the present invention, unless specified otherwise, the substituents have the following meanings:

Alkyl in the context of the invention represents a straight-chain or branched alkyl group having the particular number of carbon atoms specified. Examples include methyl, ethyl, n-propyl, isopropyl, n-butyl, isobutyl, 1-methylpropyl, 2-methylpropyl, tert-butyl, n-pentyl, 1-ethylpropyl, 1-methylbutyl, 2-methylbutyl, 3-methylbutyl, 2,2-dimethylpropyl, n-hexyl, 1-methylpentyl, 2-methylpentyl, 3-methylpentyl, 4-methylpentyl, 1-ethylbutyl and 2-ethylbutyl. Preference is given to methyl, ethyl, n-propyl, n-butyl, 2-methylbutyl, 3-methylbutyl and 2,2-dimethylpropyl.

Cycloalkyl in the context of the invention is a monocyclic saturated alkyl group having the number of carbon atoms specified in each case. Preferred examples include cyclopropyl, cyclobutyl, cyclopentyl and cyclohexyl.

Alkoxy in the context of the invention represents a straight-chain or branched alkoxy group having the particular number of carbon atoms specified. 1 to 6 carbon atoms are preferred. Examples include methoxy, ethoxy, n-propoxy, isopropoxy, 1-methylpropoxy, n-butoxy, isobutoxy, tert-butoxy, n-pentoxy, isopentoxy, 1-ethylpropoxy, 1-methylbutoxy, 2-methylbutoxy, 3-methylbutoxy and n-hexoxy. Particular preference is given to a linear or branched alkoxy group having 1 to 4 carbon atoms. Examples which may be mentioned as being preferred are methoxy, ethoxy, n-propoxy, 1-methylpropoxy, n-butoxy and isobutoxy.

Halogen in the context of the invention is fluorine, chlorine and bromine. Preference is given to fluorine.

Hydroxyl in the context of the invention is OH.

A monocyclic saturated heterocycle is a monocyclic saturated heterocycle which has 4 to 6 ring atoms and contains a heteroatom or a heterogroup from the group of O, S, SO and $SO_2$. A heterocycle having a heteroatom or a heterogroup from the group of O, SO and $SO_2$ is preferred. Examples include: oxetane, tetrahydrofuran, tetrahydro-2H-pyran-4-yl, 1,1-dioxidotetrahydro-2H-thiopyran-3-yl, 1,1-dioxidotetrahydro-2H-thiopyran-2-yl, 1,1-dioxidotetrahydro-2H-thiopyran-4-yl, 1,1-dioxidotetrahydrothiophen-3-yl, 1,1-dioxidotetrahydrothiophen-2-yl, 1,1-dioxidothietan-2-yl or 1,1-dioxidothietan-3-yl. Particular preference is given here to oxetane and tetrahydrofuran. Very particular preference is given to oxetan-3-yl.

A symbol * at a bond denotes the bonding site in the molecule.

When groups in the present compounds are substituted, the groups may be mono- or polysubstituted, unless specified otherwise. In the context of the present invention, all groups which occur more than once are defined independently of one another. Substitution by one, two or three identical or different substituents is preferred.

A preferred embodiment of $R^1$ is a $C_2$-$C_6$-alkyl group substituted by 1, 2 or 3 fluorine atoms. Particular preference is given to 2,2,2-trifluoroethyl, 3,3,3-trifluoropropyl and 4,4,4-trifluorobutyl. Very particular preference is given to a 4,4,4-trifluorobutyl group.

A further preferred embodiment of $R^1$ is a $C_2$-$C_6$-alkyl group substituted by one or two hydroxyl group(s) or one $C_1$-$C_3$-alkoxy or a tri-fluorine-substituted $C_1$-$C_3$-alkoxy. Particular preference is given to a $C_2$-$C_5$-alkyl group substituted by hydroxyl or $C_1$-$C_3$-alkoxy or trifluoromethoxy or 2,2,2-trifluoroethoxy. Very particular preference is given to 3-hydroxy-3-methylbutyl, 3-methoxypropyl, 3-hydroxypropyl, 3-trifluoromethoxypropyl, 2-methoxyethyl or 2-hydroxyethyl. Especially preferred is the 3-hydroxy-3-methylbutyl group.

Further preferably, $R^1$ is a $C_2$-$C_6$-alkyl group substituted by a $C_1$-$C_6$-alkyl-$SO_2$ group. A methyl-$SO_2$-substituted $C_2$-$C_4$-alkyl group is particularly preferred. Especially preferred for $R^1$ are 2-(methylsulphonyl)ethyl or 3-(methylsulphonyl)propyl. From the latter group, 2-(methylsulphonyl)ethyl is particularly preferred.

Additionally preferably, $R^1$ is a $C_1$-$C_3$-alkyl group substituted by oxetanyl, tetrahydrofuranyl, tetrahydro-2H-pyran-4-yl, 1,1-dioxidotetrahydro-2H-thiopyran-3-yl, 1,1-dioxidotetrahydro-2H-thiopyran-2-yl, 1,1-dioxidotetrahydro-2H-thiopyran-4-yl, 1,1-dioxidotetrahydrothiophen-3-yl, 1,1-dioxidotetrahydrothiophen-2-yl, 1,1-dioxidothietan-2-yl or 1,1-dioxidothietan-3-yl. Particular preference is given to a $C_1$-$C_3$-alkyl group substituted by an oxetane group. Especially preferred for $R^1$ is an oxetan-3-ylmethyl group.

For $R^2$ and $R^3$, which always have the same definition, hydrogen or methyl are preferred. Methyl is particularly preferred.

In the case of $R^4$, preference is given to an unsubstituted or mono- or poly-halogen-substituted $C_1$-$C_3$-alkyl group or a $C_1$-$C_3$-alkyl group substituted by one hydroxyl group or a $C_1$-$C_3$-alkyl group substituted by one hydroxyl group and three fluorine atoms.

For $R^4$, particular preference is given to the following groups: methyl, ethyl, trifluoro-$C_1$-$C_3$-alkyl, difluoro-$C_1$-$C_3$-alkyl, hydroxymethyl, 1-hydroxyethyl, 2-hydroxypropan-2-yl and 2,2,2-trifluoro-1-hydroxyethyl. For $R^4$, particular preference is given to the methyl, trifluoromethyl and difluoromethyl groups. Particular preference is given here to a trifluoromethyl group.

A preferred embodiment of $R^5$ is hydrogen, fluorine, chlorine or $C_1$-$C_3$-alkyl. More preferably, $R^5$ is hydrogen, fluorine or methyl. Most preferably, $R^5$ is hydrogen or fluorine.

Particular preference is also given to compounds in which $R^4$ is methyl or trifluoromethyl and $R^5$ is fluorine. Very particular preference is given to compounds in which $R^4$ is methyl and $R^5$ is fluorine, where $R^5$ is in the ortho position to $R^4$.

For $R^6$, preferred embodiments include oxetanyl, tetrahydrofuranyl, tetrahydro-2H-pyran-4-yl, 1,1-dioxidotetrahydro-2H-thiopyran-3-yl, 1,1-dioxidotetrahydro-2H-thiopyran-2-yl, 1,1-dioxidotetrahydro-2H-thiopyran-4-yl, 1,1-dioxidotetrahydrothiophen-3-yl, 1,1-dioxidotetrahydrothiophen-2-yl, 1,1-dioxidothietan-2-yl or 1,1-dioxidothietan-3-yl. Particular preference is given here to oxetanyl. Very particular preference is given to oxetan-3-yl.

$R^7$ is exclusively connected to the functional groups —$SO_2$— and —SO—, i.e. is an $R^7$-substituted —$SO_2$— or SO group. In this connection, $R^7$ is preferably $C_1$-$C_4$-alkyl, where the $C_1$-$C_4$-alkyl group is unsubstituted or monosubstituted by hydroxyl or by cyclopropyl or substituted by three fluorine atoms. Additionally preferred for $R^7$ is a cyclopropyl group. Particularly preferred for $R^7$ are methyl, ethyl or hydroxyethyl. Very particular preference is given to methyl for $R^7$.

This means that, in the case of a $C_1$-$C_6$-alkyl group substituted by $R^7SO_2$— or $R^7SO$—, in the context of $R^1$, preference is given to a $C_1$-$C_6$-alkyl substituted by a $C_1$-$C_6$-alkyl-$SO_2$ or a $C_1$-$C_6$-alkyl-SO. For $R^1$, preference is given here especially to methylsulphonylethyl and methylsulphonylpropyl. Very particular preference is given here to methylsulphonylethyl.

For $R^8$, preference is given to an unsubstituted $C_1$-$C_4$-alkyl group or a tri-fluorine-substituted $C_1$-$C_4$-alkyl group. Particular preference is given to methyl, ethyl, trifluoromethyl or 2,2,2-trifluoroethyl. Very particular preference is given to methyl, trifluoromethyl or 2,2,2-trifluoroethyl.

As described previously, the intracellular enzyme interleukin-1 receptor-associated kinase 4 (IRAK4) plays an integral part in the signaling pathway of receptors activated by cytokines and TLR ligands that are implicated in inflammatory processes. Besides inflammation, IRAK4 is also involved in the signaling of allergic processes. Such allergic processes play an important role in the pathogenesis of allergic skin diseases, like atopic dermatitis.

For example, IL-33 a recent addition to the IL-1 family of cytokines that also includes IL-18 and IL-1, binds to and activates IL-33 receptors (IL-33R) that then associate with MyD88, IRAK4 and TRF6 (Schmitz et al, Immunity, 2005). IRAK4 is an essential component of this signaling pathway. IL-33R are strongly expressed on T helper cell type 2 (Th2) cells, mast cells and eosinophils. IL-33 activates these cells and promotes Th2 immune responses (Schmitz et al, Immunity, 2005). These cell types are each involved in the pathogenesis of atopic dermatitis. IL-33 levels in the serum correlate with the severity of atopic dermatitis in man and decrease on treatment with topical steroids & calcineurin inhibitor (Tamagawa-Mineoka et al, J American Academy Dermatology, 2014). In models of acute Canine Atopic Dermatitis it has been shown that the IL-33 gene was significantly up-regulated in skin lesions (Schamber et al., G3 (Bethesda), 2014; Olivry et al, Journal of Investigative Dermatology, 2016).

Furthermore, a second member of the IL-1 family of cytokines, IL-18 has been implicated in atopic dermatitis. Serum levels of IL-18 increase with severity of atopic dermatitis in children (Sohn et al, Allergy and Asthma Proceedings, 2004). In models of acute Canine Atopic Dermatitis it has been shown that the IL-18 gene was significantly up-regulated in skin lesions (Schamber et al., G3 (Bethesda), 2014; Olivry et al, Journal of Investigative Dermatology, 2016). In addition, atopic dermatitis-like inflammation & itching were initiated by over-release of IL-18 and accelerated by IL-1 in mice (Konishi et al, Proceedings of the National Academy of Sciences, 2002). Again IRAK4 has been shown to be an essential component of the IL-18 signaling cascade (Suzuki et al, J Immunology, 2003). Similarly IRAK4 is critical for the signaling of IL-1 and TLR ligands (Suzuki et al, Nature, 2002). TLR agonists are known to induce itch (Liu et al, Neuroscience bulletin, 2012), an important symptom of atopic dermatitis, and anti-IL-1 therapies are used off-label to treat atopic dermatitis. Moreover, polymorphisms in IRAK4 are associated with elevated total IgE in allergic diseases such as asthma and chronic rhinosinusitis (Tewfik et al, Allergy, 2009). IgE levels are also elevated in atopic dermatitis.

Hence, as IRAK4 is a critical part of the signaling pathways that are activated by a number of cytokine, TLR ligands and IRAK4 has polymorphisms associated with increased IgE level, inhibition of IRAK4 is an important therapeutic strategy for the treatment of allergic skin diseases such as atopic dermatitis. Moreover, in companion animals (especially dogs and cats) both atopic dermatitis and Flea Allergy Dermatitis are appropriate indications since both diseases are comprised of Type I hypersensitivity that involves IgE antibodies, Th2 cells, mast cells and eosinophils. In addition, FAD can be comprised of Type IV hypersensitivity in which IL-1 and IL-18 are involved.

The present compounds act as inhibitors of IRAK4 kinase and therefore have an unforeseeable useful pharmacological activity spectrum in the treatment and/or prophylaxis of allergic and/or inflammatory diseases in animals.

Preference is given to compounds of the formula (I) in which
$R^1$ is $C_1$-$C_6$-alkyl, where the $C_1$-$C_6$-alkyl group is unsubstituted or mono- or polysubstituted identically or differently by fluorine, hydroxyl or an $R^6$, $R^7SO_2$, $R^7SO$ or $R^8O$ group;
$R^2$ and $R^3$ always have the same definition and are both either hydrogen or $C_1$-$C_3$-alkyl;
$R^4$ is halogen, cyano or $C_1$-$C_3$-alkyl, where the $C_1$-$C_3$-alkyl group is unsubstituted or mono- or polysubstituted identically or differently by halogen or hydroxyl;
$R^5$ is hydrogen, fluorine, chlorine or $C_1$-$C_3$-alkyl;
$R^6$ is oxetanyl or tetrahydrofuranyl;
$R^7$ is $C_1$-$C_4$-alkyl, where the $C_1$-$C_4$-alkyl group is unsubstituted or monosubstituted by hydroxyl or by cyclopropyl or substituted by three fluorine atoms;
$R^8$ is unsubstituted $C_1$-$C_4$-alkyl or tri-fluorine-substituted $C_1$-$C_4$-alkyl;
and the diastereomers, enantiomers, metabolites, salts, solvates or solvates of the salts thereof,
for use in the treatment and/or prophylaxis of allergic and/or inflammatory diseases in animals.

Preference is additionally given to compounds of the formula (I) in which
$R^1$ is $C_2$-$C_6$-alkyl, where $C_2$-$C_6$-alkyl is unsubstituted, or $C_2$-$C_6$-alkyl is mono-, di- or tri-fluorine-substituted or $C_2$-$C_6$-alkyl is monosubstituted by hydroxyl, $R^6$, $R^7SO_2$, or $R^8O$,
or in which $R^1$ is an oxetanyl-substituted $C_1$-$C_3$-alkyl;
$R^2$ and $R^3$ always have the same definition and are both either hydrogen or methyl;
$R^4$ is an unsubstituted or mono- or poly-halogen-substituted $C_1$-$C_3$-alkyl group or a $C_1$-$C_3$-alkyl group substituted by one hydroxyl group or a $C_1$-$C_3$-alkyl group substituted by one hydroxyl group and three fluorine atoms;
$R^5$ is hydrogen, fluorine or $C_1$-$C_3$-alkyl;
$R^7$ is $C_1$-$C_3$-alkyl;
$R^8$ is $C_1$-$C_4$-alkyl, where the $C_1$-$C_4$-alkyl group is unsubstituted or mono-, di- or tri-fluorine-substituted;
and the diastereomers, enantiomers, metabolites, salts, solvates or solvates of the salts thereof,
for use in the treatment and/or prophylaxis of allergic and/or inflammatory diseases in animals.

Particular preference is also given to compounds of the general formula (I) in which
$R^1$ is a $C_2$-$C_5$-alkyl group substituted by hydroxyl or $C_1$-$C_3$-alkoxy or trifluoromethoxy or 2,2,2-trifluoroethoxy or trifluoromethyl or
is a methyl-$SO_2$-substituted $C_2$-$C_4$-alkyl group or
is an oxetan-3-yl-substituted $C_1$-$C_2$-alkyl group;
$R^2$ and $R^3$ always have the same definition and are both hydrogen or methyl;
$R^4$ is methyl, ethyl, trifluoro-$C_1$-$C_3$-alkyl, difluoro-$C_1$-$C_3$-alkyl, hydroxymethyl, 1-hydroxyethyl, 2-hydroxypropan-2-yl and 2,2,2-trifluoro-1-hydroxyethyl and
$R^5$ is hydrogen, fluorine or methyl;
and the diastereomers, enantiomers, metabolites, salts, solvates or solvates of the salts thereof,
for use in the treatment and/or prophylaxis of allergic and/or inflammatory diseases in animals.

Very particular preference is given to compounds in which
$R^1$ is 4,4,4-trifluorobutyl, 3-hydroxy-3-methylbutyl, 3-hydroxybutyl, 3-methoxypropyl, 3-hydroxypropyl, 3-hydroxy-2-methylpropyl, 3-hydroxy-2,2-dimethylpropyl, 3-trifluoromethoxypropyl, 2-methoxyethyl, 2-hydroxyethyl, 2-(methylsulphonyl)ethyl or 3-(methylsulphonyl)propyl;

$R^2$ and $R^3$ are both methyl or hydrogen and
$R^4$ is difluoromethyl, trifluoromethyl or methyl and
$R^5$ is hydrogen or fluorine;
and the diastereomers, enantiomers, metabolites, salts, solvates or solvates of the salts thereof,
for use in the treatment and/or prophylaxis of allergic and/or inflammatory diseases in animals.

Very particular preference is also given to compounds in which $R^1$ is 3-hydroxy-3-methylbutyl, 3-hydroxybutyl, 3-hydroxy-2-methylpropyl, 3-hydroxy-2,2-dimethylpropyl, 3-(methylsulphonyl)propyl or 2-(methylsulphonyl)ethyl;
$R^2$ and $R^3$ are both methyl;
$R^4$ is difluoromethyl or trifluoromethyl; and
$R^5$ is hydrogen;
and the diastereomers, enantiomers, metabolites, salts, solvates or solvates of the salts thereof,
for use in the treatment and/or prophylaxis of allergic and/or inflammatory diseases in animals.

Particular preference is additionally also given to compounds in which $R^1$ is 3-hydroxy-3-methylbutyl, 3-hydroxybutyl, 3-hydroxy-2-methylpropyl, 3-hydroxy-2,2-dimethylpropyl, 3-(methylsulphonyl)propyl or 2-(methylsulphonyl)ethyl;
$R^2$ and $R^3$ are both methyl;
$R^4$ is methyl and
$R^5$ is fluorine, where $R^5$ is in the ortho position to $R^4$;
and the diastereomers, enantiomers, metabolites, salts, solvates or solvates of the salts thereof,
for use in the treatment and/or prophylaxis of allergic and/or inflammatory diseases in animals.

The present invention especially provides the following compounds:

1) N-[6-(2-Hydroxypropan-2-yl)-2-(2-methoxyethyl)-2H-indazol-5-yl]-6-(trifluoromethyl)pyridine-2-carboxamide
2) N-[6-(Hydroxymethyl)-2-(2-methoxyethyl)-2H-indazol-5-yl]-6-(trifluoromethyl)pyridine-2-carboxamide
3) N-[6-(2-Hydroxypropan-2-yl)-2-(3-methoxypropyl)-2H-indazol-5-yl]-6-(trifluoromethyl)pyridine-2-carboxamide
4) N-[6-(Hydroxymethyl)-2-(3-methoxypropyl)-2H-indazol-5-yl]-6-(trifluoromethyl)pyridine-2-carboxamide
5) N-[2-(2-Hydroxyethyl)-6-(2-hydroxypropan-2-yl)-2H-indazol-5-yl]-6-(trifluoromethyl)pyridine-2-carboxamide
6) N-[6-(2-Hydroxypropan-2-yl)-2-(3-hydroxypropyl)-2H-indazol-5-yl]-6-(trifluoromethyl)pyridine-2-carboxamide
7) N-[2-(2-Hydroxyethyl)-6-(hydroxymethyl)-2H-indazol-5-yl]-6-(trifluoromethyl)pyridine-2-carboxamide
8) N-[6-(2-Hydroxypropan-2-yl)-2-(oxetan-3-ylmethyl)-2H-indazol-5-yl]-6-(trifluoromethyl)pyridine-2-carboxamide
9) N-[6-(Hydroxymethyl)-2-(oxetan-3-ylmethyl)-2H-indazol-5-yl]-6-(trifluoromethyl)pyridine-2-carboxamide
10) N-{6-(2-Hydroxypropan-2-yl)-2-[3-(methylsulphonyl)propyl]-2H-indazol-5-yl}-6-(trifluoromethyl)pyridine-2-carboxamide
11) N-[2-(3-Hydroxy-3-methylbutyl)-6-(2-hydroxypropan-2-yl)-2H-indazol-5-yl]-6-(trifluoromethyl)pyridine-2-carboxamide
12) N-{6-(2-Hydroxypropan-2-yl)-2-[2-(methylsulphonyl)ethyl]-2H-indazol-5-yl}-6-(trifluoromethyl)pyridine-2-carboxamide
13) 6-(Difluoromethyl)-N-[2-(3-hydroxy-3-methylbutyl)-6-(2-hydroxypropan-2-yl)-2H-indazol-5-yl]pyridine-2-carboxamide
14) 6-(Difluoromethyl)-N-{6-(2-hydroxypropan-2-yl)-2-[2-(methylsulphonyl)ethyl]-2H-indazol-5-yl}pyridine-2-carboxamide
15) 6-(Difluoromethyl)-N-[6-(2-hydroxypropan-2-yl)-2-(3-hydroxypropyl)-2H-indazol-5-yl]pyridine-2-carboxamide
16) N-[6-(2-Hydroxypropan-2-yl)-2-(4,4,4-trifluorobutyl)-2H-indazol-5-yl]-6-(trifluoromethyl)pyridine-2-carboxamide
17) N-{6-(2-Hydroxypropan-2-yl)-2-[3-(trifluoromethoxy)propyl]-2H-indazol-5-yl}-6-(trifluoromethyl)pyridine-2-carboxamide
18) N-{6-(2-Hydroxypropan-2-yl)-2-[3-(2,2,2-trifluoroethoxy)propyl]-2H-indazol-5-yl}-6-(trifluoromethyl)pyridine-2-carboxamide
19) 5-Fluoro-N-[2-(3-hydroxy-3-methylbutyl)-6-(2-hydroxypropan-2-yl)-2H-indazol-5-yl]-6-methylpyridine-2-carboxamide
20) N-[2-(3-Hydroxy-3-methylbutyl)-6-(2-hydroxypropan-2-yl)-2H-indazol-5-yl]-6-methylpyridine-2-carboxamide
21) 6-(2-Hydroxypropan-2-yl)-N-[6-(2-hydroxypropan-2-yl)-2-(4,4,4-trifluorobutyl)-2H-indazol-5-yl]pyridine-2-carboxamide
22) N-{2-[2-(1-Hydroxycyclopropyl)ethyl]-6-(2-hydroxypropan-2-yl)-2H-indazol-5-yl}-6-(trifluoromethyl)pyridine-2-carboxamide, for use in the treatment and/or prophylaxis of allergic and/or inflammatory diseases in animals.

The invention further provides compounds of the general formula (III)

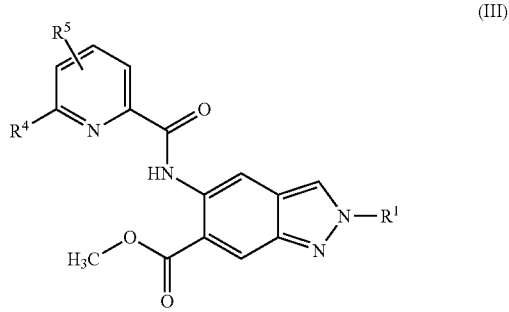

(III)

in which
$R^1$ is 4,4,4-trifluorobutyl, 3-hydroxy-3-methylbutyl, 3-methoxypropyl, 3-hydroxypropyl, 3-hydroxybutyl, 3-hydroxy-2-methylpropyl, 3-hydroxy-2,2-dimethylpropyl, 3-trifluoromethoxypropyl, 2-methoxyethyl, 2-hydroxyethyl, 2-(methylsulphonyl)ethyl, 3-(methylsulphonyl)propyl or 2-(1-hydroxycyclopropyl)ethyl;
$R^4$ is difluoromethyl, trifluoromethyl or methyl; and
$R^5$ is hydrogen or fluorine;
and the diastereomers, enantiomers, metabolites, salts, solvates or solvates of the salts thereof,
for use in the treatment and/or prophylaxis of allergic and/or inflammatory diseases in animals.

Preference is especially given to the following compounds of the general formula (III):
methyl 5-{[(5-fluoro-6-methylpyridin-2-yl)carbonyl]amino}-2-(3-hydroxy-3-methylbutyl)-2H-indazole-6-carboxylate and methyl 2-(3-hydroxy-3-methylbutyl)-5-({[6-(trifluoromethyl)pyridin-2-yl]carbonyl}amino)-2H-indazole-6-carboxylate, for use in the treatment and/or prophylaxis of allergic and/or inflammatory diseases in animals.

The compounds of the general formula (III) are suitable for preparation of a portion of the compounds of the general formula (I).

Furthermore, the compounds of the general formula (III) are inhibitors of interleukin-1 receptor associated kinase-4 (IRAK4).

Compounds of the general formula (III) can be prepared from compounds of the general formula (II)

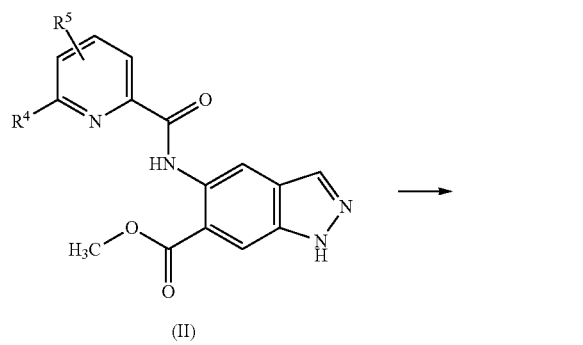

(II)

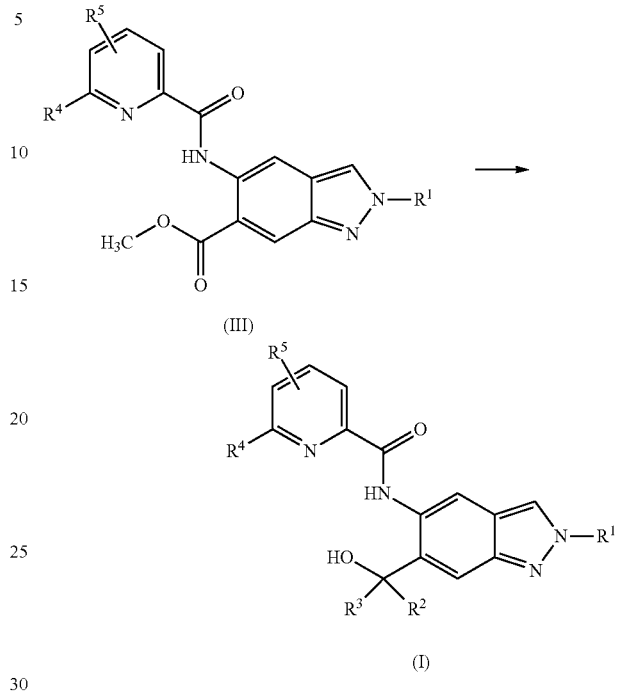

in which

R$^1$ is 4,4,4-trifluorobutyl, 3-hydroxy-3-methylbutyl, 3-methoxypropyl, 3-hydroxypropyl, 3-hydroxy-2-methylpropyl, 3-hydroxy-2,2-dimethylpropyl, 3-trifluoromethoxypropyl, 2-methoxyethyl, 2-hydroxyethyl, 2-(methylsulphonyl)ethyl, 3-(methylsulphonyl)propyl or 2-(1-hydroxycyclopropyl)ethyl;

R$^4$ is difluoromethyl, trifluoromethyl or methyl; and

R$^5$ is hydrogen or fluorine;

by the reaction of (II) with appropriately substituted alkyl halides or alkyl 4-methylbenzenesulphonates in the presence of potassium carbonate.

Further, compounds of the general formula (I) can be prepared from compounds of the formula (III)

(III)

(I)

in which

R$^1$ is 4,4,4-trifluorobutyl, 3-hydroxy-3-methylbutyl, 3-hydroxybutyl, 3-methoxypropyl, 3-hydroxypropyl, 3-hydroxy-2-methylpropyl, 3-hydroxy-2,2-dimethylpropyl, 3-trifluoromethoxypropyl, 2-methoxyethyl, 2-hydroxyethyl, 3-(methylsulphonyl)propyl 2-(1-hydroxycyclopropyl)ethyl;

R$^2$ and R$^3$ are methyl;

R$^4$ is difluoromethyl, trifluoromethyl or methyl; and

R$^5$ is hydrogen or fluorine;

by a Grignard reaction with methylmagnesium bromide.

The present compounds act as inhibitors of IRAK4 kinase and have an unforeseeable useful pharmacological activity spectrum.

Further preference is given to compounds of the formula (I), or the compounds particularly mentioned above, for use in the treatment and/or prophylaxis of allergic and/or inflammatory diseases in domestic animals, particularly in cats and dogs, and more particularly in dogs.

The term "domestic animals" in this context includes, for example, mammals, such as hamsters, guinea pigs, rats, mice, chinchillas, ferrets or in particular dogs, cats; cage birds; reptiles; amphibians or aquarium fish.

Further preference is given to compounds of the formula (I), or the compounds particularly mentioned above, for use in the treatment and/or prophylaxis of allergic dermatitis in domestic animals, particularly canine and feline allergic dermatitis, and more particularly canine allergic dermatitis.

Further preference is given to compounds of the formula (I), or the compounds particularly mentioned above, for use in the treatment and/or prophylaxis of allergic and/or inflammatory diseases in farm animals, particularly in sheep, goats, horses, cattle and pigs, and more particularly in cattle and pigs.

The term "farm animals" in this context includes, for example, mammals, such as horses, sheep, goats, buffaloes, reindeers, fallow deers or in particular cattle or pigs.

Further preference is given to compounds of the formula (I), or the compounds particularly mentioned above, for use in a method for treatment and/or prophylaxis of atopic dermatitis, Flea Allergy Dermatitis, inflammatory bowel disease, osteoarthritis and inflammatory pain, non-infectious recurrent airway disease, insect hypersensitivity, asthma, respiratory disease, mastitis and endometritis in animals, particularly of atopic dermatitis and Flea Allergy Dermatitis.

Particular preference is given to compounds of the formula (I), or the compounds particularly mentioned above, for use in a method for treatment and/or prophylaxis of Canine Atopic Dermatitis, Flea Allergy Dermatitis in dogs or cats, inflammatory bowel disease in dogs or cats, osteoarthritis and inflammatory pain in dogs, cats, horses or cattle, non-infectious recurrent airway disease in horses, insect hypersensitivity in horses, feline asthma, bovine respiratory disease, mastitis in cattle, endometritis in cattle, and swine respiratory disease.

Very particular preference is given to compounds of the formula (I), or the compounds particularly mentioned above, for use in a method for treatment and/or prophylaxis of Canine Atopic Dermatitis and Flea Allergy Dermatitis in dogs or cats, more particularly in dogs.

Further very particular preference is given to compounds of the formula (I), or the compounds particularly mentioned above, for use in a method for treatment and/or prophylaxis of osteoarthritis and inflammatory pain in cattle, bovine respiratory disease, mastitis in cattle, endometritis in cattle, and swine respiratory disease.

With regard to the compounds of formula (III), further preference is given to compounds of the formula (III) for use in the treatment and/or prophylaxis of allergic and/or inflammatory diseases in domestic animals, particularly in cats and dogs, and more particularly in dogs.

Further preference is given to compounds of the formula (III) for use in the treatment and/or prophylaxis of allergic dermatitis in domestic animals, particularly canine and feline allergic dermatitis, and more particularly canine allergic dermatitis.

Further preference is given to compounds of the formula (III) for use in the treatment and/or prophylaxis of allergic and/or inflammatory diseases in farm animals, particularly in sheep, goats, horses, cattle and pigs, and more particularly in cattle and pigs.

Further preference is given to compounds of the formula (III) for use in a method for treatment and/or prophylaxis of atopic dermatitis, Flea Allergy Dermatitis, inflammatory bowel disease, osteoarthritis and inflammatory pain, non-infectious recurrent airway disease, insect hypersensitivity, asthma, respiratory disease, mastitis and endometritis in animals, particularly of atopic dermatitis and Flea Allergy Dermatitis.

Particular preference is given to compounds of the formula (III) for use in a method for treatment and/or prophylaxis of Canine Atopic Dermatitis, Flea Allergy Dermatitis in dogs or cats, inflammatory bowel disease in dogs or cats, osteoarthritis and inflammatory pain in dogs, cats, horses or cattle, non-infectious recurrent airway disease in horses, insect hypersensitivity in horses, feline asthma, bovine respiratory disease, mastitis in cattle, endometritis in cattle, and swine respiratory disease.

Very particular preference is given to compounds of the formula (III) for use in a method for treatment and/or prophylaxis of Canine Atopic Dermatitis and Flea Allergy Dermatitis in dogs or cats, more particularly in dogs.

Further very particular preference is given to compounds of the formula (III) for use in a method for treatment and/or prophylaxis of osteoarthritis and inflammatory pain in cattle, bovine respiratory disease, mastitis in cattle, endometritis in cattle, and swine respiratory disease.

By way of example, compound examples 11, 12, 13, 19 (as shown below) have been evaluated in an in vitro IRAK4 TR-FRET assay detailed below using recombinant canine IRAK4 enzyme. IC50 values of each compound have been calculated for the inhibition of canine IRAK4. Example Compounds (11, 12, 13, 19) have been identified as being useful in the treatment of allergic skin diseases in animals, particularly dogs and cats, such as atopic dermatitis and Flea Allergy Dermatitis. Example compounds 11, 12, 13, 19 were each potent inhibitors of canine IRAK4 with IC50 values of 1.7, 9.2, 2.2, 7.6 nM, respectively. The IC50 values for each of these compound examples were also similar to the IC50 values calculated for inhibition of human IRAK4.

Figure 7:
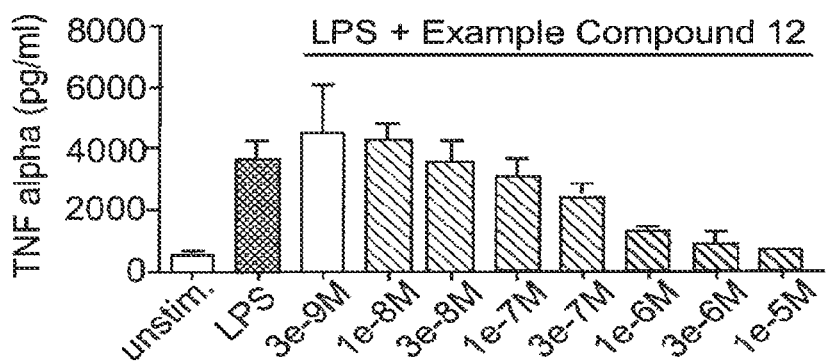

As a further example, example compound 12 has also been evaluated in an in vitro assay to establish the effects of compounds on lipopolysaccharide (LPS)-induced cytokine production by canine peripheral blood mononuclear cells (PBMCs). Example compound 12 inhibited the production of the pro-inflammatory cytokine Tumor Necrosis factor alpha (TNFα) by canine PBMCs induced by LPS, in a concentration-related manner. PBMCs include cell types such as dendritics cells, T and B lymphocytes, as well as monocytes each of which are implicated in atopic dermatitis and TNFα is elevated in atopic dermatitis patients (Sumimoto et al, Archives of Disease in Childhood, 1992). This example is also illustrated by FIG. 7.

Hence, the present compounds demonstrate inhibition of recombinant canine IRAK4 enzyme and cytokine production by canine PBMCs indicating the potential therapeutic benefit of such compound examples in Canine Atopic Dermatitis and Flea Allergy Dermatitis.

Figure 11:
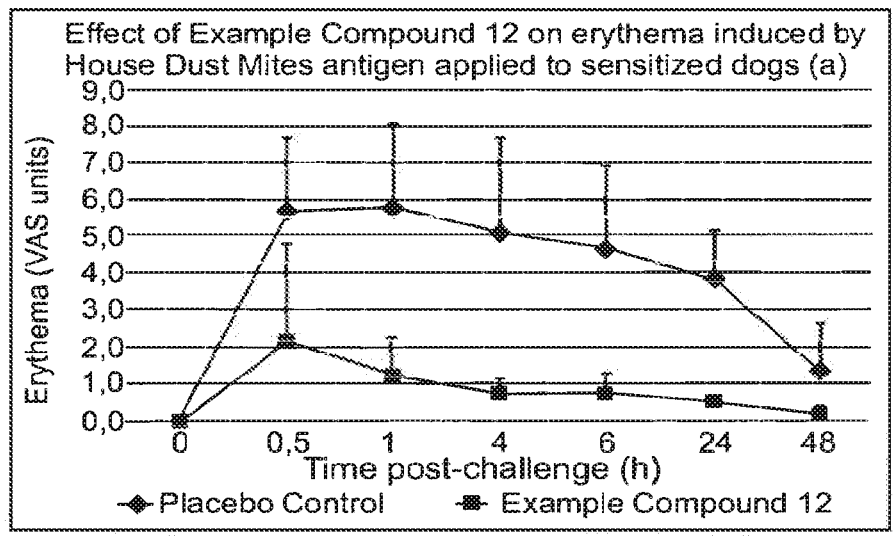
Figure 12:
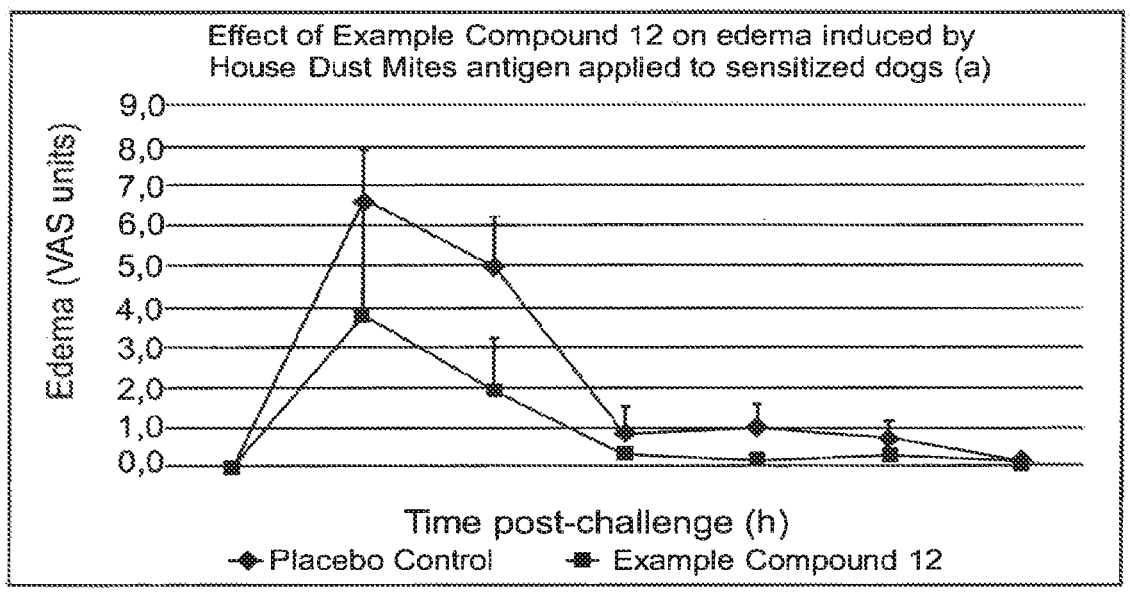

In addition, example compound 12 has also been evaluated in vivo in a further study to establish the effects of compounds in the treatment of clinical signs associated with canine allergic dermatitis, particularly Canine Atopic Dermatitis (CAD), in a House Dust Mite model. Example compound 12 significantly reduced clinical signs of CAD like skin edema and erythema. This example is also illustrated by FIGS. 11 and 12.

Figure 13:
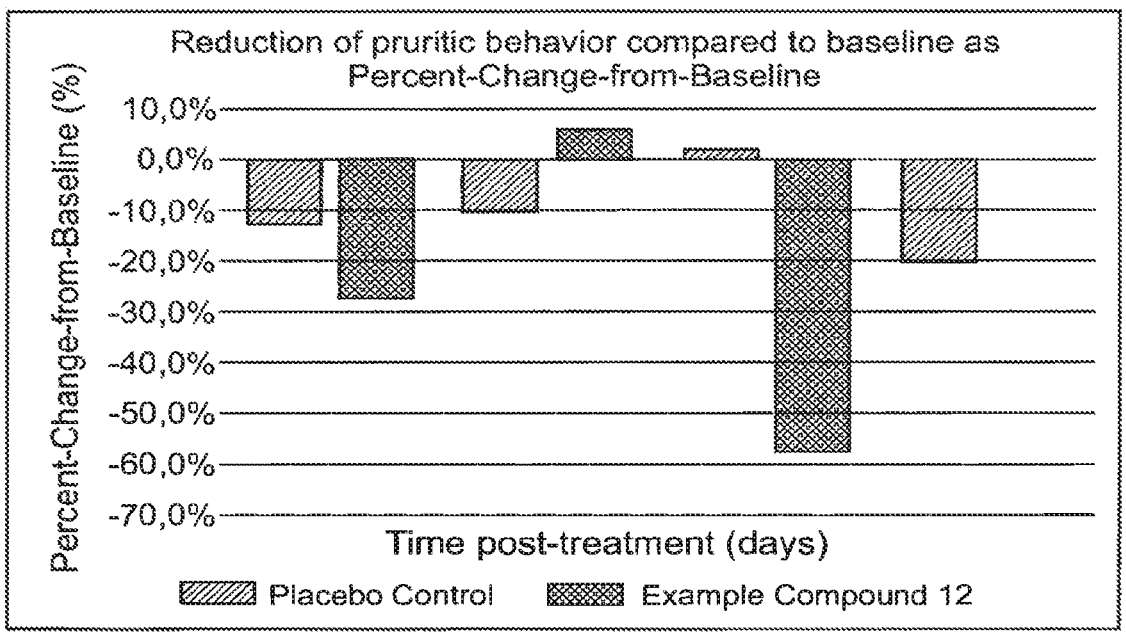

Hence, the present compounds demonstrate reduction of characteristic clinical signs of canine allergic dermatitis, therefore indicating a therapeutic benefit of such compound examples in canine allergic dermatitis, particularly in Canine Atopic Dermatitis (CAD). Also, example compound 12 has been evaluated in an in vivo model of canine Flea Allergy Dermatitis (FAD) to establish the anti-pruritic effects of compounds. Treatment with Example compound 12 substantially reduced pruritus associated with allergic diseases like Flea Allergy Dermatitis. This example is also illustrated by FIG. 13.

Hence, the present compounds demonstrate reduction of associated pathognomonic clinical signs of allergic dermatitis as skin inflammation and pruritus therefore indicating a therapeutic benefit of such compound examples in canine allergic dermatitis, particularly in Flea Allergy Dermatitis (FAD) and Canine Atopic Dermatitis (CAD).

The term "canine allergic dermatitis" in this context includes particularly Canine Atopic Dermatitis (CAD) and Flea Allergy Dermatitis (FAD).

Figure 8:
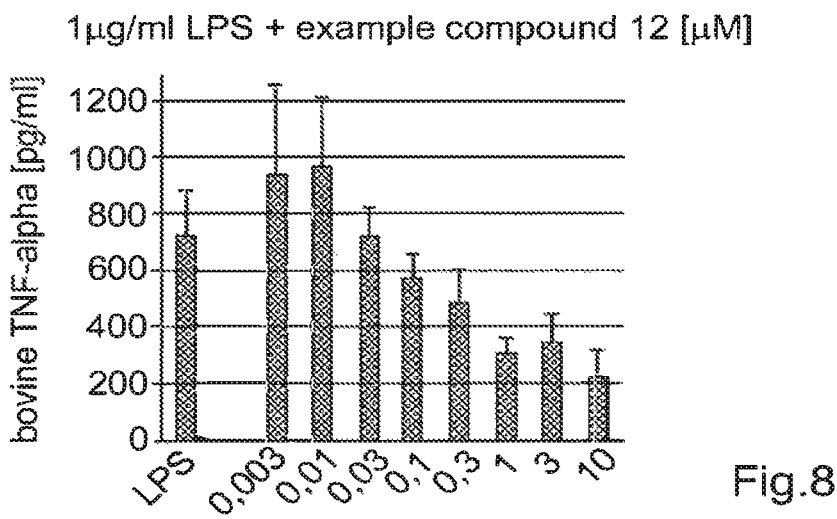
Figure 9:
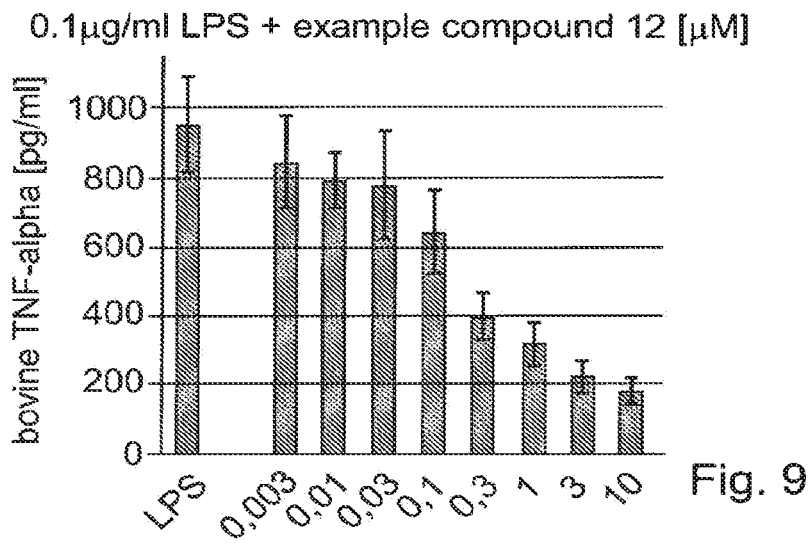

As a further example, example compound 12 has also been evaluated in an ex vivo assay to establish the effects of compounds on lipopolysaccharide (LPS)-induced cytokine production by bovine peripheral blood mononuclear cells (PBMCs). Example compound 12 inhibited the production of the pro-inflammatory cytokine Tumor Necrosis factor alpha (TNFα) by bovine PBMCs induced by LPS, in a concentration-related manner. PBMCs include cell types such as dendritic cells, T and B lymphocytes, as well as monocytes each of which are implicated in inflammatory and infectious diseases with overshooting pro-inflammatory immune response such as respiratory diseases (Sterner-Kock, Haider, et al., Tropical Animal Health and Production, 2016), enteric diseases (Pan, Rostagnio, et al., Veterinary Immunology and Immunopathology, 2015), and mastitis (Zheng, Xu, et al., Free Radical Biology and Medicine, 2016) in which TNFα is elevated in these patients. This example is also illustrated by FIGS. 8 and 9.

Hence, the present compounds demonstrate inhibition of cytokine production by bovine PBMCs indicating the potential therapeutic benefit of such compound examples in inflammatory and/or infectious diseases such as respiratory diseases, enteric diseases and mastitis.

Figure 10:
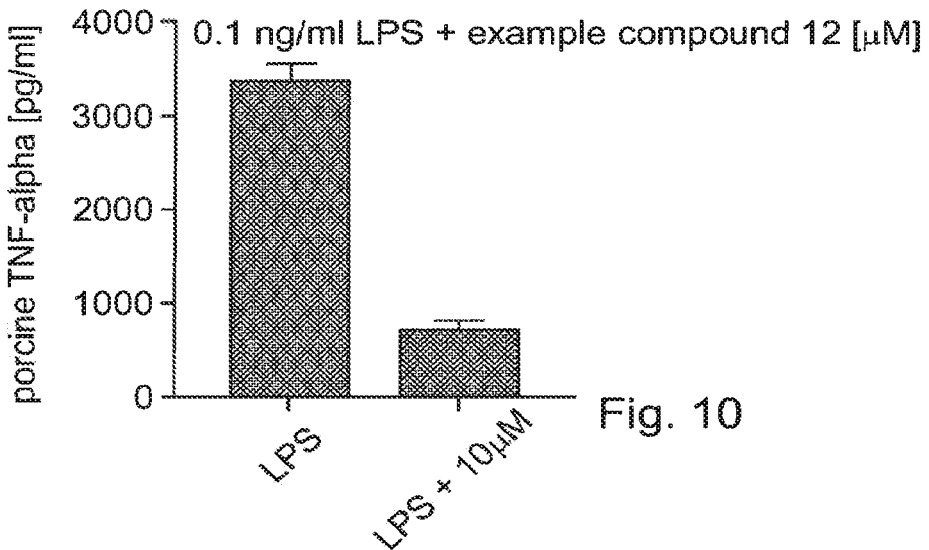

As a further example, example compound 12 has also been evaluated in an ex vivo assay to establish the effects of compounds on lipopolysaccharide (LPS)-induced cytokine production by porcine peripheral blood mononuclear cells (PBMCs). Example compound 12 inhibited the production of the pro-inflammatory cytokine Tumor Necrosis factor alpha (TNFα) by porcine PBMCs induced by LPS. PBMCs include cell types such as dendritic cells, T and B lymphocytes, as well as monocytes each of which are implicated in inflammatory and infectious diseases with overshooting pro-inflammatory immune response such as respiratory diseases and enteric diseases in which TNFα is elevated in these patients. This example is also illustrated by FIG. 10.

Hence, the present compounds demonstrate inhibition of cytokine production by porcine PBMCs indicating the potential therapeutic benefit of such compound examples in inflammatory and/or infectious diseases such as respiratory diseases and enteric diseases.

The prophylaxis and/or treatment of pruritus and pain, especially of acute, chronic, inflammatory and neuropathic pain in animals, is also provided by the present compounds.

In addition, the present compounds are suitable for the treatment and/or prophylaxis of pain disorders, especially of acute, chronic, inflammatory and neuropathic pain in animals. This preferably includes hyperalgesia, allodynia, pain from arthritis (such as osteoarthritis, rheumatoid arthritis and spondyloarthritis), premenstrual pain, endometriosis-associated pain, post-operative pain, pain from interstitial cystitis, CRPS (complex regional pain syndrome), trigeminal neuralgia, pain from prostatitis, pain caused by spinal cord injuries, inflammation-induced pain, lower back pain, cancer pain, chemotherapy-associated pain, HIV treatment-induced neuropathy, burn-induced pain and chronic pain.

The present invention further also provides a method for treatment and/or prevention of disorders in animals, especially the disorders mentioned above, using an effective amount of at least one of the presented compounds.

Preference is given to a method for treatment and/or prevention of allergic and/or inflammatory diseases in animals by administering an effective amount of at least a compound of the present formula (I) as defined above to an animal in need thereof.

In the context of the present invention, the term "treatment" or "treating" includes inhibition, retardation, checking, alleviating, attenuating, restricting, reducing, suppressing, repelling or healing of a disease, a condition, a disorder, an injury or a health problem, or the development, the course or the progression of such states and/or the symptoms of such states. The term "therapy" is understood here to be synonymous with the term "treatment".

The terms "prevention", "prophylaxis" and "preclusion" are used synonymously in the context of the present invention and refer to the avoidance or reduction of the risk of contracting, experiencing, suffering from or having a disease, a condition, a disorder, an injury or a health problem, or a development or advancement of such states and/or the symptoms of such states.

The treatment or prevention of a disease, a condition, a disorder, an injury or a health problem may be partial or complete.

The present compounds can be used alone or, if required, in combination with other active ingredients. The present invention further provides medicaments containing at least one of the present compounds and one or more further active ingredients, for treatment and/or prevention of allergic and/or inflammatory diseases in animals. Preferred examples of active ingredients suitable for combinations include:

General mention may be made of active ingredients such as antibacterial (e.g. penicillins, vancomycin, ciprofloxacin), antiviral (e.g. aciclovir, oseltamivir) and antimycotic (e.g. naftifin, nystatin) substances and gamma globulins, immunomodulatory and immunosuppressive compounds such as cyclosporin, Methotrexat®, TNF antagonists (e.g. Humira®, Etanercept, Infliximab), IL-1 inhibitors (e.g. Anakinra, Canakinumab, Rilonacept), phosphodiesterase inhibitors (e.g. Apremilast), Jak/STAT inhibitors (e.g. Tofacitinib, Baricitinib, GLPG0634), leflunomid, cyclophosphamide, rituximab, belimumab, tacrolimus, rapamycin, mycophenolate mofetil, interferons, corticosteroids (e.g. prednisone, prednisolone, methylprednisolone, hydrocortisone, betamethasone), cyclophosphamide, azathioprine and sulfasalazine; paracetamol, non-steroidal anti-inflammatory substances (NSAIDS) (aspirin, ibuprofen, naproxen, etodolac, celecoxib, colchicine).

In addition to those mentioned above, the inventive IRAK4 inhibitors can also be combined with the following active ingredients:

substances for treatment of pulmonary disorders, for example beta-2-sympathomimetics (e.g. salbutamol), anticholinergics (e.g. glycopyrronium), methylxanthines (e.g. theophylline), leukotriene receptor antagonists (e.g. montelukast), PDE-4 (phosphodiesterase type 4) inhibitors (e.g. roflumilast), methotrexate, IgE antibodies, azathioprine and cyclophosphamide, cortisol-containing preparations; substances for treatment of osteoarthritis such as non-steroidal anti-inflammatory substances (NSAIDs). In addition to the two therapies mentioned, methotrexate and biologics for B-cell and T-cell therapy (e.g. rituximab, abatacept) should be mentioned for rheumatoid disorders, for example rheumatoid arthritis, spondyloarthritis and juvenile idiopathic arthritis. Neurotrophic substances such as acetylcholinesterase inhibitors (e.g. donepezil), MAO (monoaminooxidase) inhibitors (e.g. selegiline), interferons und anticonvulsives (e.g. gabapentin); active ingredients for treatment of cardiovascular disorders such as beta-blockers (e.g. metoprolol), ACE inhibitors (e.g. benazepril), angiotensin receptor blockers (e.g. losartan, valsartan), diuretics (e.g. hydrochlorothiazide), calcium channel blockers (e.g. nifedipine), statins (e.g. simvastatin, fluvastatin); anti-diabetic drugs, for example metformin, glinides (e.g. nateglinide), DPP-4 (dipeptidyl peptidase-4) inhibitors (e.g. linagliptin, saxagliptin, sitagliptin, vildagliptin), SGLT2 (sodium/glucose cotransporter 2) inhibitors/gliflozin (e.g. dapagliflozin, empagliflozin), incretin mimetics (hormone glucose-dependent insulinotropic peptide (GIP) and glucagon-like peptid 1 (GLP-1)

analogues/agonists) (e.g. exenatide, liraglutide, lixisenatide), α-glucosidase inhibitors (e.g. acarbose, miglitol, voglibiose) and sulphonylureas (e.g. glibenclamide, tolbutamide), insulin sensitizers (e.g. pioglitazone), insulin therapy (e.g. NPH insulin, insulin lispro) Active ingredients such as mesalazine, sulfasalazine, azathioprine, 6-mercaptopurine or methotrexate, probiotic bacteria (Mutaflor, VSL #3®, *Lactobacillus* GG, *Lactobacillus plantarum*, *L. acidophilus*, *L. casei*, *Bifidobacterium infantis* 35624, *Enterococcus fecium* SF68, *Bifidobacterium longum*, *Escherichia coli* Nissle 1917), antibiotics, for example ciprofloxacin and metronidazole, anti-diarrhoea drugs, for example loperamide, or laxatives (bisacodyl) for treatment of chronic inflammatory bowel diseases. Immunosuppressants such as glucocorticoids and non-steroidale anti-inflammatory substances (NSAIDs), cortisone, chloroquine, cyclosporine, azathioprine, belimumab, rituximab, cyclophosphamide for treatment of lupus erythematosus. Vitamin D3 analogues, for example calcipotriol, tacalcitol or calcitriol, salicylic acid, urea, ciclosporine, methotrexate, efalizumab for dermatological disorders.

Mention should also be made of medicaments comprising at least one of the present compounds and one or more further active ingredients for the inventive use, especially EP4 inhibitors (prostaglandin E2 receptor 4 inhibitors), P2X3 inhibitors (P2X purinoceptor 3), PTGES inhibitors (prostaglandin E synthase inhibitors) or AKR1C3 inhibitors (aldo-keto reductase family 1 member C3 inhibitors), for treatment and/or prevention of the aforementioned disorders.

The present compounds can act systemically and/or locally. For this purpose, they can be administered in a suitable manner, for example by the oral, parenteral, pulmonal, nasal, sublingual, lingual, buccal, rectal, dermal, transdermal or conjunctival route, via the ear or as an implant or stent.

The present compounds can be administered in administration forms suitable for these administration routes.

Suitable administration forms for oral administration are those which work according to the prior art and release the present compounds rapidly and/or in a modified manner and which contain the present compounds in crystalline and/or amorphous and/or dissolved form, for example tablets (uncoated or coated tablets, for example with gastric juice-resistant or retarded-dissolution or insoluble coatings which control the release of the present compound), tablets or films/oblates which disintegrate rapidly in the oral cavity, films/lyophilizates, capsules (for example hard or soft gelatin capsules), sugar-coated tablets, chewables (for example soft chewables), granules, pellets, powders, emulsions, suspensions, aerosols or solutions.

Parenteral administration can be accomplished with avoidance of a resorption step (for example by an intravenous, intraarterial, intracardiac, intraspinal or intralumbar route) or with inclusion of a resorption (for example by an intramuscular, subcutaneous, intracutaneous, percutaneous or intraperitoneal route). Administration forms suitable for parenteral administration include preparations for injection and infusion in the form of solutions, suspensions, emulsions, lyophilizates or sterile powders.

For the other administration routes, suitable examples are inhalable medicament forms (including powder inhalers, nebulizers), nasal drops, solutions or sprays, tablets, films/oblates or capsules for lingual, sublingual or buccal administration, suppositories, ear or eye preparations, vaginal capsules, aqueous suspensions (lotions, shaking mixtures), lipophilic suspensions, ointments, creams, pour-ons, transdermal therapeutic systems (e.g. patches), milk, pastes, foams, sprinkling powders, implants or stents.

Preference is given to oral or parenteral administration, especially oral administration.

The present compounds can be converted to the administration forms mentioned. This can be accomplished in a manner known per se by mixing with inert, nontoxic, pharmaceutically suitable excipients. These excipients include carriers (for example microcrystalline cellulose, lactose, mannitol), solvents (e.g. liquid polyethylene glycols), emulsifiers and dispersing or wetting agents (for example sodium dodecylsulphate, polyoxysorbitan oleate), binders (for example polyvinylpyrrolidone), synthetic and natural polymers (for example albumin), stabilizers (e.g. antioxidants, for example ascorbic acid), colorants (e.g. inorganic pigments, for example iron oxides) and flavour and/or odour correctants.

The present invention further provides medicaments which comprise at least one present compound, typically together with one or more inert, nontoxic, pharmaceutically suitable excipients, for use in a method for treatment and/or prophylaxis of allergic and/or inflammatory diseases in animals.

In general, it has been found to be advantageous in the case of parenteral administration to administer amounts of about 0.001 to 1 mg/kg, preferably about 0.01 to 0.5 mg/kg, of body weight to achieve effective results. In the case of oral administration the dosage is about 0.01 to 100 mg/kg, preferably about 0.01 to 20 mg/kg and most preferably 0.1 to 10 mg/kg of body weight.

It may nevertheless be necessary in some cases to deviate from the stated amounts, specifically as a function of the body weight, route of administration, individual response to the active ingredient, nature of the preparation and time or interval over which administration takes place. Thus in some cases it may be sufficient to manage with less than the abovementioned minimum amount, while in other cases the upper limit mentioned must be exceeded. In the case of administration of greater amounts, it may be advisable to divide them into several individual doses over the day.

The working examples which follow illustrate the invention. The invention is not restricted to the examples.

Unless stated otherwise, the percentages in the tests and examples which follow are percentages by weight; parts are parts by weight. Solvent ratios, dilution ratios and concentration data for the liquid/liquid solutions are based in each case on volume.

PREPARATION OF THE COMPOUNDS

The preparation of the present compounds is illustrated by the synthesis schemes which follow.

Starting materials used for synthesis of the present compounds are carboxylic acids (Intermediate V3), which are commercially available or can be prepared by routes known from the literature or analogously to routes known from the literature (see, for example, European Journal of Organic Chemistry 2003, 8, 1559-1568, Chemical and Pharmaceutical Bulletin, 1990, 38, 9, 2446-2458, Synthetic Communications 2012, 42, 658-666, Tetrahedron, 2004, 60, 51, 11869-11874) (see, for example, Synthesis Scheme 1). Some carboxylic acids V3 can be prepared proceeding from carboxylic esters (Intermediate V2) by hydrolysis (cf., for example, the reaction of ethyl 6-(hydroxymethyl)pyridine-2-carboxylate with aqueous sodium hydroxide solution in methanol, WO2004113281) or—in the case of a tert-butyl ester—by reaction with an acid, for example hydrogen chloride or trifluoroacetic acid (cf., for example, Dalton Transactions, 2014, 43, 19, 7176-7190). The carboxylic acids V3 can also be used in the form of their alkali metal salts. The Intermediates V2 can optionally also be prepared from the Intermediates V1 which bear a chlorine, bromine or iodine as substituent $X^1$ by reaction in a carbon monoxide atmosphere, optionally under elevated pressure, in the presence of a phosphine ligand, for example 1,3-bis(diphenylphosphino)propane, a palladium compound, for example palladium(II) acetate, and a base, for example triethylamine, with addition of ethanol or methanol in a solvent, for example dimethyl sulphoxide (for preparation methods see, for example, WO2012112743, WO 2005082866, Chemical Communications (Cambridge, England), 2003, 15, 1948-1949, WO200661715). The Intermediates V1 are either commercially available or can be prepared by routes known from the literature. Illustrative preparation methods are detailed in WO 2012061926, European Journal of Organic Chemistry, 2002, 2, 327-330, Synthesis, 2004, 10, 1619-1624, Journal of the American Chemical Society, 2013, 135, 32, 12122-12134, Bioorganic and Medicinal Chemistry Letters, 2014, 24, 16, 4039-4043, US2007185058, WO2009117421.

Synthesis Scheme 1

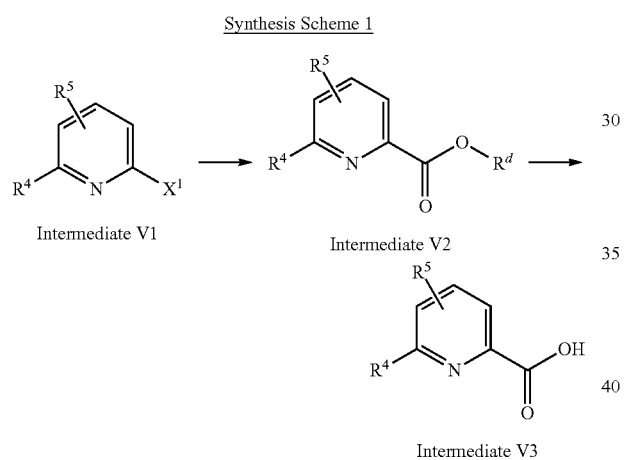

Intermediate V1

Intermediate V2

Intermediate V3

$X^1$ is chlorine, bromine or iodine.
$R^d$ is methyl, ethyl, benzyl or tert-butyl.
$R^4$, $R^5$ are each as defined in the general formula (I).

Methyl 5-amino-1H-indazole-6-carboxylate (Intermediate 2) can be obtained proceeding from methyl 1H-indazole-6-carboxylate (Intermediate 0) according to Synthesis Scheme 2 by nitration and reduction of the nitro group of Intermediate 1 with hydrogen in the presence of palladium on charcoal analogously to WO 2008/001883. For preparation of the Intermediates 3 proceeding from Intermediate 2, it is possible to use various coupling reagents known from the literature (Amino Acids, Peptides and Proteins in Organic Chemistry, Vol. 3—Building Blocks, Catalysis and Coupling Chemistry, Andrew B. Hughes, Wiley, Chapter 12—Peptide-Coupling Reagents, 407-442; Chem. Soc. Rev., 2009, 38, 606). For example, it is possible to use 1-(3-dimethylaminopropyl)-3-ethylcarbodiimide hydrochloride in combination with 1-hydroxy-1H-benzotriazole hydrate (HOBt, WO2012107475; Bioorg. Med. Chem. Lett., 2008, 18, 2093), (1H-benzotriazol-1-yloxy)(dimethylamino)-N,N-dimethylmethaniminium tetrafluoroborate (TBTU, CAS 125700-67-6), (dimethylamino)-N,N-dimethyl(3H-[1,2,3]triazolo[4,5-b]pyridin-3-yloxy)methanaminium hexafluorophosphate (HATU, CAS 148893-10-1), propanephosphonic anhydride (as solution in ethyl acetate or DMF, CAS68957-94-8) or di-1H-imidazol-1-ylmethanone (CDI) as coupling reagents, with addition of a base such as triethylamine or N-ethyl-N-isopropylpropan-2-amine in each case to the reaction mixture. Preference is given to the use of TBTU and N-ethyl-N-isopropylpropan-2-amine in THF.

Synthesis Scheme 2

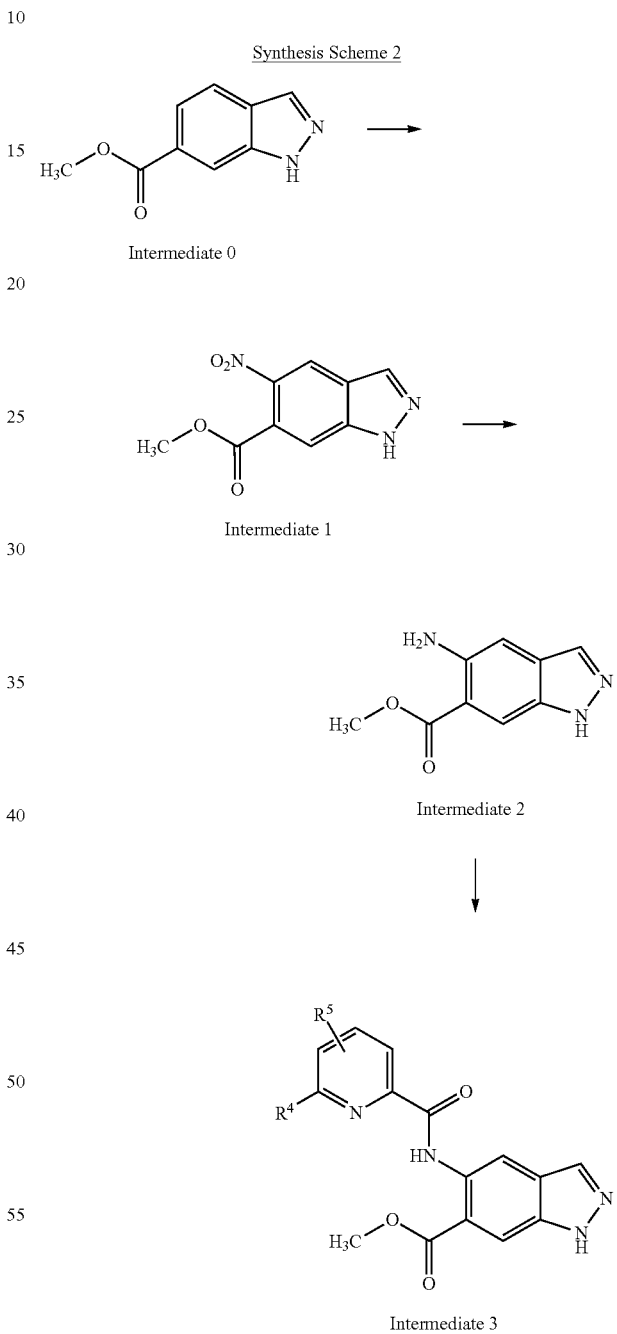

Intermediate 0

Intermediate 1

Intermediate 2

Intermediate 3

The substituents $R^4$, $R^5$ are each as defined in the general formula (I).

Proceeding from the Intermediates 3, it is possible to prepare 2-substituted indazole derivatives (Intermediate 4) (see synthesis scheme 3). Useful reactions for this purpose include those with optionally substituted alkyl chlorides, alkyl bromides, alkyl iodides or alkyl 4-methylbenzenesulphonates. The alkyl halides or alkyl 4-methylbenzenesulphonates used are commercially available or can be prepared analogously to routes known from literature (for the preparation of alkyl 4-methylbenzenesulphonates, one example is the reaction of an appropriate alcohol with 4-methylbenzenesulphonyl chloride in the presence of triethylamine or pyridine; see, for example, Bioorganic and Medicinal Chemistry, 2006, 14, 12 4277-4294). Optionally, in the case of use of alkyl chlorides or alkyl bromides, it is also possible to add an alkali metal iodide such as potassium iodide or sodium iodide. Bases used may, for example, be potassium carbonate, caesium carbonate or sodium hydride. In the case of reactive alkyl halides, it is also possible in some cases to use N-cyclohexyl-N-methylcyclohexanamine. Useful solvents include, for example, 1-methylpyrrolidin-2-one, DMF, DMSO or THF. Optionally, the alkyl halides or alkyl 4-methylbenzenesulphonates used may have functional groups which have optionally been protected with a protecting group beforehand (see also P. G. M. Wuts, T. W. Greene, Greene's Protective Groups in Organic Synthesis, Fourth Edition, ISBN: 9780471697541). If, for example, alkyl halides or alkyl 4-methylbenzenesulphonates having one or more hydroxyl groups are used, these hydroxyl groups may optionally be protected by a tert-butyl(dimethyl)silyl group or a similar silicon-containing protecting group familiar to those skilled in the art. Alternatively, the hydroxyl groups may also be protected by the tetrahydro-2H-pyran (THP) group or by the acetyl or benzoyl group. The protecting groups used can then be detached subsequently to the synthesis of Intermediate 4, or else after the synthesis of (I). If, for example, a tert-butyl(dimethylsilyl) group is used as protecting group, it can be detached using tetrabutylammonium fluoride in a solvent such as THF, for example. A THP protecting group can be detached, for example, using 4-methylbenzenesulphonic acid (optionally in monohydrate form). Acetyl groups or benzoyl groups can be detached by treatment with aqueous sodium hydroxide solution.

Optionally, the alkyl halides or alkyl 4-methylbenzenesulphonates used may contain functional groups which can be converted by oxidation or reduction reactions known to those skilled in the art (see, for example, Science of Synthesis, Georg Thieme Verlag). If, for example, the functional group is a sulphide group, this can be oxidized by methods known in the literature to a sulphoxide or sulphone group. In the case of a sulphoxide group, this can likewise be oxidized to a sulphone group. For these oxidation steps, it is possible to use, for example, 3-chloroperbenzoic acid (CAS 937-14-4) (in this regard, see also, for example, US201094000 for the oxidation of a 2-(methylsulphanyl)ethyl-1H-pyrazole derivative to a 2-(methylsulphinyl)ethyl-1H-pyrazole derivative and the oxidation of a further 2-(methylsulphanyl) ethyl-1H-pyrazole derivative to a 2-(methylsulphonyl)ethyl-1H-pyrazole derivative). If the alkyl halides or tosylates used contain a keto group, this can be reduced by reduction methods known to those skilled in the art to an alcohol group (see, for example, Chemische Berichte, 1980, 113, 1907-1920 for the use of sodium borohydride). These oxidation or reduction steps can be effected subsequently to the synthesis of Intermediate 4, or else after the synthesis of the present compounds of the general formula (I). Alternatively, Intermediate 4 can be prepared via Mitsunobu reaction (see, for example, K. C. K. Swamy et. al. Chem. Rev. 2009, 109, 2551-2651) of Intermediate 3 with optionally substituted alkyl alcohols. It is possible to utilize various phosphines such as triphenylphosphine, tributylphosphine or 1,2-diphenylphosphinoethane in combination with diisopropyl azodicarboxylate (CAS 2446-83-5) or further diazene derivatives mentioned in the literature (K. C. K. Swamy et. al. Chem. Rev. 2009, 109, 2551-2651). Preference is given to the use of triphenylphosphine and diisopropyl azodicarboxylate. If the alkyl alcohol bears a functional group it is possible—as in the case of the abovementioned reactions with alkyl halides—for known protecting group strategies (further pointers can be found in P. G. M. Wuts, T. W. Greene, Greene's Protective Groups in Organic Synthesis, Fourth Edition, ISBN: 9780471697541) and—as in the case of the abovementioned reactions with alkyl halides—for oxidation or reduction steps to be effected correspondingly to the synthesis of Intermediate 4, or else after the synthesis of the present compounds of the general formula (I). Proceeding from Intermediate 4, present compounds of the general formula (I) where $R^2$ and $R^3$ are defined as $C_1$-$C_6$-alkyl (where $R^2$ and $R^3$ have the same definition) may be obtained by a Grignard reaction (cf., for example, the reaction of a methyl 1H-indazole-6-carboxylate derivative with methylmagnesium bromide in EP 2489663). For the Grignard reaction, it is possible to use alkylmagnesium halides. Particular preference is given to methylmagnesium chloride or methylmagnesium bromide in THF or diethyl ether, or else in mixtures of THF and diethyl ether. Alternatively, proceeding from Intermediate 4, present compounds of the general formula (I) where $R^2$ and $R^3$ are defined as $C_1$-$C_6$-alkyl (where $R^2$ and $R^3$ have the same definition) may be obtained by a reaction with an alkyllithium reagent (cf., for example, the reaction of a methyl 2-amino-4-chloro-1-methyl-1H-benzimidazole-7-carboxylate derivative with isopropyllithium or tert-butyllithium in WO2006116412). Proceeding from Intermediate 4, it is possible to prepare present compounds of the general formula (I) where $R^2$ and $R^3$ are defined as H by reduction with lithium aluminium hydride in THF, lithium borohydride in THF or sodium borohydride in THF, optionally with addition of methanol, or mixtures of lithium borohydride and sodium borohydride.

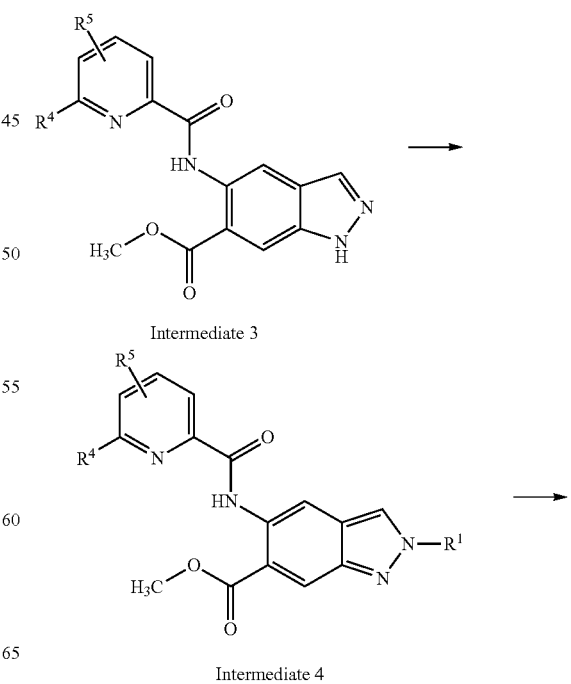

Synthesis Scheme 3

Intermediate 3

Intermediate 4

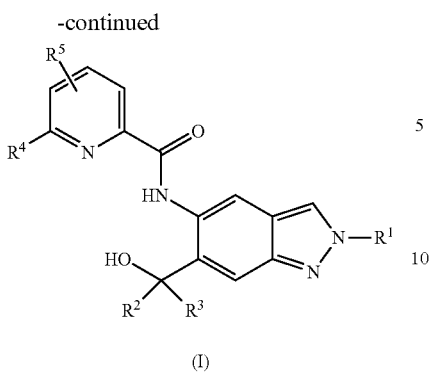

(I)

The substituents $R^1$, $R^2$, $R^3$, $R^4$, $R^5$ are each as defined in the general formula (I).

Proceeding from Intermediate 3, Intermediate 5 where $R^2$ and $R^3$ are defined as $C_1$-$C_6$-alkyl (where $R^2$ and $R^3$ have the same definition) may be obtained by a Grignard reaction (cf., for example, Synthesis Scheme 4). For this purpose, it is possible to use suitable alkylmagnesium halides, for example methylmagnesium chloride or methylmagnesium bromide in THF or in diethyl ether or else in mixtures of THF and diethyl ether.

Proceeding from Intermediate 5, it is then possible to prepare a portion (I-a) of the present compounds (I) where $R^2$ and $R^3$ are defined as $C_1$-$C_6$-alkyl (where $R^2$ and $R^3$ have the same definition). For this purpose, analogously to Synthesis Scheme 3 (preparation of Intermediate 3), useful reactions are those of Intermediate 5 with optionally substituted alkyl chlorides, alkyl bromides, alkyl iodides or alkyl 4-methylbenzenesulphonates. It is possible to use protecting group strategies analogously to those described in Synthesis Scheme 3.

Alternatively, for preparation of a portion (I-a) of the present compounds (I) where $R^2$ and $R^3$ are defined as $C_1$-$C_6$-alkyl (where $R^2$ and $R^3$ have the same definition), it is possible to use the Mitsunobu reaction of Intermediate 5 with optionally substituted alkyl alcohols (analogously to Synthesis Scheme 3).

If $R^1$ in the compounds of the formula (I-a) includes a suitable functional group, it is optionally possible subsequently, in analogy to Synthesis Scheme 3, to use oxidation or reduction reactions for preparation of further present compounds.

Synthesis Scheme 4

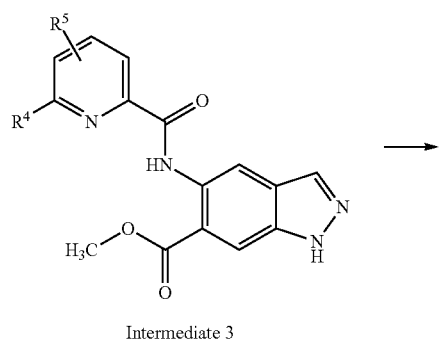

Intermediate 3

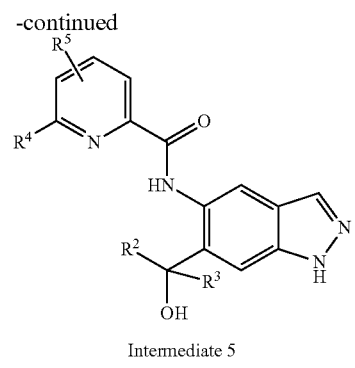

Intermediate 5

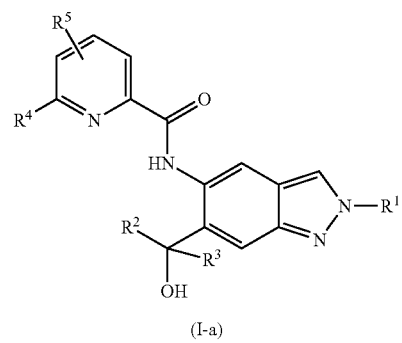

(I-a)

The substituents $R^1$, $R^4$, $R^5$ are each as defined in the general formula (I). $R^2$ and $R^3$ always have the same definition and are both $C_1$-$C_6$-alkyl.

Proceeding from Intermediate 1, it is possible to prepare Intermediate 4 in an alternative manner (see Synthesis Scheme 5). First of all, Intermediate 1 is converted to Intermediate 6 by methods as in Synthesis Scheme 3 (preparation of Intermediate 4 from Intermediate 3).

Intermediate 6 can then be converted to Intermediate 7 by reduction of the nitro group. For example, the nitro group can be reduced with palladium on carbon under a hydrogen atmosphere (cf., for example, WO2013174744 for the reduction of 6-isopropoxy-5-nitro-1H-indazole to 6-isopropoxy-1H-indazol-5-amine) or by the use of iron and ammonium chloride in water and ethanol (see, for example, also Journal of the Chemical Society, 1955, 2412-2419), or by the use of tin(II) chloride (CAS 7772-99-8). The use of iron and ammonium chloride in water and ethanol is preferred. The preparation of Intermediate 4 from Intermediate 7 can be effected analogously to Synthesis Scheme 2 (preparation of Intermediate 3 from Intermediate 2).

As described for Synthesis Scheme 3, it is optionally possible to use protecting group strategies in the case of Synthesis Scheme 5 as well. Optionally, it is additionally possible, proceeding from Intermediate 6 or Intermediate 7, as described for Synthesis Scheme 3, to conduct oxidation or reduction reactions known to those skilled in the art (cf., for example Science of Synthesis, Georg Thieme Verlag).

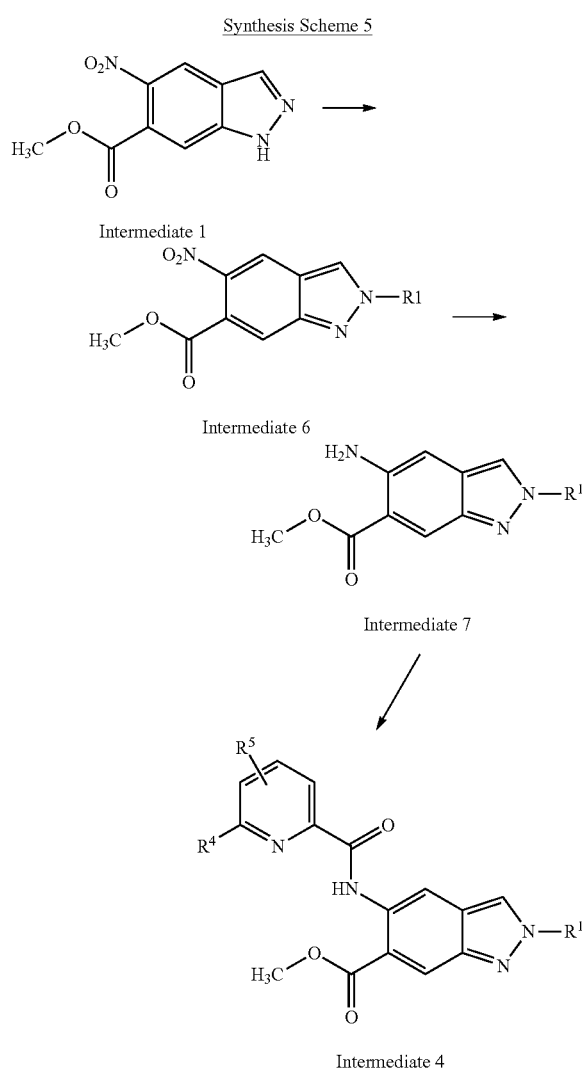

Synthesis Scheme 5

Intermediate 1

Intermediate 6

Intermediate 7

Intermediate 4

The substituents $R^1$, $R^4$, $R^5$ are each as defined in the general formula (I).

Synthesis of the Example Compounds

Abbreviations and Elucidations

| | |
|---|---|
| DMF | N,N-dimethylformamide |
| DMSO | dimethyl sulphoxide |
| THF | tetrahydrofuran |
| RT | room temperature |
| HPLC | high-performance liquid chromatography |
| h | hour(s) |
| HCOOH | formic acid |
| MeCN | acetonitrile |
| min | minute(s) |
| UPLC | ultrahigh-performance liquid chromatography |
| DAD | diode array detector |
| ELSD | evaporating light scattering detector |
| ESI | electrospray ionization |
| SQD | single quadrupole detector |
| CPG | core-pulled precision glass |
| $NH_3$ | ammonia |

The term sodium chloride solution always means a saturated aqueous sodium chloride solution.

The chemical names of the intermediates and examples were generated using the ACD/LABS (Batch Version 12.01.) software.

Methods

In some cases, the present compounds and precursors and/or intermediates thereof were analysed by LC-MS.

Method A1: UPLC (MeCN—HCOOH):

Instrument: Waters Acquity UPLC-MS SQD 3001; column: Acquity UPLC BEH C18 1.7 50×2.1 mm; eluent A: water+0.1% by vol. of formic acid (99%), eluent B: acetonitrile; gradient: 0-1.6 min 1-99% B, 1.6-2.0 min 99% B; flow rate 0.8 ml/min; temperature: 60° C.; injection: 2 μl; DAD scan: 210-400 nm; MS ESI+, ESI−, scan range 160-1000 m/z; ELSD.

Method A2: UPLC (MeCN—$NH_3$):

Instrument: Waters Acquity UPLC-MS SQD 3001; column: Acquity UPLC BEH C18 1.7 50×2.1 mm; eluent A: water+0.2% by vol. of ammonia (32%), eluent B: acetonitrile; gradient: 0-1.6 min 1-99% B, 1.6-2.0 min 99% B; flow rate 0.8 ml/min; temperature: 60° C.; injection: 2 μl; DAD scan: 210-400 nm; MS ESI+, ESI−, scan range 160-1000 m/z; ELSD.

Method A3: (LC-MS)

Instrument: Agilent 1290 Infinity LC; column: Acquity UPLC BEH C18 1.7 50×2.1 mm; eluent A: water+0.05% by vol. of formic acid, eluent B: acetonitrile+0.05% by vol. of formic acid; gradient: 0-1.7 min 2-90% B, 1.7-2.0 min 90% B; flow rate 1.2 ml/min; temperature: 60° C.; injection: 2 μl; DAD scan: 190-390 nm; MS: Agilent TOF 6230.

Method A4: (LC-MS)

Instrument: Waters Acquity; column: Kinetex (Phenomenex), 50×2 mm; eluent A: water+0.05% by vol. of formic acid, eluent B: acetonitrile+0.05% by vol. of formic acid; gradient: 0-1.9 min 1-99% B, 1.9-2.1 min 99% B; flow rate 1.5 ml/min; temperature: 60° C.; injection: 0.5 μl; DAD scan: 200-400 nm.

In some cases, the present compounds and the precursors and/or intermediates thereof were purified by the following illustrative preparative HPLC methods:

Method P1: system: Waters Autopurification system: Pump 2545, Sample Manager 2767, CFO, DAD 2996, ELSD 2424, SQD; column: XBridge C18 5 μm 100×30 mm; eluent A: water+0.1% by vol. of formic acid, eluent B: acetonitrile; gradient: 0-8 min 10-100% B, 8-10 min 100% B; flow: 50 ml/min; temperature: room temperature; solution: max. 250 mg/max. 2.5 ml DMSO or DMF; injection: 1×2.5 ml; detection: DAD scan range 210-400 nm; MS ESI+, ESI−, scan range 160-1000 m/z.

Method P2: system: Waters Autopurification system: Pump 254, Sample Manager 2767, CFO, DAD 2996, ELSD 2424, SQD 3100; column: XBridge C18 5 μm 10×30 mm; eluent A: water+0.2% by vol. of ammonia (32%), eluent B: methanol; gradient: 0-8 min 30-70% B; flow: 50 ml/min; temperature: room temperature; detection: DAD scan range 210-400 nm; MS ESI+, ESI−, scan range 160-1000 m/z; ELSD.

Method P3: system: Labomatic, pump: HD-5000, fraction collector: LABOCOL Vario-4000, UV detector: Knauer UVD 2.1S; column: XBridge C18 5 μm 100×30 mm; eluent A: water+0.2% by vol. of ammonia (25%), eluent B: acetonitrile; gradient: 0-1 min 15% B, 1-6.3 min 15-55% B, 6.3-6.4 min 55-100% B, 6.4-7.4 min 100% B; flow: 60 ml/min; temperature: room temperature; solution: max. 250 mg/2 ml DMSO; injection: 2×2 ml; detection: UV 218 nm; Software: SCPA PrepCon5.

Method P4: system: Labomatic, pump: HD-5000, fraction collector: LABOCOL Vario-4000, UV detector: Knauer UVD 2.1S; column: Chromatorex RP C18 10 μm 125×30 mm; eluent A: water+0.1% by vol. of formic acid, eluent B: acetonitrile; gradient: 0-15 min 65-100% B; flow: 60 ml/min; temperature: room temperature; solution: max. 250 mg/2 ml DMSO; injection: 2×2 ml; detection: UV 254 nm; Software: SCPA PrepCon5.

Method P5: system: Sepiatec: Prep SFC100, column: Chiralpak IA 5 μm 250×20 mm; eluent A: carbon dioxide, eluent B: ethanol; gradient: isocratic 20% B; flow: 80 ml/min; temperature: 40° C.; solution: max. 250 mg/2 ml DMSO; injection: 5×0.4 mL; detection: UV 254 nm.

Method P6: system: Agilent: Prep 1200, 2×prep pump, DLA, MWD, Gilson: Liquid Handler 215; column: Chiralcel OJ-H 5 μm 250×20 mm; eluent A: hexane, eluent B: ethanol; gradient: isocratic 30% B; flow: 25 ml/min; temperature: 25° C.; solution: 187 mg/8 ml ethanol/methanol; injection: 8×1.0 ml; detection: UV 280 nm.

Method P7: system: Labomatic, pump: HD-5000, fraction collector: LABOCOL Vario-4000, UV detector: Knauer UVD 2.1S; column: XBridge C18 5 μm 100×30 mm; eluent A: water+0.1% by vol. of formic acid, eluent B: acetonitrile; gradient: 0-3 min: 65% B isocratic, 3-13 min: 65-100% B; flow: 60 ml/min; temperature: room temperature; solution: max. 250 mg/2 ml DMSO; injection: 2×2 ml; detection: UV 254 nm.

Method P8: system: Agilent: Prep 1200, 2×prep pump, DLA, MWD, Gilson: Liquid Handler 215; column: Chiralpak IF 5 μm 250×20 mm; eluent A: ethanol, eluent B: methanol; gradient: isocratic 50% B; flow: 25 ml/min; temperature: 25° C.; solution: 600 mg/7 ml N,N-dimethylformamide; injection: 10×0.7 ml; detection: UV 254 nm.

In some cases, substance mixtures were purified by column chromatography on silica gel.

For preparation of some of the present compounds and the precursors and/or intermediates thereof, a column chromatography purification ("flash chromatography") was conducted on silica gel using Isolera® devices from Biotage. This was done using cartridges from Biotage, for example the "SNAP Cartridge, KP_SIL" cartridge of different size and "Interchim Puriflash Silica HP 15UM flash column" cartridges from Interchim of different size.

Starting Materials

Intermediate V2-1

Methyl 6-(2-hydroxypropan-2-yl)pyridine-2-carboxylate

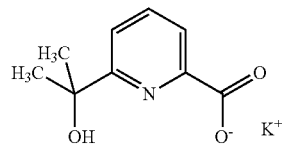

2.00 g (9.26 mmol) of 2-(6-bromopyridin-2-yl)propan-2-ol (CAS 638218-78-7) were dissolved in 20 ml of methanol and 20 ml of DMSO. Subsequently, 250 mg of 1,3-bis (diphenylphosphino)propane, 130 mg of palladium(II) acetate and 3 ml of triethylamine were added. The reaction mixture was purged three times with carbon monoxide at room temperature and stirred under a 13 bar carbon monoxide atmosphere for 30 min. The carbon monoxide atmosphere was removed by applying a vacuum and the mixture was stirred under a 14 bar carbon monoxide atmosphere at 100° C. for 24 h.

The autoclave was decompressed, water was added to the reaction mixture, and the reaction mixture was extracted three times with ethyl acetate, washed with saturated aqueous sodium hydrogencarbonate solution and sodium chloride solution, filtered through a hydrophobic filter and concentrated. This gave 1.60 g of a crude product.

UPLC-MS (Method A1): $R_t$=0.76 min (UV detector: TIC), mass found 195.00.

Intermediate V3-1

Potassium 6-(2-hydroxypropan-2-yl)pyridine-2-carboxylate

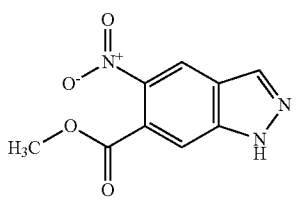 [SMILES: COC(=O)c1cc2[nH]ncc2cc1[N+](=O)[O-]]

1.60 g of the crude product of Intermediate 0-1 were initially charged in 15 ml of methanol, 0.74 g of potassium hydroxide was added and the mixture was stirred at 50° C. for 16.5 h. After concentration, this gave 2.1 g of a residue which was used without further purification.

UPLC-MS (Method A1): $R_t$=0.47 min (UV detector: TIC), mass found 181.00.

Intermediate 1-1

Methyl 5-nitro-1H-indazole-6-carboxylate

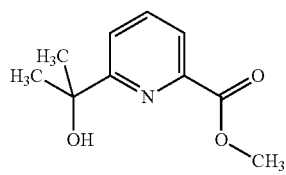

4.60 g (26.1 mmol) of methyl 1H-indazole-6-carboxylate (CAS No: 170487-40-8) were dissolved in 120 ml of sulphuric acid (96%) and cooled to −15° C. in a three-neck flask having a CPG stirrer, dropping funnel and internal thermometer. Over a period of 15 min, the nitrating acid (10 ml of 96% sulphuric acid in 5 ml of 65% nitric acid), which had been prepared and cooled beforehand, was added dropwise to this solution. After the dropwise addition had ended, the mixture was stirred for a further 1 h (internal temperature at −13° C.). The reaction mixture was added to ice, and the precipitate was filtered off with suction, washed with water and dried in a drying cabinet at 50° C. under reduced pressure. 5.49 g of the title compound were obtained.

UPLC-MS (Method A2): $R_t$=0.75 min

MS (ESIpos): m/z=222(M+H)$^+$ $^1$H NMR (400 MHz, DMSO-d6): δ [ppm]=3.87 (s, 3H), 7.96 (s, 1H), 8.44 (s, 1H), 8.70 (s, 1H), 13.98 (br. s., 1H).

Intermediate 2-1

Methyl 5-amino-1H-indazole-6-carboxylate

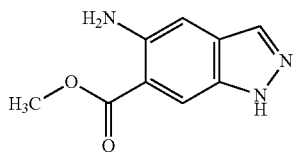

4.40 g (19.8 mmol) of methyl 5-nitro-1H-indazole-6-carboxylate (Intermediate 1-1) were dissolved in 236 ml of methanol and hydrogenated with 1.06 g (0.99 mmol) of palladium on activated carbon under standard hydrogen pressure at 25° C. for 3 h. The reaction mixture was filtered through Celite, the filter was washed with methanol, and the filtrate was concentrated. 3.53 g of the title compound were obtained.

$^1$H NMR (300 MHz, DMSO-d6): δ [ppm]=3.85 (s, 3H) 6.01 (s, 2H) 6.98 (s, 1H) 7.79-7.91 (m, 1H) 7.99 (s, 1H) 12.84 (br. s., 1H).

Intermediate 3-1

Methyl 5-({[6-(trifluoromethyl)pyridin-2-yl]carbonyl}amino)-1H-indazole-6-carboxylate

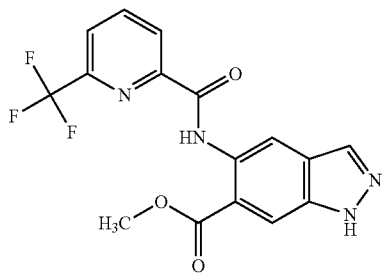 [SMILES: COC(=O)c1cc2[nH]ncc2cc1NC(=O)c1cccc(C(F)(F)F)n1]

4.95 g (25.9 mmol) of 6-(trifluoromethyl)pyridine-2-carboxylic acid were initially charged in 45 ml of THF. 9.07 g (28.2 mmol) of O-(benzotriazol-1-yl)-N,N,N',N'-tetramethyluronium tetrafluoroborate and 4.92 ml (28.2 mmol) of N-ethyl-N-isopropylpropan-2-amine were added and the mixture was stirred at 25° C. for 30 min. Subsequently, 4.50 g (23.5 mmol) of methyl 5-amino-1H-indazole-6-carboxylate (Intermediate 2-1) were added and the mixture was stirred at 25° C. for 24 h. The reaction mixture was filtered with suction through a membrane filter and the solids were washed with THF and with water, and dried in a drying cabinet overnight. 7.60 g of the title compound were obtained.

UPLC-MS (Method A2): $R_t$=1.16 min

MS (ESIpos): m/z=365 (M+H)$^+$ $^1$H NMR (400 MHz, DMSO-d6): δ [ppm]=3.97 (s, 3H), 8.13-8.27 (m, 2H), 8.30 (s, 1H), 8.33-8.45 (m, 1H), 8.45-8.51 (m, 1H), 9.15 (s, 1H), 12.57 (s, 1H), 13.44 (s, 1H).

Intermediate 3-2

Methyl 5-({[6-(difluoromethyl)pyridin-2-yl]carbonyl}amino)-1H-indazole-6-carboxylate

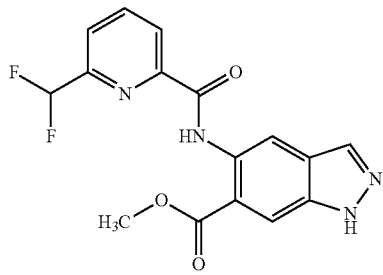 [SMILES: COC(=O)c1cc2[nH]ncc2cc1NC(=O)c1cccc(C(F)F)n1]

2.85 g (23.5 mmol) of 6-(difluoromethyl)pyridine-2-carboxylic acid were initially charged in 30 ml of THF. 6.05 g (18.8 mmol) of O-(benzotriazol-1-yl)-N,N,N',N'-tetramethyluronium tetrafluoroborate and 3.3 ml of N-ethyl-N-isopropylpropan-2-amine were added and the mixture was stirred at room temperature for 10 minutes. Subsequently, 3.00 g (15.7 mmol) of methyl 5-amino-1H-indazole-6-carboxylate were added and the mixture was stirred at room temperature overnight. The reaction mixture was admixed with water, and the precipitate was filtered off with suction and washed repeatedly with water and dichloromethane. This gave 1.53 g (27% of theory) of the title compound. The phases of the filtrate were separated, the organic phase was concentrated, admixed with a little dichloromethane and suspended in an ultrasound bath, and the precipitate was filtered off with suction. This gave a further 1.03 g of the title compound.

1H-NMR (first product fraction, 300 MHz, DMSO-d6): δ [ppm]=3.99 (s, 3H), 7.09 (t, 1H), 8.00 (d, 1H), 8.21-8.40 (m, 4H), 9.14 (s, 1H), 12.53 (s, 1H), 13.44 (s, 1H).

Intermediate 3-3

Methyl 5-({[6-(2-hydroxypropan-2-yl)pyridin-2-yl]carbonyl}amino)-1H-indazole-6-carboxylate

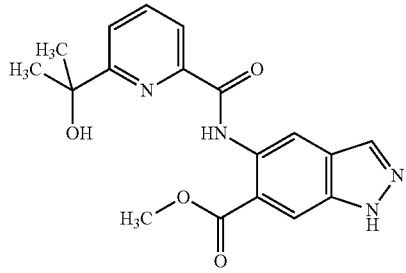 [SMILES: COC(=O)c1cc2[nH]ncc2cc1NC(=O)c1cccc(C(C)(C)O)n1]

2.10 g of potassium 6-(2-hydroxypropan-2-yl)pyridine-2-carboxylate (Intermediate V3-1) were initially charged in 15 ml of THF. 3.69 g (11.5 mmol) of O-(benzotriazol-1-yl)-N,N,N',N'-tetramethyluronium tetrafluoroborate and 2.00 ml of N-ethyl-N-isopropylpropan-2-amine were added and the mixture was stirred at room temperature for 15 min. Subsequently, 1.83 g (9.58 mmol) of methyl 5-amino-1H-indazole-6-carboxylate (Intermediate 2-1) were added and the mixture was stirred at room temperature for 19 h. The mixture was admixed with water and ethyl acetate, the undissolved solids were filtered off, the phases of the filtrate were separated, and the aqueous phase was extracted twice with ethyl acetate, washed with sodium chloride solution, filtered through a hydrophobic filter, concentrated and purified by column chromatography on silica gel (hexane/ethyl acetate). After the solvents had been removed, 1.56 g of the title compound were obtained as a yellow foam.

UPLC-MS (Method A1): R$_t$=1.00 min (UV detector: TIC Smooth), mass found 354.00.

1H-NMR (500 MHz, DMSO-d6): δ [ppm]=1.63 (s, 6H), 3.97 (s, 3H), 5.37 (s, 1H), 7.90-7.95 (m, 1H), 8.03-8.07 (m, 2H), 8.23 (s, 1H), 8.29 (s, 1H), 9.19 (s, 1H), 12.79 (s, 1H), 13.41 (br.s., 1H).

Intermediate 4-1

Methyl 2-(oxetan-3-ylmethyl)-5-({[6-(trifluoromethyl)pyridin-2-yl]carbonyl}amino)-2H-indazole-6-carboxylate

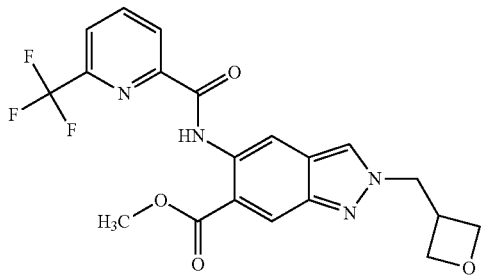 [SMILES: COC(=O)c1cc2nn(CC3COC3)cc2cc1NC(=O)c1cccc(C(F)(F)F)n1]

1.00 g (2.66 mmol) of methyl 5-({[6-(trifluoromethyl)pyridin-2-yl]carbonyl}amino)-1H-indazole-6-carboxylate (Intermediate 3-1) was dissolved in 10 ml of DMF and, after addition of 1.10 g (7.99 mmol) of potassium carbonate and 221 mg (1.33 mmol) of potassium iodide, the mixture was stirred at 25° C. for 30 min. 603 mg (3.99 mmol) of 3-bromomethyloxetane were added, and the mixture was stirred at 25° C. for 24 h. The reaction mixture was partitioned between water and ethyl acetate. The mixture was extracted twice with ethyl acetate, and the combined organic phases were filtered through a hydrophobic filter and concentrated. The residue was purified by column chromatography on silica gel (hexane/ethyl acetate). 260 mg of the title compound were obtained.

UPLC-MS (Method A2): R$_t$=1.24 min

MS (ESIpos): m/z=435(M+H)$^+$ $^1$H NMR (400 MHz, DMSO-d6): δ [ppm]=3.49-3.64 (m, 1H), 3.95 (s, 3H), 4.49 (t, 2H), 4.68 (dd, 2H), 4.81 (d, 2H), 8.20 (dd, 1H), 8.35-8.41 (m, 1H), 8.43-8.49 (m, 2H), 8.55-8.58 (m, 1H), 9.06 (s, 1H), 12.53 (s, 1H).

Intermediate 4-2

Methyl 2-(2-methoxyethyl)-5-({[6-(trifluoromethyl)pyridin-2-yl]carbonyl}amino)-2H-indazole-6-carboxylate

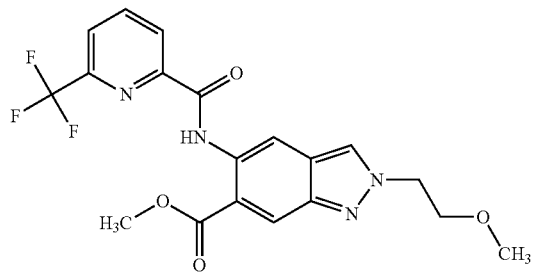 [SMILES: COCCn1cc2cc(NC(=O)c3cccc(C(F)(F)F)n3)c(C(=O)OC)cc2n1]

1.00 g (2.75 mmol) of methyl 5-({[6-(trifluoromethyl)pyridin-2-yl]carbonyl}amino)-1H-indazole-6-carboxylate (Intermediate 3-1) was dissolved in 5 ml of DMF, and 387 µl (4.12 mmol) of 2-bromoethyl methyl ether, 1.14 g (8.23 mmol) of potassium carbonate and 228 mg (1.37 mmol) of potassium iodide were added while stirring. The reaction mixture was stirred at 25° C. for 24 h, diluted with water and extracted twice with ethyl acetate. The combined organic phases were filtered through a hydrophobic filter and concentrated. The residue was purified by column chromatography on silica gel (hexane/ethyl acetate). 12 mg of the title compound were obtained.

UPLC-MS (Method A1): R$_t$=1.24 min

MS (ESIpos): m/z=423 (M+H)$^+$ $^1$H NMR (400 MHz, DMSO-d6): δ [ppm]=3.24 (s, 3H), 3.86 (t, 2H), 3.96 (s, 3H), 4.65 (t, 2H), 8.21 (dd, 1H), 8.35-8.42 (m, 1H), 8.43-8.51 (m, 2H), 8.52 (d, 1H), 9.06 (s, 1H), 12.53 (s, 1H).

Intermediate 4-3

Methyl 2-(3-methoxypropyl)-5-({[6-(trifluoromethyl)pyridin-2-yl]carbonyl}amino)-2H-indazole-6-carboxylate

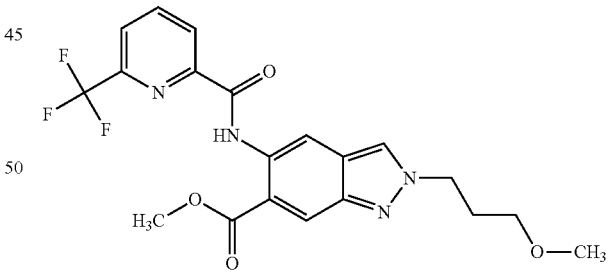

1.00 g (2.75 mmol) of methyl 5-({[6-(trifluoromethyl)pyridin-2-yl]carbonyl}amino)-1H-indazole-6-carboxylate (Intermediate 3-1) was dissolved in 5 ml of DMF, and 460 µl (4.12 mmol) of 1-bromo-3-methoxypropane, 1.14 g (8.23 mmol) of potassium carbonate and 228 mg (1.37 mmol) of potassium iodide were added while stirring. The reaction mixture was stirred at 25° C. for 72 h, diluted with water and extracted twice with ethyl acetate. The combined organic phases were filtered through a hydrophobic filter and concentrated. The residue was purified by column chromatography on silica gel (hexane/ethyl acetate). 28 mg of the title compound were obtained.

UPLC-MS (Method A1): $R_t$=1.29 min

MS (ESIpos): m/z=437 (M+H)$^+$ $^1$H NMR (400 MHz, DMSO-d6): δ [ppm]=2.17 (quin, 2H), 3.24 (s, 3H), 3.33-3.36 (m, 2H), 3.96 (s, 3H), 4.53 (t, 2H), 8.21 (dd, 1H), 8.35-8.42 (m, 1H), 8.45-8.49 (m, 2H), 8.54 (d, 1H), 9.06 (s, 1H), 12.54 (s, 1H).

Intermediate 4-4

Methyl 2-(3-hydroxy-3-methylbutyl)-5-({[6-(trifluoromethyl)pyridin-2-yl]carbonyl}amino)-2H-indazole-6-carboxylate Preparation Method 1

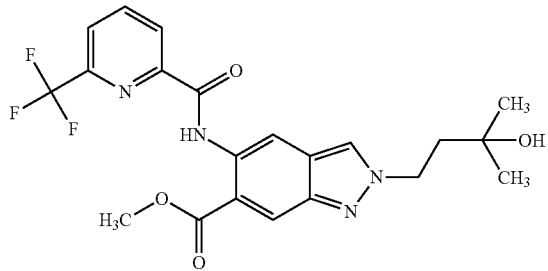 [SMILES: COC(=O)c1cc2nn(CCC(C)(C)O)cc2cc1NC(=O)c1cccc(C(F)(F)F)n1]

930 mg (2.55 mmol) of methyl 5-({[6-(trifluoromethyl)pyridin-2-yl]carbonyl}amino)-1H-indazole-6-carboxylate (Intermediate 3-1), 1.06 g of potassium carbonate and 212 mg of potassium iodide were initially charged in 9 ml of DMF and the mixture was stirred for 15 min. Then 0.62 ml of 4-bromo-2-methylbutan-2-ol was added and the mixture was stirred at 60° C. for 16 h. The mixture was admixed with water and extracted twice with ethyl acetate, and the extract was washed three times with saturated sodium chloride solution, filtered and concentrated. Column chromatography purification on silica gel (hexane/ethyl acetate) gave 424 mg of the title compound.

UPLC-MS (Method A2): $R_t$=1.21 min (UV detector: TIC), mass found 450.00.

$^1$H-NMR (400 MHz, DMSO-$d_6$): δ [ppm]=1.16 (s, 6H) 2.02-2.11 (m, 2H) 3.96 (s, 3H) 4.51-4.60 (m, 3H) 8.20 (dd, J=7.83, 1.01 Hz, 1H) 8.39 (s, 1H) 8.45 (s, 2H) 8.55 (d, J=0.76 Hz, 1H) 9.05 (s, 1H) 12.52 (s, 1H)

Preparation Method 2

1.95 g (7.03 mmol) of methyl 5-amino-2-(3-hydroxy-3-methylbutyl)-2H-indazole-6-carboxylate (Intermediate 7-1) were initially charged in 30 ml of THF. 1.48 g (7.73 mmol) of 6-(trifluoromethyl)pyridine-2-carboxylic acid, 2.71 g (8.44 mmol) of O-(benzotriazol-1-yl)-N,N,N',N'-tetramethyluronium tetrafluoroborate and 1.47 ml (8.44 mmol) of N-ethyl-N-isopropylpropan-2-amine were added and the mixture was stirred at 25° C. for 20.5 h. Water was added, the mixture was extracted three times with ethyl acetate and the extracts were washed with sodium chloride solution, filtered through a hydrophobic filter and concentrated. The residue was separated by column chromatography on silica gel (hexane/ethyl acetate gradient). 2.79 g of the title compound were obtained.

UPLC-MS (Method A1): $R_t$=1.23 min (UV detector: TIC), mass found 450.00.

Intermediate 4-5

Methyl 2-(2-{[tert-butyl(dimethyl)silyl]oxy}ethyl)-5-({[6-(trifluoromethyl)pyridin-2-yl]carbonyl}amino)-2H-indazole-6-carboxylate

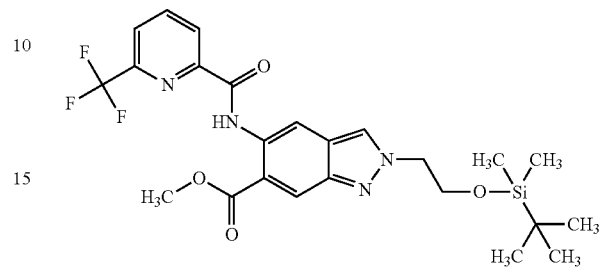

1.00 g (2.66 mmol, 97%) of methyl 5-({[6-(trifluoromethyl)pyridin-2-yl]carbonyl}amino)-1H-indazole-6-carboxylate (Intermediate 3-1) was initially charged in 50 ml of DMF, 1.10 g (7.99 mmol) of potassium carbonate and 221 mg (1.33 mmol) of potassium iodide were added while stirring, and the mixture was stirred at 25° C. for 30 min. Subsequently, 857 μl (3.99 mmol) of (2-bromoethoxy)(tert-butyl)dimethylsilane were added and the mixture was stirred at 25° C. for 24 h. The reaction mixture was diluted with water and extracted with ethyl acetate. The combined organic phases were filtered through a hydrophobic filter and concentrated. The residue was purified by column chromatography on silica gel (hexane/ethyl acetate). 400 mg of the title compound were obtained.

UPLC-MS (Method A1): $R_t$=1.58 min

MS (ESIpos): m/z=523(M+H)$^+$ $^1$H NMR (300 MHz, DMSO-d6): δ [ppm]=−0.18−−0.13 (m, 6H), 0.74 (s, 9H), 3.96 (s, 3H), 4.08 (t, 2H), 4.57 (t, 2H), 8.15-8.25 (m, 1H), 8.32-8.43 (m, 1H), 8.43-8.52 (m, 3H), 9.07 (s, 1H), 12.53 (s, 1H).

Intermediate 4-6

Methyl 2-(3-{[tert-butyl(dimethyl)silyl]oxy}propyl)-5-({[6-(trifluoromethyl)pyridin-2-yl]carbonyl}amino)-2H-indazole-6-carboxylate

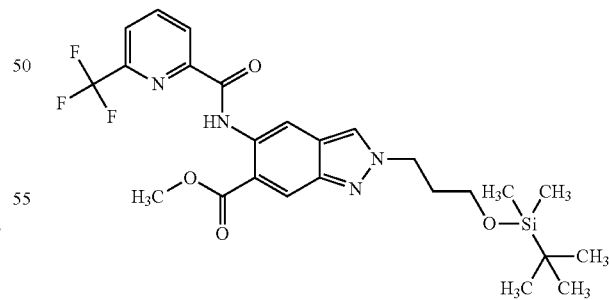

Analogously to Intermediate 4-5, 1.00 g (2.75 mmol) of methyl 5-({[6-(trifluoromethyl)pyridin-2-yl]carbonyl}amino)-1H-indazole-6-carboxylate (Intermediate 3-1) was dissolved in 10 ml of DMF, 1.14 g (8.24 mmol) of potassium carbonate and 228 mg (1.37 mmol) of potassium iodide were added while stirring, and the mixture was stirred at 25° C. for 30 min. Subsequently, 1.04 g (4.12 mmol) of (3-bromopropoxy)(tert-butyl)dimethylsilane were added and the mixture was stirred at 25° C. for 24 h. The reaction mixture was filtered and the filtercake was washed with ethyl acetate. The reaction mixture was partitioned between water and ethyl acetate and the aqueous phase was extracted twice with ethyl acetate. The combined organic phases were filtered through a hydrophobic filter and concentrated. Purification of the residue by preparative HPLC gave 428 mg of the title compound.

UPLC-MS (Method A1): $R_t$=1.63 min
MS (ESIpos): m/z=537(M+H)$^+$
$^1$H NMR (400 MHz, DMSO-d6): δ [ppm]=−0.02-0.06 (m, 6H), 0.87 (s, 9H), 2.14 (quin, 2H), 3.62 (t, 2H), 3.96 (s, 3H), 4.54 (t, 2H), 8.20 (d, 1H), 8.35-8.42 (m, 1H), 8.43-8.48 (m, 3H), 8.49-8.53 (m, 1H), 9.06 (s, 1H).

Intermediate 4-7

Methyl 5-({[6-(2-hydroxypropan-2-yl)pyridin-2-yl]carbonyl}amino)-2-(4,4,4-trifluorobutyl)-2H-indazole-6-carboxylate

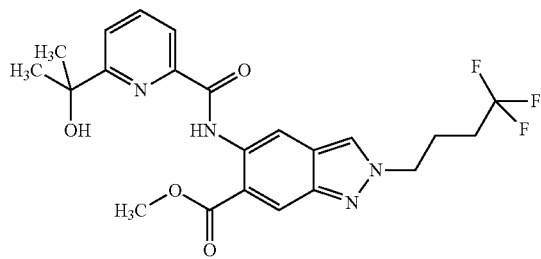 [SMILES: COC(=O)c1cc2nn(CCCC(F)(F)F)cc2cc1NC(=O)c1cccc(C(C)(C)O)n1]

300 mg (0.80 mmol) of methyl 5-({[6-(2-hydroxypropan-2-yl)pyridin-2-yl]carbonyl}amino)-1H-indazole-6-carboxylate (Intermediate 3-3) were initially charged in 4.5 ml of DMF. 287 mg (1.21 mmol) of 1,1,1-trifluoro-4-iodobutane and 333 mg of potassium carbonate were added and the mixture was stirred at 100° C. for 23 h. Water was added, and the mixture was extracted three times with ethyl acetate. The mixture was concentrated and the product was purified by preparative HPLC. This gave 72 mg of the title compound.

UPLC-MS (Method A1): $R_t$=1.26 min (UV detector: TIC), mass found 464.17.

Intermediate 4-8

Methyl 5-{[(5-fluoro-6-methylpyridin-2-yl)carbonyl]amino}-2-(3-hydroxy-3-methylbutyl)-2H-indazole-6-carboxylate

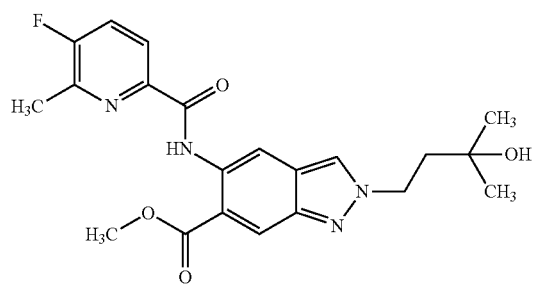 [SMILES: COC(=O)c1cc2nn(CCC(C)(C)O)cc2cc1NC(=O)c1ccc(F)c(C)n1]

195 mg (0.46 mmol) of methyl 5-amino-2-(3-hydroxy-3-methylbutyl)-2H-indazole-6-carboxylate (Intermediate 7-1) were reacted with 78 mg (0.50 mmol) of 5-fluoro-6-methylpyridine-2-carboxylic acid analogous to Intermediate 4-4 (Preparation Method 2) within 19.5 h. 228 mg of a crude product were obtained after analogous aqueous workup.

UPLC-MS (Method A1): $R_t$=1.20 min (UV detector: TIC), mass found 414.00.

Intermediate 4-9

Methyl 2-(3-hydroxy-3-methylbutyl)-5-{[(6-methylpyridin-2-yl)carbonyl]amino}-2H-indazole-6-carboxylate

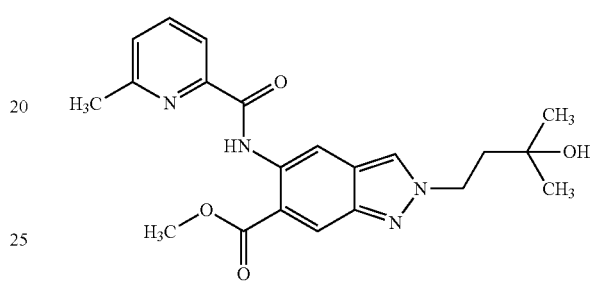

195 mg (0.45 mmol) of methyl 5-amino-2-(3-hydroxy-3-methylbutyl)-2H-indazole-6-carboxylate (Intermediate 7-1) were reacted with 70 mg (0.50 mmol) of 6-methylpyridine-2-carboxylic acid analogously to preparation of Intermediate 4-4 (Preparation Method 2) within 19.5 h. 278 mg of the title compound as crude product were obtained after analogous aqueous workup.

UPLC-MS (Method A1): $R_t$=1.14 min (UV detector: TIC), mass found 396.00.

Intermediate 4-10

Methyl 2-[3-(2,2,2-trifluoroethoxy)propyl]-5-({[6-(trifluoromethyl)pyridin-2-yl]carbonyl}amino)-2H-indazole-6-carboxylate

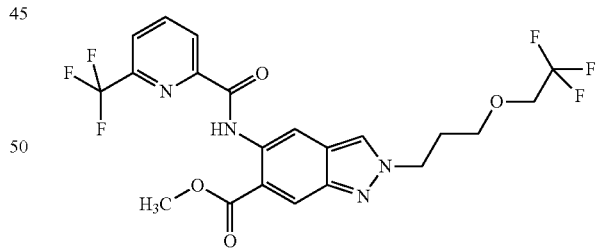

A mixture of 250 mg (0.58 mmol) of methyl 5-({[6-(trifluoromethyl)pyridin-2-yl]carbonyl}amino)-1H-indazole-6-carboxylate (Intermediate 3-1), 193 mg (0.88 mmol) of 3-bromopropyl 2,2,2-trifluoroethyl ether, 242 mg of potassium carbonate and 145 mg of potassium iodide in 3 ml of DMF was stirred at 100° C. for 20 h. Water was added, the mixture was extracted with ethyl acetate and the extract was washed with sodium chloride solution and concentrated. Purification by preparative HPLC gave 52 mg of the title compound.

UPLC-MS (Method A1): $R_t$=1.39 min (UV detector: TIC), mass found 504.12.

Intermediate 4-11

Methyl 5-({[6-(difluoromethyl)pyridin-2-yl]carbonyl}amino)-2-(3-hydroxy-3-methylbutyl)-2H-indazole-6-carboxylate

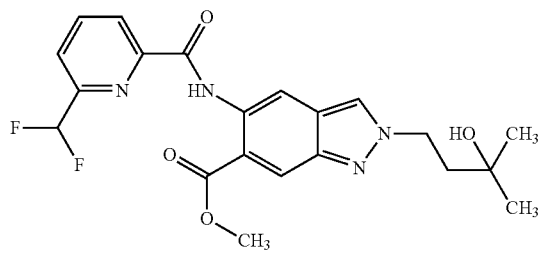 [SMILES: COC(=O)c1cc2nn(CCC(C)(C)O)cc2cc1NC(=O)c1cccc(C(F)F)n1]

2.00 g of methyl 5-amino-2-(3-hydroxy-3-methylbutyl)-2H-indazole-6-carboxylate (Intermediate 7-1) were initially charged in 40 ml of THF. 1.50 g of 6-(difluoromethyl)pyridine-2-carboxylic acid, 2.78 g of O-(benzotriazol-1-yl)-N,N,N',N'-tetramethyluronium tetrafluoroborate (TBTU, CAS Number 125700-67-6) and 1.5 ml of N-ethyl-N-isopropylpropan-2-amine were added and the mixture was stirred at RT for 24 h. Water was added, the mixture was extracted three times with ethyl acetate, and the combined organic phases were washed with sodium chloride solution and filtered through a hydrophobic filter. The mixture was concentrated and the residue was purified by column chromatography on silica gel (hexane/ethyl acetate). This gave 3.05 g of the title compound as a yellow solid.

UPLC-MS (Method A1): $R_t$=1.15 min (UV detector TIC), mass found 432.00.

$^1$H-NMR (400 MHz, DMSO-$d_6$): δ [ppm]=1.17 (s, 6H), 2.04-2.11 (m, 2H), 3.99 (s, 3H), 4.52-4.60 (m, 3H), 7.10 (t, 1H), 8.00 (dd, 1H), 8.28-8.38 (m, 2H), 8.44-8.47 (m, 1H), 8.56 (d, 1H), 9.05 (s, 1H), 12.49 (s, 1H).

Intermediate 5-1

N-[6-(2-Hydroxypropan-2-yl)-1H-indazol-5-yl]-6-(trifluoromethyl)pyridine-2-carboxamide

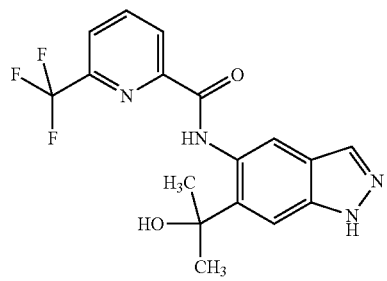 [SMILES: CC(C)(O)c1cc2[nH]ncc2cc1NC(=O)c1cccc(C(F)(F)F)n1]

To a solution, cooled in an ice-water cooling bath, of 1.50 g (4.12 mmol) of methyl 5-({[6-(trifluoromethyl)pyridin-2-yl]carbonyl}amino)-1H-indazole-6-carboxylate (Intermediate 3-1) in 20 ml of THF were cautiously added 6.9 ml (5 equivalents) of a 3M methylmagnesium bromide solution in diethyl ether. The mixture was stirred while cooling with an ice bath for 1 h and at room temperature for 19.5 h. Another 2 equivalents of methylmagnesium bromide solution were added and the mixture was stirred at room temperature for a further 24 h. Saturated aqueous ammonium chloride solution was added and the mixture was stirred and extracted three times with ethyl acetate. The combined organic phases were washed with sodium chloride solution, filtered through a hydrophobic filter and concentrated. The residue was purified by column chromatography on silica gel (hexane/ethyl acetate). 763 mg of the title compound were obtained.

$^1$H-NMR (400 MHz, DMSO-$d_6$): δ [ppm]=1.63 (s, 6H), 5.99 (s, 1H), 7.49 (s, 1H), 8.06 (s, 1H), 8.14-8.19 (m, 1H), 8.37 (t, 1H), 8.46 (d, 1H), 8.78 (s, 1H), 12.32 (s, 1H), 12.97 (s, 1H).

Intermediate 5-2

6-(Difluoromethyl)-N-[6-(2-hydroxypropan-2-yl)-1H-indazol-5-yl]pyridine-2-carboxamide

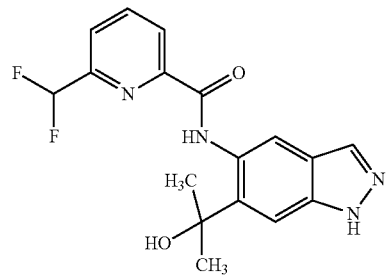 [SMILES: CC(C)(O)c1cc2[nH]ncc2cc1NC(=O)c1cccc(C(F)F)n1]

Analogously to the preparation of Intermediate 5-1, 2.40 g (6.93 mmol) of methyl 5-({[6-(difluoromethyl)pyridin-2-yl]carbonyl}amino)-1H-indazole-6-carboxylate (Intermediate 3-2) in 10 ml of THF were reacted with three portions of 3M methylmagnesium bromide solution in diethyl ether (6.9 ml, then stirring at room temperature for 45 min; 11.6 ml, then stirring at room temperature for 2 h; 6.9 ml, then stirring at room temperature for 2 h). After the workup as for Intermediate 5-1, 2.39 g of a crude product were obtained, which were used further without further purification.

Intermediate 6-1

Methyl 2-(3-hydroxy-3-methylbutyl)-5-nitro-2H-indazole-6-carboxylate

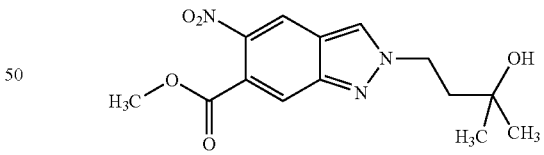

5.00 g (22.6 mmol) of methyl 5-nitro-1H-indazole-6-carboxylate (Intermediate 1-1) were initially charged in 40 ml of DMF. 5.65 g (33.9 mmol) of 4-bromo-2-methylbutan-2-ol, 9.37 g (67.8 mmol) of potassium carbonate and 5.63 g (33.9 mmol) of potassium iodide were added and the mixture was stirred at 100° C. for 20 h. Water was added, the mixture was extracted three times with ethyl acetate and the extracts were washed with sodium chloride solution, filtered through a hydrophobic filter and concentrated. The residue was purified by column chromatography on silica gel (hexane/ethyl acetate). The solids obtained were stirred with diethyl ether, filtered off with suction, washed with diethyl ether and dried. 2.49 g of the title compound were obtained.

UPLC-MS (Method A1): $R_t$=0.93 min (UV detector: TIC), mass found 307.00.

$^1$H-NMR (400 MHz, DMSO-$d_6$): δ [ppm]=1.15 (s, 6H), 2.02-2.11 (m, 2H), 3.84 (s, 3H), 4.54 (s, 1H), 4.58-4.65 (m, 2H), 8.05 (s, 1H), 8.69 (s, 1H), 8.86 (s, 1H).

Intermediate 7-1

Methyl 5-amino-2-(3-hydroxy-3-methylbutyl)-2H-indazole-6-carboxylate

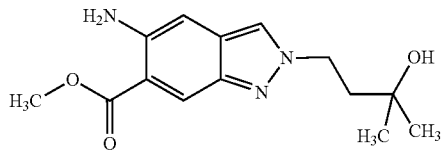 [SMILES: COC(=O)c1cc2nn(CCC(C)(C)O)cc2cc1N]

4.53 g of iron and 217 mg of ammonium chloride were added to 2.49 g (8.10 mmol) of methyl 2-(3-hydroxy-3-methylbutyl)-5-nitro-2H-indazole-6-carboxylate (Intermediate 6-1) in 30 ml of ethanol and 10 ml of water, and the mixture was stirred at 90° C. for 21.5 h. The mixture was filtered through Celite and washed through with ethanol three times, and the filtrate was concentrated and the residue was admixed with water. Extraction was effected three times with ethyl acetate (to improve the phase separation, sodium chloride solution was added). The combined organic phases were washed with sodium chloride solution, filtered through a hydrophobic filter and concentrated. This gave 1.95 g (85% of theory) of the title compound.

UPLC-MS (Method A1): $R_t$=0.67 min (UV detector: TIC), mass found 277.00.

$^1$H-NMR (400 MHz, DMSO-$d_6$): δ [ppm]=1.14 (s, 6H), 1.96-2.08 (m, 2H), 3.85 (s, 3H), 4.39-4.51 (m, 3H), 5.81 (s, 2H), 6.80 (s, 1H), 8.05 (s, 1H), 8.18 (s, 1H).

WORKING EXAMPLES

Example 1

N-[6-(2-Hydroxypropan-2-yl)-2-(2-methoxyethyl)-2H-indazol-5-yl]-6-(trifluoromethyl)pyridine-2-carboxamide

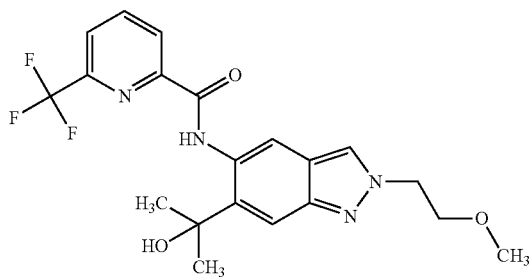 [SMILES: COCCn1cc2cc(NC(=O)c3cccc(C(F)(F)F)n3)c(C(C)(C)O)cc2n1]

75 mg (0.18 mmol) of methyl 2-(2-methoxyethyl)-5-({[6-(trifluoromethyl)pyridin-2-yl]carbonyl}amino)-2H-indazole-6-carboxylate (Intermediate 4-2) were dissolved in 500 μl of THF and admixed with 887 μl (0.89 mmol) of a 1 M methylmagnesium bromide solution in THF. The reaction mixture was stirred at 25° C. for 60 min. Subsequently, 1 ml of a saturated aqueous ammonium chloride solution was added cautiously and the mixture was filtered. The aqueous phase was extracted twice with ethyl acetate, and the organic phases were combined, filtered through a hydrophobic filter and concentrated. The residue was dissolved in 3 ml of DMSO and purified by preparative HPLC. The product-containing fractions were freeze-dried. 20 mg of the title compound were obtained.

UPLC-MS (Method A1): $R_t$=1.08 min

MS (ESIpos): m/z=423 (M+H)$^+$ $^1$H NMR (300 MHz, DMSO-d6): δ [ppm]=1.62 (s, 6H), 3.22 (s, 3H), 3.82 (t, 2H), 4.55 (t, 2H), 5.96 (s, 1H), 7.57 (s, 1H), 8.16 (d1 H), 8.29-8.42 (m, 2H), 8.42-8.50 (m, 1H), 8.71 (s, 1H), 12.36 (s, 1H)

Example 2

N-[6-(Hydroxymethyl)-2-(2-methoxyethyl)-2H-indazol-5-yl]-6-(trifluoromethyl)pyridine-2-carboxamide

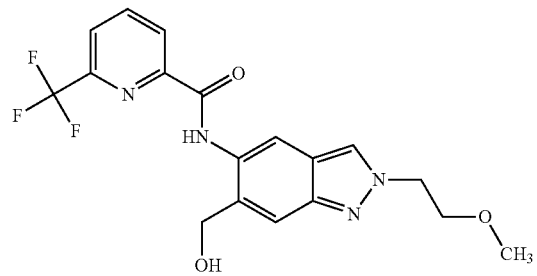 [SMILES: COCCn1cc2cc(NC(=O)c3cccc(C(F)(F)F)n3)c(CO)cc2n1]

13 mg (0.36 mmol) of lithium aluminium hydride were suspended in 1 ml of THF and the mixture was cooled to 0° C. 75 mg (0.17 mmol) of methyl 2-(2-methoxyethyl)-5-({[6-(trifluoromethyl)pyridin-2-yl]carbonyl}amino)-2H-indazole-6-carboxylate (Intermediate 4-2) dissolved in 500 μl of THF were added dropwise and the mixture was stirred at 25° C. for 60 min.

The mixture was diluted with water and extracted twice with ethyl acetate, and the combined organic phases were washed with sodium chloride solution, filtered through a hydrophobic filter, concentrated and dried under reduced pressure. This gave 13 mg of the title compound.

UPLC-MS (Method A2): $R_t$=0.99 min

MS (ESIpos): m/z=394 (M+H)$^+$ $^1$H NMR (400 MHz, DMSO-d6): δ [ppm]=3.23 (s, 3H), 3.83 (t, 2H), 4.56 (t, 2H), 4.69 (d, 2H), 5.77 (t, 1H), 7.57 (s, 1H), 8.19 (d, 1H), 8.33-8.41 (m, 2H), 8.43-8.47 (m, 1H), 8.51 (s, 1H), 11.20 (s, 1H)

Example 3

N-[6-(2-Hydroxypropan-2-yl)-2-(3-methoxypropyl)-2H-indazol-5-yl]-6-(trifluoromethyl)pyridine-2-carboxamide

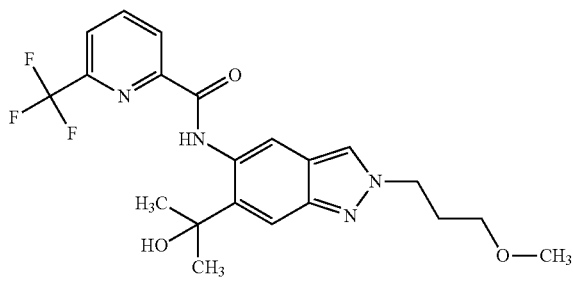 [SMILES: COCCCn1cc2cc(NC(=O)c3cccc(C(F)(F)F)n3)c(C(C)(C)O)cc2n1]

75 mg (0.17 mmol) of methyl 2-(3-methoxypropyl)-5-({[6-(trifluoromethyl)pyridin-2-yl]carbonyl}amino)-2H-indazole-6-carboxylate (Intermediate 4-3) were dissolved in 500 µl of THF and admixed with 859 µl (0.86 mmol) of a 1 M methylmagnesium bromide solution in THF. The reaction mixture was stirred at 25° C. for 60 min. Subsequently, 1 ml of a saturated ammonium chloride solution was added cautiously and the mixture was filtered. The aqueous phase was extracted twice with ethyl acetate, and the organic phases were combined, filtered through a hydrophobic filter and concentrated. The residue was dissolved in 3 ml of DMSO and purified by preparative HPLC. The product-containing fractions were freeze-dried. 25 mg of the title compound were obtained.

UPLC-MS (Method A1): $R_t$=1.13 min
MS (ESIpos): m/z=437 (M+H)$^+$
$^1$H NMR (400 MHz, DMSO-d6): δ [ppm]=1.62 (s, 6H), 2.14 (quin, 2H), 3.23 (s, 3H), 3.26-3.32 (m, 2H), 4.44 (t, 2H), 5.95 (s, 1H), 7.58 (s, 1H), 8.16 (d, 1H), 8.31-8.40 (m, 2H), 8.43-8.48 (m, 1H), 8.72 (s, 1H), 12.36 (s, 1H).

Example 4

N-[6-(Hydroxymethyl)-2-(3-methoxypropyl)-2H-indazol-5-yl]-6-(trifluoromethyl)pyridine-2-carboxamide

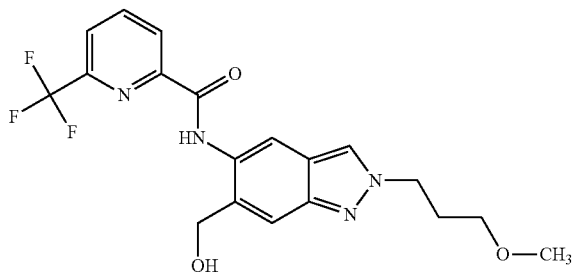 [SMILES: COCCCn1cc2cc(NC(=O)c3cccc(C(F)(F)F)n3)c(CO)cc2n1]

13 mg of lithium aluminium hydride were suspended in THF and the mixture was cooled to 0° C. 75 mg (0.17 mmol) of methyl 2-(3-methoxypropyl)-5-({[6-(trifluoromethyl)pyridin-2-yl]carbonyl}amino)-2H-indazole-6-carboxylate (Intermediate 4-3) in THF were added dropwise and the mixture was allowed to come to room temperature within 30 min. The mixture was diluted with water and filtered, the residue was washed with ethyl acetate and the filtrate was extracted with ethyl acetate. The combined ethyl acetate phases were washed with sodium chloride solution, filtered through a hydrophobic filter and concentrated. The residue was purified by preparative HPLC.

$^1$H NMR (300 MHz, DMSO-d$_6$): δ [ppm]=2.14 (quin, 2H), 3.23 (s, 3H), 3.29 (t, 2H), 4.45 (t, 2H), 4.68 (d, 2H), 5.77 (t, 1H), 7.58 (s, 1H), 8.18 (d, 1H), 8.32-8.48 (m, 3H), 8.51 (s, 1H), 11.21 (s, 1H).

Example 5

N-[2-(2-Hydroxyethyl)-6-(2-hydroxypropan-2-yl)-2H-indazol-5-yl]-6-(trifluoromethyl)pyridine-2-carboxamide Stage A:

Preparation of N-[2-(2-{[tert-butyl(dimethyl)silyl]oxy}ethyl)-6-(2-hydroxypropan-2-yl)-2H-indazol-5-yl]-6-(trifluoromethyl)pyridine-2-carboxamide

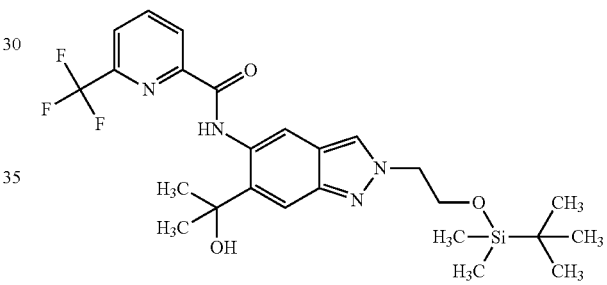

100 mg (0.19 mmol) of methyl 2-(2-{[tert-butyl(dimethyl)silyl]oxy}ethyl)-5-({[6-(trifluoromethyl)pyridin-2-yl]carbonyl}amino)-2H-indazole-6-carboxylate (Intermediate 4-5) were dissolved in 1 ml of THF and admixed with 669 µl (0.67 mmol) of a 1 M methylmagnesium bromide solution in THF. The reaction mixture was stirred at 25° C. for 60 min. Another 287 µl (0.29 mmol) of a 1 M methylmagnesium bromide solution in THF were added and the mixture was stirred at 25° C. for 3 h. Subsequently, 20 ml of a saturated ammonium chloride solution were added cautiously and the mixture was filtered. The aqueous phase was extracted twice with ethyl acetate, and the organic phases were combined, dried over magnesium sulphate, filtered, concentrated and dried under reduced pressure. This gave 50 mg of N-[2-(2-{[tert-butyl(dimethyl)silyl]oxy}ethyl)-6-(2-hydroxypropan-2-yl)-2H-indazol-5-yl]-6-(trifluoromethyl)pyridine-2-carboxamide.

UPLC-MS (Method A2): $R_t$=1.51 min
MS (ESIpos): m/z=523(M+H)$^+$
$^1$H NMR (300 MHz, DMSO-d6): δ [ppm]=−0.17--0.09 (m, 6H), 0.78 (s, 9H), 1.62 (s, 6H), 4.04 (t, 2H), 4.47 (t, 2H), 5.98 (s, 1H), 7.57 (s, 1H), 8.16 (d, 1H), 8.29 (s, 1H), 8.37 (t, 1H), 8.45 (d, 1H), 8.73 (s, 1H), 12.38 (s, 1H).

Stage B:

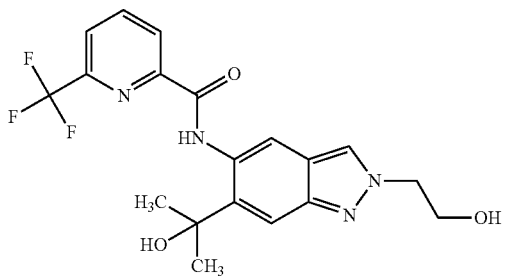 [SMILES: CC(C)(O)c1cc2nn(CCO)cc2cc1NC(=O)c1cccc(C(F)(F)F)n1]

50 mg (96 μmol) of N-[2-(2-{[tert-butyl(dimethyl)silyl]oxy}ethyl)-6-(hydroxymethyl)-2H-indazol-5-yl]-6-(trifluoromethyl)pyridine-2-carboxamide were dissolved in 1.0 ml of THF and admixed with 144 μl (0.14 mmol) of a 1 M solution of tetrabutylammonium fluoride in THF. The reaction mixture was stirred at room temperature for 1 h. The mixture was diluted with water and extracted twice with ethyl acetate, and the combined organic phases were washed with saturated sodium chloride solution, filtered through a hydrophobic filter and concentrated. This gave 36 mg of N-[2-(2-hydroxyethyl)-6-(2-hydroxypropan-2-yl)-2H-indazol-5-yl]-6-(trifluoromethyl)pyridine-2-carboxamide (Example 5).

$^1$H-NMR (400 MHz, DMSO-d$_6$): d [ppm]=1.62 (s, 6H), 3.86 (q, 2H), 4.43 (t, 2H), 4.95 (t, 1H), 5.94 (s, 1H), 7.57 (s, 1H), 8.16 (dd, 1H), 8.30 (s, 1H), 8.37 (t, 1H), 8.45 (d, 1H), 8.72 (s, 1H), 12.36 (s, 1H).

UPLC-MS (Method A2): R$_t$=0.97 min (UV detector: TIC), mass found 408.00.

Example 6

N-[6-(2-Hydroxypropan-2-yl)-2-(3-hydroxypropyl)-2H-indazol-5-yl]-6-(trifluoromethyl)pyridine-2-carboxamide Stage A:

Preparation of N-[2-(3-{[tert-butyl(dimethyl)silyl]oxy}propyl)-6-(2-hydroxypropan-2-yl)-2H-indazol-5-yl]-6-(trifluoromethyl)pyridine-2-carboxamide

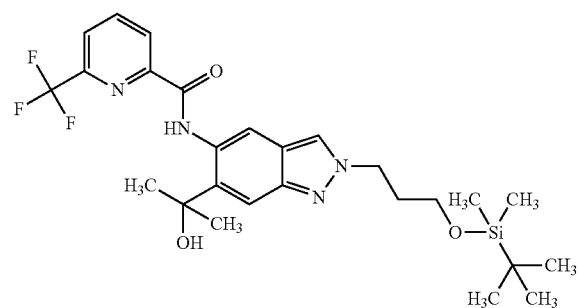 [SMILES: CC(C)(O)c1cc2nn(CCCO[Si](C)(C)C(C)(C)C)cc2cc1NC(=O)c1cccc(C(F)(F)F)n1]

50 mg (0.09 mmol) of methyl 2-(3-{[tert-butyl(dimethyl)silyl]oxy}propyl)-5-({[6-(trifluoromethyl)pyridin-2-yl]carbonyl}amino)-2H-indazole-6-carboxylate (Intermediate 4-6) were dissolved in 500 μl of THF and admixed with 326 μl (0.33 mmol) of a 1 M methylmagnesium bromide solution in THF. The reaction mixture was stirred at 25° C. for 60 min. Subsequently, 20 ml of a saturated ammonium chloride solution were added cautiously and the mixture was extracted twice with ethyl acetate. The combined organic phases were filtered through a hydrophobic filter, concentrated and dried under reduced pressure. The residue was purified by preparative HPLC. 40 mg of N-[2-(3-{[tert-butyl(dimethyl)silyl]oxy}propyl)-6-(2-hydroxypropan-2-yl)-2H-indazol-5-yl]-6-(trifluoromethyl)pyridine-2-carboxamide were obtained.

UPLC-MS (Method A1): R$_t$=1.58 min

MS (ESIpos): m/z=537(M+H)$^+$ $^1$H NMR (300 MHz, DMSO-d6): δ [ppm]=0.02-0.05 (m, 6H), 0.84-0.91 (m, 9H), 1.62 (s, 6H), 2.02-2.18 (m, 2H), 3.55-3.62 (m, 2H), 4.45 (t, 2H), 5.96 (s, 1H), 7.57 (s, 1H), 8.16 (d, 1H), 8.31 (s, 1H), 8.33-8.42 (m, 1H), 8.45 (d, 1H), 8.72 (s, 1H), 12.37 (s, 1H).

Stage B:

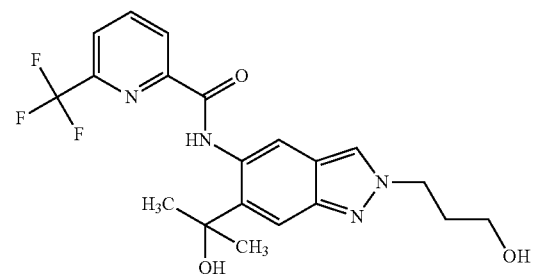 [SMILES: CC(C)(O)c1cc2nn(CCCO)cc2cc1NC(=O)c1cccc(C(F)(F)F)n1]

37 mg (0.07 mmol) of N-[2-(3-{[tert-butyl(dimethyl)silyl]oxy}propyl)-6-(2-hydroxypropan-2-yl)-2H-indazol-5-yl]-6-(trifluoromethyl)pyridine-2-carboxamide were dissolved in 500 μl of THF and admixed with 207 μl (0.21 mmol) of a 1 M solution of tetrabutylammonium fluoride in THF. The reaction mixture was stirred at 25° C. for 2 h. The mixture was diluted with water and extracted twice with ethyl acetate, and the combined organic phases were washed with saturated sodium chloride solution, filtered and concentrated. After purification by preparative HPLC, 10 mg of N-[6-(2-hydroxypropan-2-yl)-2-(3-hydroxypropyl)-2H-indazol-5-yl]-6-(trifluoromethyl)pyridine-2-carboxamide (Example 6, contained secondary component) were obtained.

UPLC-MS (Method A2): R$_t$=1.00 min

MS (ESIpos): m/z=423 (M+H)$^+$ $^1$H NMR selected signals (400 MHz, DMSO-d6): δ [ppm]=1.61 (s), 2.00-2.12 (m), 3.38 (t, 2H), 4.44 (t, 2H), 4.62 (br. s., 1H), 5.93 (br. s., 1H), 7.55 (s, 1H), 8.13 (d, 1H), 8.27-8.38 (m, 2H), 8.43 (d, 1H), 8.71 (s, 1H), 12.30 (br. s., 1H).

Example 7

N-[2-(2-Hydroxyethyl)-6-(hydroxymethyl)-2H-indazol-5-yl]-6-(trifluoromethyl)pyridine-2-carboxamide Stage A:

N-[2-(2-{[tert-Butyl(dimethyl)silyl]oxy}ethyl)-6-(hydroxymethyl)-2H-indazol-5-yl]-6-(trifluoromethyl)pyridine-2-carboxamide

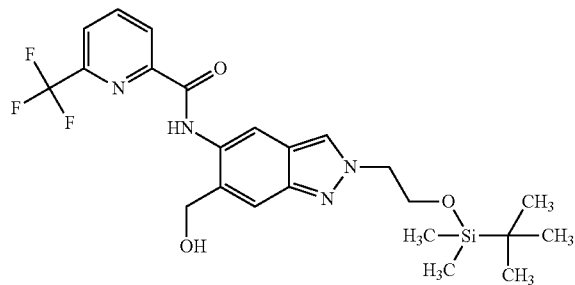 [SMILES: CC(C)(C)[Si](C)(C)OCCn1cc2cc(NC(=O)c3cccc(C(F)(F)F)n3)c(CO)cc2n1]

100 mg (0.19 mmol) of methyl 2-(2-{[tert-butyl(dimethyl)silyl]oxy}ethyl)-5-({[6-(trifluoromethyl)pyridin-2-yl]carbonyl}amino)-2H-indazole-6-carboxylate (Intermediate 4-5) were dissolved in 1 ml of THF and admixed with 191 μl (0.38 mmol) of a 2 M lithium borohydride solution. The mixture was left to stir at 25° C. for 24 h. 14 mg (0.38 mmol) of sodium borohydride and 500 μl of methanol were added, and the mixture was stirred at 25° C. for 4 h. Another 14 mg (0.38 mmol) of sodium borohydride were added, and the mixture was stirred at 25° C. for 24 h. Water was added cautiously to the reaction mixture and the organic phase was removed. The mixture was then extracted twice with ethyl acetate, and the combined organic phases were washed with saturated sodium chloride solution, filtered through a hydrophobic filter and concentrated. The residue was taken up in 2 ml of DMSO and purified by preparative HPLC. This gave 30 mg of N-[2-(2-{[tert-butyl(dimethyl)silyl]oxy}ethyl)-6-(hydroxymethyl)-2H-indazol-5-yl]-6-(trifluoromethyl)pyridine-2-carboxamide.

UPLC-MS (Method A2): $R_t$=1.44 min

MS (ESIpos): m/z=495(M+H)$^+$ $^1$H NMR (300 MHz, DMSO-d6): δ [ppm]=−0.16−−0.12 (m, 6H), 0.75-0.79 (m, 9H), 4.05 (t, 2H), 4.48 (t, 2H), 4.69 (d, 2H), 5.75-5.77 (m, 1H), 7.57 (s, 1H), 8.18 (dd, 1H), 8.30-8.33 (m, 1H), 8.38 (t, 1H), 8.45 (d, 1H), 8.51 (s, 1H), 11.20 (s, 1H).

Stage B:

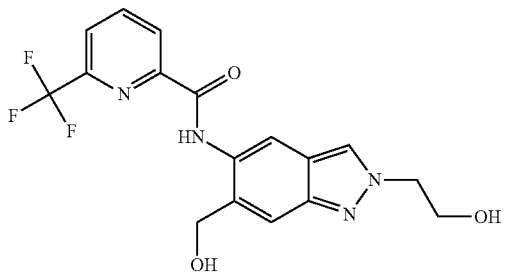 [SMILES: O=C(Nc1cc2cn(CCO)nc2cc1CO)c1cccc(C(F)(F)F)n1]

33 mg (0.07 mmol) of N-[2-(2-{[tert-butyl(dimethyl)silyl]oxy}ethyl)-6-(hydroxymethyl)-2H-indazol-5-yl]-6-(trifluoromethyl)pyridine-2-carboxamide were dissolved in 1 ml of THF and admixed with 100 μl (0.10 mmol) of a 1 M solution of tetrabutylammonium fluoride in THF. The reaction mixture was stirred at 25° C. for 1 h. The mixture was diluted with water and extracted twice with ethyl acetate, and the combined organic phases were washed with saturated sodium chloride solution, filtered through a hydrophobic filter, concentrated and dried under reduced pressure. 25 mg of N-[2-(2-hydroxyethyl)-6-(hydroxymethyl)-2H-indazol-5-yl]-6-(trifluoromethyl)pyridine-2-carboxamide (Example 7) were obtained.

UPLC-MS (Method A2): $R_t$=0.87 min

MS (ESIpos): m/z=381 (M+H)$^+$ $^1$H NMR (300 MHz, DMSO-d6): δ [ppm]=3.87 (q, 2H), 4.44 (t, 2H), 4.69 (d, 2H), 4.98 (t, 1H), 5.70-5.81 (m, 1H), 7.57 (s, 1H), 8.11-8.23 (m, 1H), 8.31-8.42 (m, 2H), 8.43-8.49 (m, 1H), 8.51 (s, 1H), 11.20 (s, 1H).

Example 8

N-[6-(2-Hydroxypropan-2-yl)-2-(oxetan-3-ylmethyl)-2H-indazol-5-yl]-6-(trifluoromethyl)pyridine-2-carboxamide

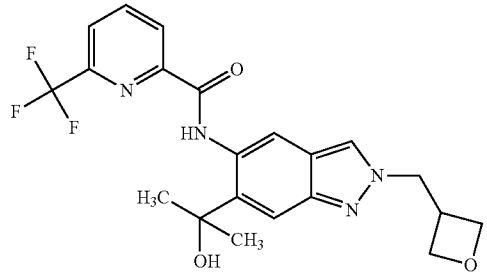 [SMILES: CC(C)(O)c1cc2nn(CC3COC3)cc2cc1NC(=O)c1cccc(C(F)(F)F)n1]

50 mg (0.12 mmol) of methyl 2-(oxetan-3-ylmethyl)-5-({[6-(trifluoromethyl)pyridin-2-yl]carbonyl}amino)-2H-indazole-6-carboxylate (Intermediate 4-1) were dissolved in 500 μl of THF and admixed with 576 μl (0.58 mmol) of a 1 M methylmagnesium bromide solution in THF. The reaction mixture was stirred at 25° C. for 60 min. Subsequently, 20 ml of a saturated aqueous ammonium chloride solution were added cautiously and the mixture was concentrated. The aqueous phase was extracted twice with ethyl acetate, and the organic phases were combined, dried over magnesium sulphate, filtered and concentrated. The residue was dissolved in 2.0 ml of DMSO and purified by preparative HPLC. The product-containing fractions were freeze-dried. 30 mg of the title compound were obtained.

UPLC-MS (Method A2): $R_t$=1.03 min

MS (ESIpos): m/z=435 (M+H)$^+$ $^1$H NMR (400 MHz, DMSO-d6): δ [ppm]=1.62 (s, 6H), 3.45-3.61 (m, 1H), 4.48 (t, 2H), 4.66 (dd, 2H), 4.72 (d, 2H), 5.94 (s, 1H), 7.57 (s, 1H), 8.16 (d, 1H), 8.33-8.42 (m, 2H), 8.42-8.47 (m, 1H), 8.72 (s, 1H), 12.36 (s, 1H).

Example 9

N-[6-(Hydroxymethyl)-2-(oxetan-3-ylmethyl)-2H-indazol-5-yl]-6-(trifluoromethyl)pyridine-2-carboxamide

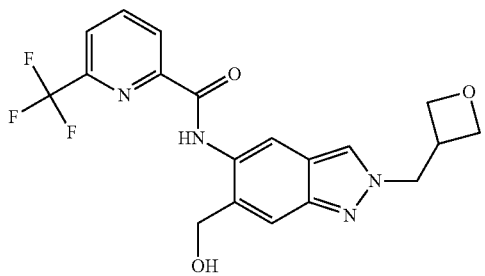 [SMILES: O=C(Nc1cc2cn(CC3COC3)nc2cc1CO)c1cccc(C(F)(F)F)n1]

75 mg (0.17 mmol) of methyl 2-(oxetan-3-ylmethyl)-5-({[6-(trifluoromethyl)pyridin-2-yl]carbonyl}amino)-2H-indazole-6-carboxylate (Intermediate 4-1) were dissolved in 1 ml of a mixture of THF/methanol (1:1), and 8 mg (0.21 mmol) of sodium borohydride were added. The mixture was left to stir at 25° C. for 60 min. The reaction mixture was concentrated, and the residue was admixed with water. The suspension was stirred vigorously for 15 min, and the solids were filtered off with suction, washed twice with water and twice with diethyl ether, and dried under reduced pressure. 48 mg of the title compound were obtained.

UPLC-MS (Method A2): $R_t$=0.94 min
MS (ESIpos): m/z=407 (M+H)$^+$
$^1$H NMR (300 MHz, DMSO-d6): δ [ppm]=3.55 (s, 1H), 4.48 (t, 2H), 4.61-4.77 (m, 6H), 7.57 (s, 1H), 8.18 (dd, 1H), 8.33-8.49 (m, 3H), 8.51 (s, 1H), 11.21 (s, 1H).

Example 10

N-{6-(2-Hydroxypropan-2-yl)-2-[3-(methylsulphonyl)propyl]-2H-indazol-5-yl}-6-(trifluoromethyl)pyridine-2-carboxamide

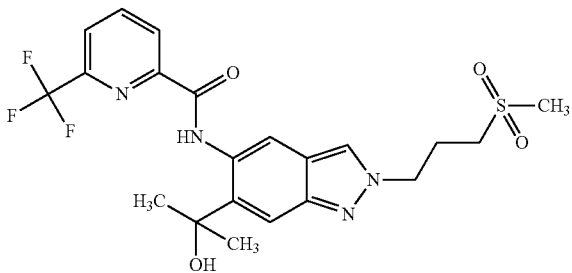 [SMILES: CC(C)(O)c1cc2nn(CCCS(C)(=O)=O)cc2cc1NC(=O)c1cccc(C(F)(F)F)n1]

A mixture of 500 mg (1.32 mmol) of N-[6-(2-hydroxypropan-2-yl)-1H-indazol-5-yl]-6-(trifluoromethyl)pyridine-2-carboxamide (Intermediate 5-1), 569 mg of potassium carbonate and 114 mg of potassium iodide in 5.0 ml of DMF was stirred at room temperature for 15 min. 414 mg of 1-bromo-3-(methylsulphonyl)propane were added and the mixture was stirred at room temperature overnight. Water was added, the mixture was twice extracted with ethyl acetate and the extracts were washed with sodium chloride solution and concentrated. The residue was purified by column chromatography (dichloromethane/methanol gradient). The product fraction was stirred with diethyl ether, filtered and dried. 59 mg of the title compound were obtained.

UPLC-MS (Method A2): $R_t$=1.02 min
MS (ESIpos): m/z=485 (M+H)+
$^1$H-NMR (300 MHz, DMSO-d$_6$): δ [ppm]=1.63 (s, 6H), 2.26-2.42 (m, 2H), 2.99 (s, 3H), 3.06-3.16 (m, 2H), 4.55 (t, 2H), 5.96 (s, 1H), 7.60 (s, 1H), 8.16 (d, 1H), 8.33-8.48 (m, 3H), 8.73 (s, 1H), 12.37 (s, 1H).

Example 11

N-[2-(3-Hydroxy-3-methylbutyl)-6-(2-hydroxypropan-2-yl)-2H-indazol-5-yl]-6-(trifluoromethyl)pyridine-2-carboxamide

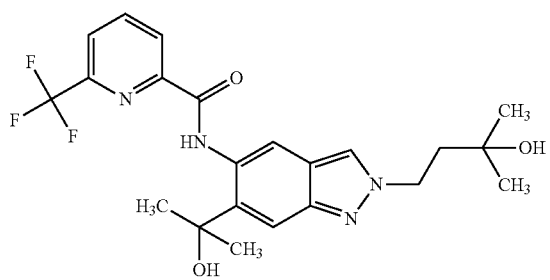 [SMILES: CC(C)(O)CCn1cc2cc(NC(=O)c3cccc(C(F)(F)F)n3)c(C(C)(C)O)cc2n1]

Preparation Method 1

705 mg (1.57 mmol) of methyl 2-(3-hydroxy-3-methylbutyl)-5-({[6-(trifluoromethyl)pyridin-2-yl]carbonyl}amino)-2H-indazole-6-carboxylate (Intermediate 4-4) were initially charged in 10 ml of THF and cooled in an ice-water cooling bath. 2.6 ml (5.0 equivalents) of 3M methylmagnesium bromide solution (in diethyl ether) were added and the mixture was left to stir while cooling with an ice bath for 1 h and at room temperature for 4.5 h. Another 1 equivalent of the methylmagnesium bromide solution was added and the mixture was left to stir at room temperature for 20.5 h. Another 1 equivalent again of the methylmagnesium bromide solution was added and the mixture was left to stir at room temperature for 22 h. The reaction mixture was admixed with saturated aqueous ammonium chloride solution, stirred and extracted three times with ethyl acetate. The combined organic phases were washed with sodium chloride solution, filtered through a hydrophobic filter and concentrated. This gave 790 mg of a residue which was purified by means of preparative HPLC. This gave 234 mg of the title compound and 164 mg of a product fraction which was stirred with diethyl ether. After filtration with suction followed by drying, a further 146 mg of the title compound were obtained.

UPLC-MS (Method A1): $R_t$=1.10 min (UV detector: TIC), mass found 450.00.
$^1$H-NMR (400 MHz, DMSO-d$_6$): δ [ppm]=1.14 (s, 6H), 1.61 (s, 6H), 1.99-2.08 (m, 2H), 4.42-4.55 (m, 3H), 5.93 (s, 1H), 7.56 (s, 1H), 8.15 (dd, 1H), 8.32-8.39 (m, 2H), 8.41-8.47 (m, 1H), 8.70 (s, 1H), 12.34 (s, 1H).

Preparation Method 2

A mixture of 500 mg (1.37 mmol) of N-[6-(2-hydroxypropan-2-yl)-1H-indazol-5-yl]-6-(trifluoromethyl)pyridine-2-carboxamide (Intermediate 5-1), 569 mg of potassium carbonate and 114 mg of potassium iodide in 5 ml of DMF was stirred at room temperature for 15 min. 344 mg (1.5 equivalents) of 4-bromo-2-methylbutan-2-ol were added and the mixture was heated to 100° C. for 2 h. Another 0.5 equivalent of 4-bromo-2-methylbutan-2-ol was added and the mixture was stirred at room temperature for 16 h. The mixture was admixed with water and extracted twice with ethyl acetate, and the combined organic phases were washed with saturated sodium chloride solution and filtered through a hydrophobic filter and concentrated. The residue was purified by column chromatography purification on silica gel (hexane/ethyl acetate). This gave 100 mg of a product fraction which was stirred with diethyl ether. The solid was filtered and dried. 60 mg of the title compound were obtained.

$^1$H-NMR (400 MHz, DMSO-d$_6$): δ [ppm]=1.14 (s, 6H), 1.61 (s, 6H), 1.99-2.07 (m, 2H), 4.43-4.52 (m, 3H) 5.94 (s, 1H) 7.57 (s, 1H) 8.15 (dd, 1H) 8.33-8.40 (m, 2H), 8.42-8.48 (m, 1H), 8.71 (s, 1H), 12.35 (s, 1H)

Example 12

N-{6-(2-Hydroxypropan-2-yl)-2-[2-(methylsulpho-nyl)ethyl]-2H-indazol-5-yl}-6-(trifluoromethyl)pyridine-2-carboxamide

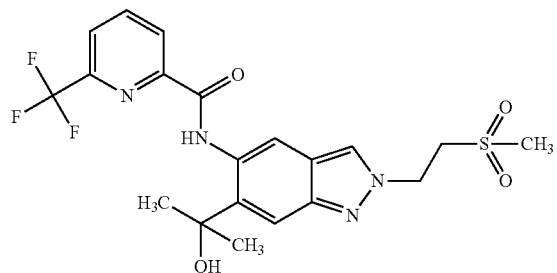 [SMILES: CC(C)(O)c1cc2nn(CCS(C)(=O)=O)cc2cc1NC(=O)c1cccc(C(F)(F)F)n1]

160 mg (0.44 mmol) of N-[6-(2-hydroxypropan-2-yl)-1H-indazol-5-yl]-6-(trifluoromethyl)pyridine-2-carboxamide (Intermediate 5-1) were suspended together with 182 mg of potassium carbonate and 36 mg of potassium iodide in 1.0 ml of DMF, and the mixture was stirred at room temperature for 15 min. Then 123 mg of 2-bromoethyl methyl sulphone (0.66 mmol) were added and the mixture was stirred at room temperature overnight. Water was added, the mixture was extracted twice with ethyl acetate and the extracts were washed with saturated aqueous sodium chloride solution, filtered through a hydrophobic filter and concentrated. Purification of the residue by preparative HPLC gave 20 mg of the title compound.

UPLC (Method A2): R$_t$=1.01 min;

MS (ESIpos): m/z=471 (M+H)+

$^1$H NMR (400 MHz, DMSO-d$_6$): δ [ppm]=1.63 (s, 6H), 2.90 (s, 3H), 3.85 (t, 2H), 4.86 (t, 2H), 5.97 (s, 1H), 7.59 (s, 1H), 8.13-8.19 (m, 1H), 8.37 (s, 1H), 8.41-8.48 (m, 2H), 8.74 (s, 1H), 12.37 (s, 1H).

Example 13

6-(Difluoromethyl)-N-[2-(3-hydroxy-3-methyl-butyl)-6-(2-hydroxypropan-2-yl)-2H-indazol-5-yl]pyridine-2-carboxamide

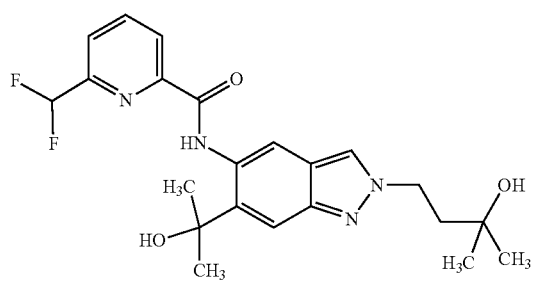 [SMILES: CC(C)(O)CCn1cc2cc(NC(=O)c3cccc(C(F)F)n3)c(C(C)(C)O)cc2n1]

Preparation Method 1

A mixture of 250 mg of 6-(difluoromethyl)-N-[6-(2-hydroxypropan-2-yl)-1H-indazol-5-yl]pyridine-2-carboxamide (crude product of Intermediate 5-2), 144 mg of potassium iodide and 239 mg of potassium carbonate in 2.5 ml of DMF was stirred at room temperature for 15 min. 145 mg (0.87 mmol) of 4-bromo-2-methylbutan-2-ol were added, the mixture was stirred at 110° C. for 3 h, another 96 mg of 4-bromo-2-methylbutan-2-ol were added and the mixture was stirred at 110° C. for 4 h. Water was added, the mixture was extracted twice with ethyl acetate and the extract was washed with semisaturated aqueous sodium chloride solution, filtered through a hydrophobic filter and concentrated. Purification was effected by column chromatography on silica gel (hexane/ethyl acetate). 61 mg of the title compound were obtained.

UPLC-MS (Method A1): R$_t$=1.00 min (UV detector: TIC), mass found 432.00.

$^1$H-NMR (300 MHz, DMSO-d$_6$): δ [ppm]=1.14 (s, 6H), 1.63 (s, 6H), 1.97-2.08 (m, 2H), 4.41-4.55 (m, 3H), 5.99 (s, 1H), 7.03 (t, 1H), 7.56 (s, 1H), 7.94-8.00 (m, 1H), 8.24-8.38 (m, 3H), 8.71 (s, 1H), 12.49 (s, 1H).

Preparation Method 2

Analogously to the preparation of Example 11 (Preparation Method 1), 3.00 g of methyl 5-({[6-(difluoromethyl)pyridin-2-yl]carbonyl}amino)-2-(3-hydroxy-3-methyl-butyl)-2H-indazole-6-carboxylate (Intermediate 4-11) were reacted with 3M methylmagnesium bromide solution (in diethyl ether). After purification of the crude product by stirring with diethyl ether, filtering followed by preparative HPLC, 1.37 g of the title compound were obtained.

Example 14

6-(Difluoromethyl)-N-{6-(2-hydroxypropan-2-yl)-2-[2-(methylsulphonyl)ethyl]-2H-indazol-5-yl}pyridine-2-carboxamide

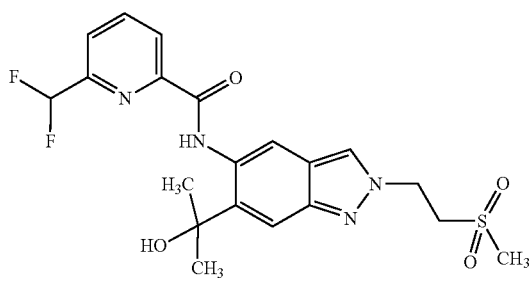 [SMILES: CC(C)(O)c1cc2nn(CCS(C)(=O)=O)cc2cc1NC(=O)c1cccc(C(F)F)n1]

A mixture of 250 mg of 6-(difluoromethyl)-N-[6-(2-hydroxypropan-2-yl)-1H-indazol-5-yl]pyridine-2-carboxamide (crude product of Intermediate 5-2), 144 mg of potassium iodide and 239 mg of potassium carbonate in 2.5 ml of DMF was stirred at room temperature for 15 min. 162 mg of 2-bromoethyl methyl sulphone (0.87 mmol) were added and the mixture was stirred at 110° C. for 3 h. Water was added, the mixture was extracted twice with ethyl acetate and the extract was washed with semisaturated aqueous sodium chloride solution, filtered through a hydrophobic filter and concentrated. The residue was purified by preparative HPLC and the product fractions were additionally purified by column chromatography purification on silica gel (hexane/ethyl acetate). 40 mg of the title compound were obtained.

$^1$H-NMR (400 MHz, DMSO-$d_6$): δ [ppm]=1.65 (s, 6H), 2.90 (s, 3H), 3.85 (t, 2H), 4.85 (t, 2H), 6.03 (s, 1H), 7.04 (t, 1H), 7.59 (s, 1H), 7.98 (d, 1H), 8.25-8.36 (m, 2H), 8.43 (s, 1H), 8.75 (s, 1H), 12.52 (s, 1H).

Example 15

6-(Difluoromethyl)-N-[6-(2-hydroxypropan-2-yl)-2-(3-hydroxypropyl)-2H-indazol-5-yl]pyridine-2-carboxamide Stage A:

Preparation of N-[2-(3-{[tert-butyl(dimethyl)silyl]oxy}propyl)-6-(2-hydroxypropan-2-yl)-2H-indazol-5-yl]-6-(difluoromethyl)pyridine-2-carboxamide

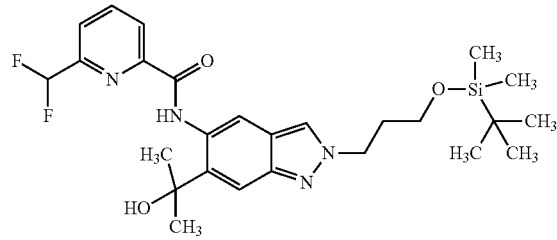 [SMILES: CC(C)(O)c1cc2nn(CCCO[Si](C)(C)C(C)(C)C)cc2cc1NC(=O)c1cccc(C(F)F)n1]

A mixture of 250 mg of 6-(difluoromethyl)-N-[6-(2-hydroxypropan-2-yl)-1H-indazol-5-yl]pyridine-2-carboxamide (Intermediate 5-2), 48 mg of potassium iodide and 239 mg of potassium carbonate in 2.5 ml of DMF was stirred at room temperature for 15 min. 219 mg (0.87 mmol, 1.5 equivalents) of (3-bromopropoxy)(tert-butyl)dimethylsilane were added and the mixture was stirred at 110° C. for 3 h. Another 1 equivalent of (3-bromopropoxy)(tert-butyl)dimethylsilane was added and the mixture was stirred at 100° C. for 4 h. Water was added, the mixture was extracted with ethyl acetate and the extract was washed with aqueous sodium chloride solution, filtered through a hydrophobic filter and concentrated. The residue was purified by column chromatography (hexane/ethyl acetate). 92 mg of the title compound were obtained.

Stage B:

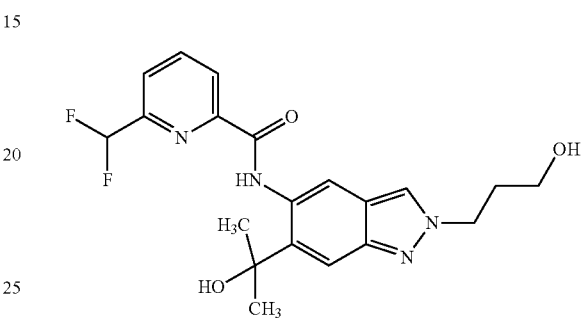

Analogously to the preparation of Example 6, Stage B, 92 mg of N-[2-(3-{[tert-butyl(dimethyl)silyl]oxy}propyl)-6-(2-hydroxypropan-2-yl)-2H-indazol-5-yl]-6-(difluoromethyl)pyridine-2-carboxamide were reacted with 0.53 ml of a 1 M solution of tetrabutylammonium fluoride in THF within 1 h. Aqueous workup as in Example 6 and purification by preparative HPLC gave 46 mg of the title compound.

UPLC-MS (Method A1): $R_t$=0.92 min (UV detector: TIC), mass found 404.00.

$^1$H-NMR (400 MHz, DMSO-$d_6$): δ [ppm]=1.64 (s, 6H), 2.05 (quin, 2H), 3.35-3.46 (m, 2H), 4.45 (t, 2H), 4.64 (t, 1H), 5.99 (s, 1H), 7.04 (t, 1H), 7.57 (s, 1H), 7.95-7.99 (m, 1H), 8.25-8.36 (m, 3H), 8.73 (s, 1H), 12.50 (s, 1H).

Example 16

N-[6-(2-Hydroxypropan-2-yl)-2-(4,4,4-trifluorobutyl)-2H-indazol-5-yl]-6-(trifluoromethyl)pyridine-2-carboxamide

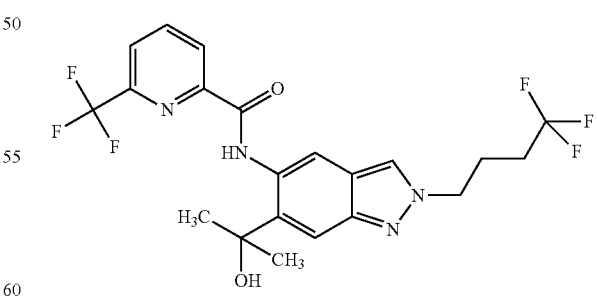

A mixture of 210 mg (0.58 mmol) of N-[6-(2-hydroxypropan-2-yl)-1H-indazol-5-yl]-6-(trifluoromethyl)pyridine-2-carboxamide (Intermediate 5-1) in 3 ml of DMF was admixed with 0.11 ml (0.87 mmol) of 1,1,1-trifluoro-4-iodobutane and 239 mg of potassium carbonate, and the mixture was stirred at 80° C. for 6 h. After addition of water, the mixture was extracted three times with ethyl acetate, and the combined organic phases were washed with saturated sodium chloride solution, filtered through a hydrophobic filter and concentrated. The crude product was purified by preparative HPLC. 19 mg of the title compound were obtained.

UPLC-MS (Method A1): $R_t$=1.27 min (UV detector: TIC), mass found 474.15.

$^1$H-NMR (400 MHz, DMSO-$d_6$): δ [ppm]=1.62 (s, 6H), 2.10-2.33 (m), 4.49 (t, 2H), 5.94 (s, 1H), 7.59 (s, 1H), 8.13-8.18 (m, 1H), 8.32-8.41 (m, 2H), 8.41-8.47 (m, 1H), 8.72 (s, 1H), 12.35 (s, 1H).

Example 17

N-{6-(2-Hydroxypropan-2-yl)-2-[3-(trifluoromethoxy)propyl]-2H-indazol-5-yl}-6-(trifluoromethyl)pyridine-2-carboxamide

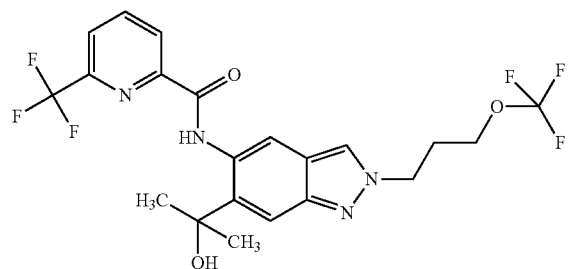 [SMILES: CC(C)(O)c1cc2nn(CCCOC(F)(F)F)cc2cc1NC(=O)c1cccc(C(F)(F)F)n1]

150 mg (0.33 mmol) of N-[6-(2-hydroxypropan-2-yl)-1H-indazol-5-yl]-6-(trifluoromethyl)pyridine-2-carboxamide (Intermediate 5-1) were initially charged in 2 ml of THF. 58 mg (0.40 mmol) of 3-(trifluoromethoxy)propan-1-ol, 131 mg of triphenylphosphine and 71 µl of diisopropyl azodicarboxylate (DIAD, CAS 2446-83-5) were added and the mixture was stirred at room temperature for 19 h. 0.83 ml of sodium hydroxide solution (2M) was added and the mixture was stirred at 40° C. for 5 h. The mixture was diluted with water and extracted three times with ethyl acetate, and the combined organic phases were concentrated and purified by preparative HPLC. 16 mg of the title compound were obtained as a crude product.

UPLC-MS (Method A2): $R_t$=1.26 min (UV detector: TIC), mass found 490.14.

$^1$H-NMR (400 MHz, DMSO-$d_6$, selected signals): δ [ppm]=1.61 (s, 6H), 1.84 (d, 1H), 2.32 (quint., 2H), 4.08 (t, 2H), 4.51 (t, 2H), 7.58 (s, 1H), 8.15 (m, 1H), 8.31-8.39 (m, 2H), 8.44 (d, 1H), 8.72 (s, 11H), 12.35 (s, 1H).

Example 18

N-{6-(2-Hydroxypropan-2-yl)-2-[3-(2,2,2-trifluoroethoxy)propyl]-2H-indazol-5-yl}-6-(trifluoromethyl)pyridine-2-carboxamide

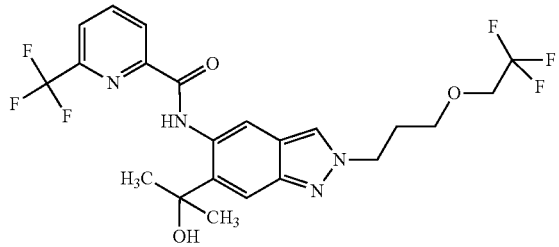 [SMILES: CC(C)(O)c1cc2nn(CCCOCC(F)(F)F)cc2cc1NC(=O)c1cccc(C(F)(F)F)n1]

Analogously to the preparation of Example 11 (Preparation Method 1), 52 mg (0.10 mmol) of methyl 2-[3-(2,2,2-trifluoroethoxy)propyl]-5-({[6-(trifluoromethyl)pyridin-2-yl]carbonyl}amino)-2H-indazole-6-carboxylate (Intermediate 4-10) in 3 ml of THF were reacted with 2×171 µl of 3M magnesium bromide solution in diethyl ether. Purification by preparative HPLC gave 12 mg of the title compound.

UPLC-MS (Method A1): $R_t$=1.25 min (UV detector: TIC), mass found 504.16.

$^1$H-NMR (500 MHz, DMSO-$d_6$): δ [ppm]=1.63 (s, 6H), 2.20 (quin, 2H), 3.58 (t, 2H), 4.05 (q, 2H), 4.47 (t, 2H), 5.94 (s, 1H), 7.58 (s, 1H), 8.15 (dd, 1H), 8.32 (s, 1H), 8.36 (t, 1H), 8.45 (d, 1H), 8.73 (s, 1H), 12.36 (s, 1H).

Example 19

5-Fluoro-N-[2-(3-hydroxy-3-methylbutyl)-6-(2-hydroxypropan-2-yl)-2H-indazol-5-yl]-6-methylpyridine-2-carboxamide

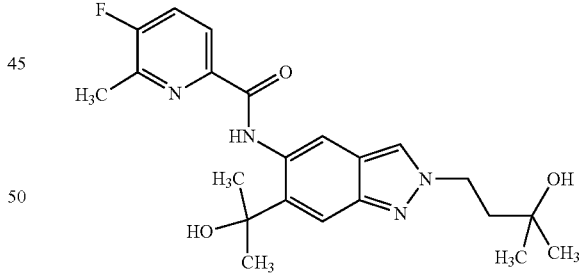

228 mg (0.31 mmol) of methyl 5-{[(5-fluoro-6-methylpyridin-2-yl)carbonyl]amino}-2-(3-hydroxy-3-methylbutyl)-2H-indazole-6-carboxylate (Intermediate 4-8) were initially charged in 4.5 ml of THF and cooled with an ice cooling bath. 0.63 ml of 3M methylmagnesium bromide solution (in diethyl ether) was added and the mixture was left to stir while cooling with an ice bath for 2 h and at room temperature for 21 h. The reaction mixture was admixed with saturated aqueous ammonium chloride solution and extracted three times with ethyl acetate. The combined organic phases were concentrated. The residue was purified by preparative HPLC. 82 mg of the title compound were obtained.

UPLC-MS (Method A2): $R_t$=1.03 min (UV detector: TIC), mass found 414.21.

$^1$H-NMR (400 MHz, DMSO-$d_6$): δ [ppm]=1.13 (s, 6H), 1.63 (s, 6H), 1.99-2.05 (m, 2H), 2.55-2.59 (m, 3H), 4.42-4.50 (m, 3H), 5.95 (s, 1H), 7.54 (s, 1H), 7.83 (t, 1H), 8.05 (dd, 1H), 8.31 (s, 1H), 8.68 (s, 1H), 12.33 (s, 1H).

Example 20

N-[2-(3-Hydroxy-3-methylbutyl)-6-(2-hydroxypropan-2-yl)-2H-indazol-5-yl]-6-methylpyridine-2-carboxamide

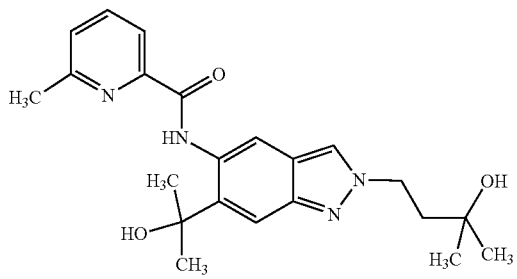 [SMILES: Cc1cccc(C(=O)Nc2cc3cn(CCC(C)(C)O)nc3cc2C(C)(C)O)n1]

278 mg (0.48 mmol) of methyl 2-(3-hydroxy-3-methylbutyl)-5-{[(6-methylpyridin-2-yl)carbonyl]amino}-2H-indazole-6-carboxylate (Intermediate 4-9) were initially charged in 5.0 ml of THF and cooled with an ice cooling bath. 0.97 ml of 3M methylmagnesium bromide solution (in diethyl ether) was added and the mixture was left to stir while cooling with an ice bath for 2 h and at room temperature for 20.5 h. Another 0.48 ml of 3M methylmagnesium bromide solution was added and the mixture was left to stir at room temperature for 67 h. The mixture was admixed with saturated aqueous ammonium chloride solution and extracted three times with ethyl acetate, and the extracts were washed with sodium chloride solution, filtered through a hydrophobic filter and concentrated. The residue was purified by preparative HPLC. 111 mg of the title compound were obtained.

UPLC-MS (Method A2): $R_t$=0.97 min (UV detector: TIC), mass found 396.22.

$^1$H-NMR (400 MHz, DMSO-$d_6$): δ [ppm]=1.15 (s, 6H), 1.64 (s, 6H), 2.00-2.08 (m, 2H), 2.61 (s, 3H), 4.41-4.59 (m, 3H), 5.92 (s, 1H), 7.50 (dd, 1H), 7.56 (s, 1H), 7.90-7.99 (m, 2H), 8.33 (s, 1H), 8.70 (s, 1H), 12.39 (s, 1H).

Example 21

6-(2-Hydroxypropan-2-yl)-N-[6-(2-hydroxypropan-2-yl)-2-(4,4,4-trifluorobutyl)-2H-indazol-5-yl]pyridine-2-carboxamide

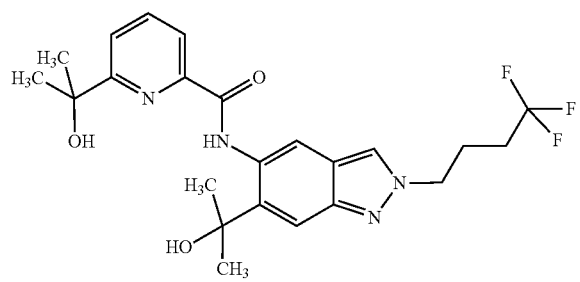 [SMILES: CC(C)(O)c1cccc(C(=O)Nc2cc3cn(CCCC(F)(F)F)nc3cc2C(C)(C)O)n1]

A solution of 72 mg (0.16 mmol) of methyl 5-({[6-(2-hydroxypropan-2-yl)pyridin-2-yl]carbonyl}amino)-2-(4,4,4-trifluorobutyl)-2H-indazole-6-carboxylate (Intermediate 4-7) in 10 ml of THF was cooled in an ice/water cooling bath. 0.26 ml of 3M methylmagnesium bromide solution in diethyl ether was added and the mixture was stirred for 2 h and then at room temperature for 20 h.

Another 1 equivalent of the 3M methylmagnesium bromide solution was added and the mixture was stirred at room temperature for 24 h. Saturated aqueous ammonium chloride solution was added, the mixture was three times extracted with ethyl acetate and the extracts were washed with sodium chloride solution and concentrated. Preparative HPLC gave 22 mg (31% of theory) of the title compound.

UPLC-MS (Method A2): $R_t$=1.15 min (UV detector: TIC), mass found 464.20.

$^1$H-NMR (400 MHz, DMSO-$d_6$): δ [ppm]=1.56 (s, 6H), 1.64 (s, 6H), 2.07-2.34 (m, 4H), 4.49 (t, 2H), 5.32 (s, 1H), 6.05 (s, 1H), 7.60 (s, 1H), 7.87 (dd, 1H), 7.99-8.05 (m, 2H), 8.35 (s, 1H), 8.79 (s, 11H), 12.45 (s, 1H).

Example 22

N-{2-[2-(1-Hydroxycyclopropyl)ethyl]-6-(2-hydroxypropan-2-yl)-2H-indazol-5-yl}-6-(trifluoromethyl)pyridine-2-carboxamide

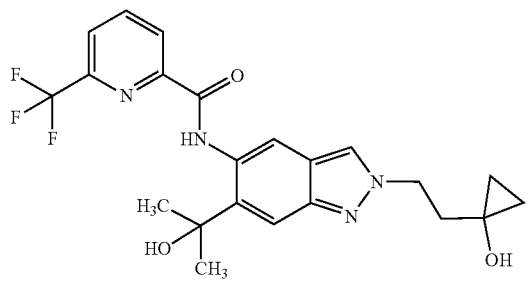 [SMILES: CC(C)(O)c1cc2nn(CCC3(O)CC3)cc2cc1NC(=O)c1cccc(C(F)(F)F)n1]

250 mg (0.69 mmol) of N-[6-(2-hydroxypropan-2-yl)-1H-indazol-5-yl]-6-(trifluoromethyl)pyridine-2-carboxamide (Intermediate 5-1) were initially charged in 5 ml of DMSO. 159 mg (0.96 mmol) of 1-(2-bromoethyl)cyclopropanol, 285 mg of potassium carbonate and 171 mg of potassium iodide were added and the mixture was stirred at 100° C. for 5 h. Water was added and the mixture was extracted three times with ethyl acetate. The combined organic phases were washed with sodium chloride solution, filtered through a hydrophobic filter and concentrated. The residue was purified by preparative HPLC (column: Waters XBridge C18 5p 100×30 mm, eluent A: water+0.1% by volume of formic acid (99%), eluent B: acetonitrile). Freeze-drying gave 45 mg of the title compound.

$^1$H-NMR (500 MHz, DMSO-$d_6$): δ [ppm]=0.18-0.22 (m, 2H), 0.48-0.52 (m, 2H), 1.62 (s, 6H), 2.08 (t, 2H), 4.54-4.60 (m, 2H), 5.36 (s, 1H), 5.96 (s, 1H), 7.57 (s, 1H), 8.16 (dd, 1H), 8.34-8.39 (m, 2H), 8.45 (d, 1H), 8.72 (s, 1H), 12.36 (s, 1H).

Assessment of Physiological Efficacy

IRAK4 Kinase Assay

The IRAK4-inhibitory activity of the present substances was measured in the IRAK4 TR-FRET assay (TR-FRET=Time Resolved Fluorescence Resonance Energy Transfer) described hereinafter.

Recombinant fusion protein from N-terminal GST (glutathione S-transferase) and human IRAK4, expressed in baculovirus-infected insect cells (Hi5, BTI-TN-5B1-4, cell line purchased from Invitrogen, catalogue No. B855-02) and purified via affinity chromatography, was used as enzyme. The substrate used for the kinase reaction was the biotinylated peptide biotin-Ahx-KKARFSRFAGSSPSQAS-FAEPG (SEQ ID NO: 1) (C-terminus in amide form) which can be purchased, for example, from Biosyntan GmbH (Berlin-Buch).

For the assay, 11 different concentrations in the range from 20 µM to 0.073 nM were prepared from a 2 mM DMSO solution of the test substance. 50 nl of the respective solution were pipetted into a black low-volume 384-well microtitre plate (Greiner Bio-One, Frickenhausen, Germany), 2 µl of a solution of IRAK4 in assay buffer [50 mM HEPES pH 7.5, 5 mM MgCl2, 1.0 mM dithiothreitol, 30 µM activated sodium orthovanadate, 0.1% (w/v) of bovine gamma-globulin (BGG) 0.04% (v/v) nonidet-P40 (Sigma)] were added and the mixture was incubated for 15 min to allow prebinding of the substances to the enzyme prior to the kinase reaction. The kinase reaction was then started by addition of 3 µl of a solution of adenosine triphosphate (ATP, 1.67 mM=final concentration in 5 µl of assay volume: 1 mM) and peptide substrate (0.83 µM=final concentration in 5 µl assay volume: 0.5 µM) in assay buffer, and the resulting mixture was incubated at 22° C. for the reaction time of 45 min. The concentration of the IRAK4 was adjusted to the respective activity of the enzyme and set such that the assay was carried out in the linear range. Typical concentrations were in the order of about 0.2 nM. The reaction was stopped by addition of 5 µl of a solution of TR-FRET detection reagents [0.1 µM streptavidin-XL665 (Cisbio Bioassays; France, catalogue No. 610SAXLG)] and 1.5 nM anti-phosphoserine antibody [Merck Millipore, "STK Antibody", catalogue No. 35-002] and 0.6 nM LANCE EU-W1024-labelled anti-mouse-IgG antibody (Perkin-Elmer, product No. AD0077; alternatively, it is possible to use a terbium cryptate-labelled anti-mouse-IgG antibody from Cisbio Bioassays) in aqueous EDTA solution (100 mM EDTA, 0.4% [w/v] bovine serum albumin [BSA] in 25 mM HEPES pH 7.5).

The resulting mixture was incubated at 22° C. for 1 h to allow formation of a complex of the biotinylated phosphorylated substrate and the detection reagents. The amount of the phosphorylated substrate was then evaluated by measuring the resonance energy transfer from europium chelate-labelled anti-mouse-IgG antibody to streptavidin-XL665. To this end, the fluorescence emissions at 620 nm and 665 nm were measured after excitation at 350 nm in a TR-FRET measuring instrument, for example a Rubystar (BMG Labtechnologies, Offenburg, Germany) or a Viewlux (Perkin-Elmer).

The ratio of the emissions at 665 nm and 622 nm was taken as a measure of the amount of phosphorylated substrate. The data were normalized (enzyme reaction without test substance=0% inhibition; all other assay components but no enzyme=100% inhibition). Typically, the test substances were tested on the same microtitre plates at 11 different concentrations in the range from 20 µM to 0.073 nM (20 µM, 5.7 µM, 1.6 µM, 0.47 µM, 0.13 µM, 38 nM, 11 nM, 3.1 nM, 0.89 nM, 0.25 nM and 0.073 nM). The dilution series were prepared prior to the assay (2 mM to 7.3 nM in 100% DMSO) by serial dilutions. The $IC_{50}$ values were calculated by a 4-parameter fit.

TABLE 1

$IC_{50}$ values of the example compounds in the IRAK4 kinase assay

| Example | $IC_{50}$ [nM] |
|---|---|
| 1 | 30.6 |
| 2 | 135.6 |
| 3 | 7.2 |
| 4 | 52.7 |
| 5 | 264.5 |
| 6 | 35.7 |
| 7 | 867.3 |
| 8 | 15.0 |
| 9 | 103.8 |
| 10 | 18.5 |
| 11 | 3.4 |
| 12 | 10.7 |
| 13 | 1.3 |
| 14 | 10.8 |
| 15 | 12.3 |
| 16 | 21.5 |
| 17 | 36.0 |
| 18 | 47.5 |
| 19 | 8.9 |
| 20 | 13.3 |
| 21 | 117.2 |
| 22 | 3.7 |

The inhibitory activity of the present substances of the general formula (III) with respect to IRAK4 was likewise measured in the IRAK4 TR-FRET assay described above. The following are mentioned by way of example: the compound Intermediate 4-2 with an $IC_{50}$=21.7 nM, Intermediate 4-3 with an $IC_{50}$=13.0 nM and Intermediate 4-4 with an $IC_{50}$=6.2 nM.

TNF-α Secretion in THP-1 Cells

This test is suited to test substances for their ability to inhibit secretion of TNF-α (tumour necrosis factor alpha) in THP-1 cells (human monocytic acute leukaemia cell line). TNF-α is a cytokine involved in inflammatory processes. In this test, TNF-α secretion is triggered by incubation with bacterial lipopolysaccharide (LPS).

THP-1 cells were kept in continuous suspension cell culture [RPMI 1460 medium with L-Glutamax (Gibco, Cat. No. 61870-044) supplemented with foetal calf serum (FCS) 10% (Invitrogen, Cat. No. 10082-147), 1% penicillin/streptomycin (Gibco BRL, Cat. No. 15140-114)] and should not exceed a cell concentration of $1 \times 10^6$ cells/ml. The assay was carried out in cell culture medium (RPMI 1460 medium with L-Glutamax supplemented with FCS 10%).

In each case 2-2.5 µl of the cell suspension (corresponds to 4000 cells) per well were dispensed into a 384-well test plate (Greiner, Cat. No. 784076), in each of which 40-50 nl substance had been dissolved in 100% DMSO. This was done using 10 different concentrations in the range from 20 µM to 0.073 nM for each substance. The cells were incubated at room temperature for 15 min. 2-2.5 µl of 0.1 µg/ml LPS (Sigma, Escherichia coli 055:B5, Cat. No. L5418) dissolved in cell culture medium (final concentration 0.05 µg/ml) were then dispensed into each well. As neutral control, cells were treated with 0.05 µg/ml LPS and 1% DMSO and, as inhibitor control, with 1% DMSO only.

The plates were centrifuged at 80 g for 30 s and incubated at 37° C., 5% $CO_2$ and 95% atmospheric humidity for 17 h. The amount of TNF-α was determined using the TNF-alpha HTRF Detection Kit (Cisbio, Cat. No. 62TNFPEB/C). To this end, 2 µl of the detection solution in each case, consisting of anti-TNF-α-XL665 conjugate and anti-TNF-α-cryptate conjugate dissolved in the reconstitution buffer in accordance with the manufacturer's instructions, were added for the HTRF (Homogeneous Time-Resolved Fluorescence) test. After the addition, the mixture was incubated either at room temperature for 3 h or at 4° C. overnight. The signals were then read at 620/665 nm using an HTRF-enabled measuring instrument such as the BMG PheraStar.

The activity of the substances is expressed as the ratio between neutral and inhibitor control in percent. The $IC_{50}$ values were calculated using a 4-parameter fit.

TABLE 2

$IC_{50}$ values of the example compounds with respect to the secretion of TNF-α in THP-1 cells

| Example | $IC_{50}$ [µM] |
|---|---|
| 1 | 1.0 |
| 2 | 15.1 |
| 3 | 0.7 |
| 4 | 5.6 |
| 5 | 5.4 |
| 6 | 0.9 |
| 7 | 16.4 |
| 8 | 1.0 |
| 9 | 6.5 |
| 10 | 1.0 |
| 11 | 0.2 |
| 12 | 0.3 |
| 13 | 0.1 |
| 14 | 0.2 |
| 15 | 0.2 |
| 16 | 0.2 |
| 17 | 0.5 |
| 18 | 0.3 |
| 19 | 0.1 |
| 20 | 0.2 |
| 21 | 1.8 |

In Vitro LPS (Lipopolysaccharide)-Induced Cytokine Production in Human PBMCs (Peripheral Blood Mononuclear Cells)

The effect of the present compounds of the general formula (I) on induced cytokine production in human PBMCs was examined. Cytokine production was induced here by LPS, a TLR4 ligand, which leads to activation of the IRAK4-mediated signal path.

The human PBMCs were obtained from anti-coagulated human whole blood. For this purpose, 15 ml of Ficoll-Paque (Biochrom, Cat. No. L6115) were initially pipetted in Leucosep tubes and 20 ml of human blood were added. After centrifugation of the blood at 800 g for 15 min at room temperature, the plasma including the platelets was removed and discarded. The PBMCs were transferred into centrifugation tubes and made up with PBS (phosphate-buffered saline) (Gibco, Cat. No. 14190). The cell suspension was centrifuged at room temperature at 250 g for 10 min and the supernatant was discarded. The PBMCs were resuspended in complete medium (RPMI 1640, without L-glutamine (PAA, Cat. No. E15-039), 10% FCS; 50 U/ml penicillin, 50 µg/ml streptomycin (PAA, Cat. No. P11-010) and 1% L-glutamine (Sigma, Cat. No. G7513)).

The assay was also carried out in complete medium. The PBMCs were seeded in 96-well plates at a cell density of $2.5 \times 10^5$ cells/well. The present compounds were subjected to serial dilution in a constant volume of 100% DMSO and used in the assay at 8 different concentrations in the range from 10 µM to 3 nM such that the final DMSO concentration was 0.4% DMSO. Prior to the actual stimulation, the cells were then pre-incubated therewith for 30 min. To induce cytokine secretion, the cells were stimulated with 0.1 µg/ml LPS (Sigma, *Escherichia coli* 0128:B12, Cat. No. L2887) for 24 hours. Cell viability was determined using the CellTiter-Glo luminescent assay (Promega, Cat. No. G7571 (G755/G756A)) in accordance with the manufacturer's instructions. The amount of secreted TNF-α in the cell culture supernatant was determined using the Human ProInflammatory 9-Plex Tissue Culture Kit (MSD, Cat. No. K15007B) in accordance with the instructions of the manufacturer. By way of example, Example Compound 11 and Example Compound 12 have activity ≤1 µM.

In Vitro TLR-4/TLR-7-Induced Interleukin (IL)-23 Secretion of Human Dendritic Cells (DCs)

The effect of the present compounds of the general formula (I) on the induced production of the pro-inflammatory cytokine IL-23 which plays an essential role for the generation of TH-17 cells was examined in human DCs. It is stated that TH-17 cells play a crucial role in the pathogenesis of disorders such as rheumatoid arthritis, psoriatic arthritis, Bekhterev's disease (ankylosing spondylitis) or else multiple sclerosis (Lubberts, Nat. Rev. Rheumatol., 2015; Marinoni et al., Auto. Immun. Highlights, 2014; Isailovic et al., J. Autoimmun., 2015; Staschke et al., J Immunol., 2009). To detect the effect of the present compounds on IL-23 production, human primary monocytes (isolated from human PBMCs using magnetic separation [Miltenyi Biotech, Monocyte Isolation Kit, Cat. No. 130-091-153] and by the addition of growth factors (recombinant human GM-CSF [PeproTech, Cat. No. 300-03] and IL-4 [PeproTech, Cat. No. 200-04]) in complete medium (VLE (very low endotoxin) RPMI 1640 [Biochrom AG, Cat. No. FG1415], 10% Fetal Bovine Serum (FBS) [Gibco, Cat-No. 10493-106]; 50 µM β-mercaptoethanol (Gibco, Cat. No. 31350], 50 U/ml penicillin and streptomycin [Gibco, Cat. No. 15140-114]) were differentiated in culture over 6 days to DCs. After the DCs had been harvested, they were resuspended in complete medium and seeded in a cell density of $2 \times 10^5$ cells/well in a 96-well plate (Costar, Cat. No. 3599). The present compounds were subjected to serial dilution in a constant volume of 100% DMSO and used in the assay at 9 different concentrations in the range from 10 µM to 1 nM. It was ensured here that the DMSO concentration present was always 0.1% DMSO for each of the 9 concentrations used. There was a 30-minute preincubation of the DCs with the present compounds. Thereafter, the DCs were stimulated to produce IL-23 by the addition of 10 ng/ml LPS (Sigma, *Escherichia coli* serotype 0127:B8, Cat. No. L3129) (TLR4 ligand) and 2.5 µg/ml of TLR-7/8 ligand R848 (Invivogen, Cat. No. tlr1-r848-5), both activate the IRAK4-mediated signalling pathway, in an incubator (37° C., 95% rH, 5% $CO_2$) for 24 hours. After this incubation time of 24 hours, the supernatants were harvested and analysed using a commercially available hIL-23 ELISA (eBiosciences, Cat. No. 88-7237-88), which was conducted according to the manufacturer's instructions. The results of the inhibition of IL-23 in human DCs are shown by way of example for Example Compound 12 in FIG. 1.

In Vitro TLR-7/8- or TLR-9-Induced IFNα Production of Human Plasmacytoid Dendritic Cells (pDCs)

With the aid of this test, the effect of the present compounds of the general formula (I) on the production of IFNα (interferon-alpha) in human pDCs, a key cytokine in the pathogenesis of systemic lupus erythematosus (Mathian et al., Arthritis Rheum, 2009; Crow M. K., Rheum Dis Clin N Am, 2010), can be studied. For this purpose, human PBMCs were isolated from whole blood as described above and the plasmacytoid DCs (pDCs) were isolated therefrom using a commercially available cell separation kit (Miltenyi Biotech, Plasmacytoid Dendritic Cell Isolation Kit II, Cat. No. 130-097-415). The obtained pDCs were resuspended in complete medium (RPMI 1640+GlutaMax [Gibco, Cat. No. 61870-010] supplemented with 10% FBS [Gibco, Cat. No. 10493-106] and 50 U penicillin/streptomycin [Gibco, Cat. No. 15140-114]) and seeded at a cell density of $5 \times 10^4$ cells/well in a 96-well microtitre plate (Costar, Cat. No. 3599). The present compounds were subjected to serial dilution in a constant volume of 100% DMSO and used in the assay at 9 different concentrations in the range from 10 µM to 1 nM. It was ensured that the DMSO concentration present was always 0.1% DMSO for each of the 9 concentrations tested. There was a 30-minute preincubation of the pDCs with the present compounds. The pDCs were stimulated either with a TLR7/8 ligand (imiquimod, R837, Invivogen, Cat. No. tlr1-imq) or with a TLR-9 ligand (CPG-A, ODN2216, Invivogen, Cat. No. tlr1-2216-1) and this led to activation of the IRAK4-mediated signalling pathways. After incubation for 24 hours, the cell culture supernatants were removed and analysed using a commercially available human IFNα ELISA (IFNalpha Multi-Subtype ELISA Kit, pbl Assay Science, Cat. No. 41105-1). The results of the inhibition of IFNα in human plasmacytoid DCs are shown by way of example for Example Compound 12 in FIG. 2.

In Vivo Model of TLR-Mediated Inflammation

Figure 3:
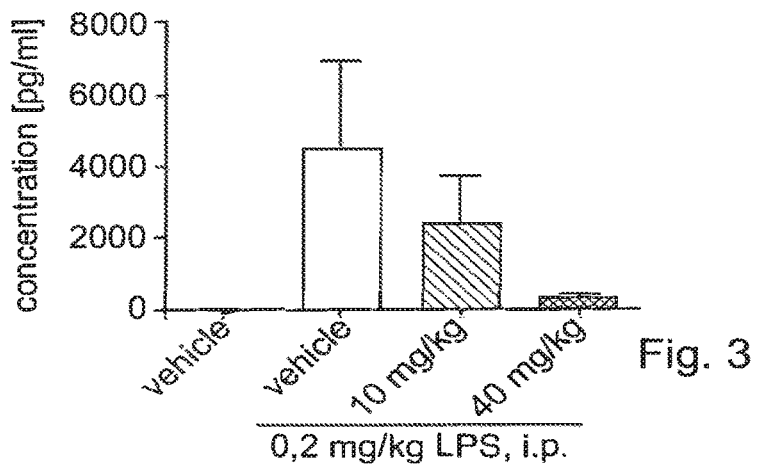

The present compounds of the general formula (I) were examined for their in vivo efficacy in a model of in vivo TLR-mediated inflammation. This mechanistic model particularly shows the potential effect of the present compounds on TLR4-mediated disorders, since an LPS-mediated inflammation model was used. In this model, female Balb/c mice (about 8 weeks old; Charles River Laboratories, Germany) were divided into groups of 5 animals each. The control group was treated with the vehicle in which the substance had been dissolved (substance vehicle) and also with the vehicle in which the LPS had been dissolved. The substance treatment groups as well as the positive control group received 0.2 mg LPS/kg body weight (Sigma, Cat. No. L4391) (lipopolysaccharides from *E. coli* 0111:B4) intraperitoneally (i.p.). In addition, the positive control group was treated with the substance vehicle described above. The substance was administered orally 16 hours before induction of inflammation by administration of LPS. To examine the effect of the present compounds on the inflammation, blood samples were taken from the animals after 1.5 hours. The concentration of particular cytokines in the plasma was determined using the Mouse ProInflammatory 7-Plex Tissue Culture Kit (MSD, Cat. No. K15012B) in accordance with the manufacturer's instructions. IRAK4 inhibitors are effective in the TLR-mediated inflammation model. FIG. 3 shows the amount of TNF-α in the plasma, which is reduced in a dose-dependent manner by administration of Example Compound 11 in comparison with the LPS-induced concentration.

In Vivo Model of IL-1β-Mediated Inflammation

Figure 4:
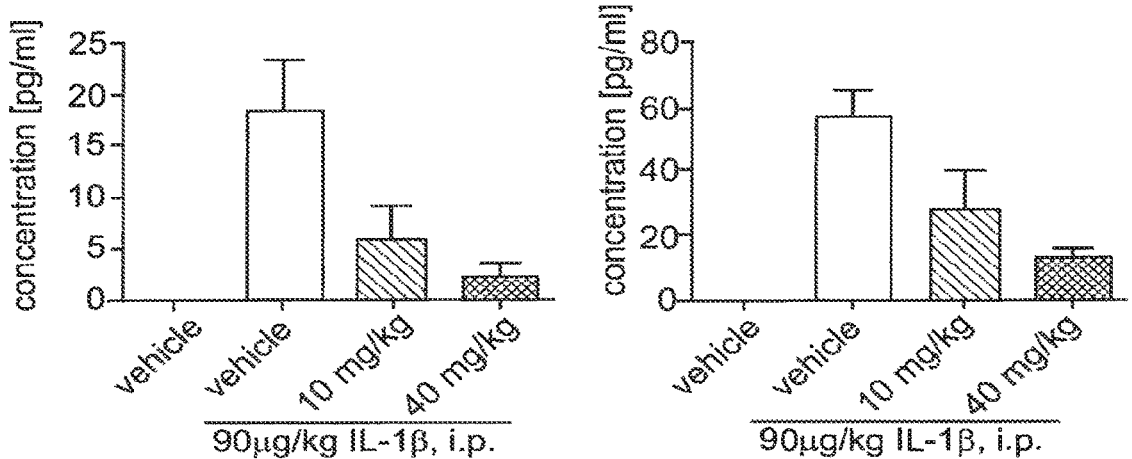

To evaluate the potential efficacy of the present compounds of the general formula (I) in IL-1β-mediated disorders, IL-1β was administered i.p. to female Balb/c mice (about 8 weeks old, Charles River Laboratories, Germany) and the effect of the present compounds on IL-1β-mediated cytokine secretion was examined. There were 5 animals in each group. The control group was treated with the vehicles used for dissolving the substance and the IL-1β. The substance treatment groups and the positive control group were each administered 90 µg IL-1β/kg body weight i.p. (R&D, Cat. No. 401-ML/CF). The substance or its vehicle in the positive control group was administered 6 hours before the administration of IL-1β. 2 hours after administration of the IL-1β, TNF-α was determined in the plasma isolated from the blood using the Mouse ProInflammatory 7-Plex Tissue Culture Kit (MSD, Cat. No. K15012B) in accordance with the manufacturer's instructions. Administration of IL-1β led to an elevated TNF-α plasma concentration which was inhibited by treatment with Example Compounds 11 and 12. This is illustrated by FIG. 4.

In Vivo Adjuvant-Induced Arthritis Model

To determine the anti-inflammatory activity of the present compounds of the general formula (I), they were examined for their in vivo efficacy in an arthritis model. For this purpose, male Lewis rats (about 100-125 g, Charles River Laboratories, Germany) were each administered 100 µl of a complete Freund's adjuvant (CFA) solution (*M. tuberculosis* H37Ra [Difo Lab, Cat. No. -231141] dissolved in Incomplete Freund's adjuvant [Difco Lab, Cat. No. -263910]) into the tailhead subcutaneously on day 0. There were n=8 rats in each group. Both a healthy control group and a disease control group were included in the study. Each control group was given p.o. treatment only with the vehicle of the test substance. The treatment with different dosages of the test substance was conducted in a preventative manner, i.e. starting from day 0, by oral administration. On day 0, the starting condition of the animals was additionally determined in terms of the disease activity scores (rating of the severity of arthritis based on a points system). Here, points were awarded according to the extent of joint inflammation from 0 to 4 for the presence of an erythema including joint swelling (0=none; 1=slight; 2=moderate; 3=distinct; 4=severe) for both hind paws and added up. To determine the anti-inflammatory efficacy of the compounds, the disease activity of the animals was scored by means of disease activity scoring starting from day 8, when the animals first exhibit signs of arthritis, and subsequently 3 times per week, until the end (day 20). Statistical analysis was performed using single-factor variance analysis (ANOVA) and by comparison with the control group by means of multiple comparative analysis (Dunnett's test).

Figure 5:
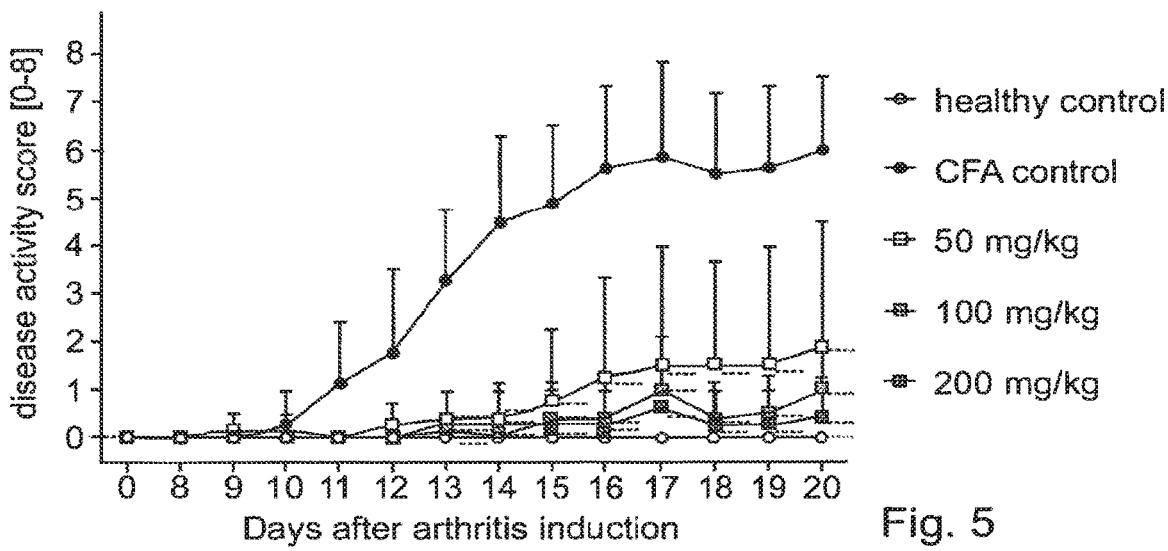

The s.c. administration of CFA in rats leads to acute arthritis with distinct joint inflammation in rats. This induced arthritis was inhibited by the treatment with Example Compound 11. This is illustrated by FIG. 5.

In Vivo Collagen Antibody-Induced Arthritis Model in Mice

The anti-inflammatory effect of the present compounds of the general formula (I) was examined in a further murine arthritis model. For this purpose, female Balb/c mice (about 9 weeks old, Charles River Laboratories, Kingston, Canada) were each injected intravenously on day 0 with 200 µl of a collagen antibody cocktail (10 mg/ml; ArthritoMab, MD Bioproducts) into the tail vein (except for the healthy control group included in the study). On day 6, these mice then each received a further intraperitoneal injection of 200 µl of LPS. There were n=10 mice in each group. Both a healthy control group and a disease control group were included in the study. Each control group was given p.o. treatment only with the vehicle of the test substance. The treatment with different dosages of the test substance was conducted in a preventative manner, i.e. starting from day 0, by oral administration. Over the course of the experiment, the extent of disease was scored on the basis of a point award system for the disease activity score on all four paws. In this awarding of points, no points are awarded for a healthy paw, whereas points from 1 [mild inflammation, for example, of the toe(s)] to 4 [severe inflammation extending over the entire paw] are awarded in each case for the particular extent of joint inflammation that has arisen from the toes through the metatarsal joint to the ankle joint, as explained as follows:

0=normal
1=erythema and mild swelling limited to the tarsal or ankle or toes
2=erythema and mild swelling extending from the ankle to the metatarsus (2 segments)
3=erythema and moderate swelling extending from the ankle as far as the metatarsal joints
4=erythema and severe swelling encompassing the metatarsus, foot and toes For this parameter, the starting condition was determined beforehand one day before the start of the experiment (day −1) and this disease activity score was subsequently scored three times per week from day 8 onwards. Statistical analysis was performed using single-factor variance analysis (ANOVA) and by comparison with the control group by means of multiple comparative analysis (Dunnett's test).

Figure 6:
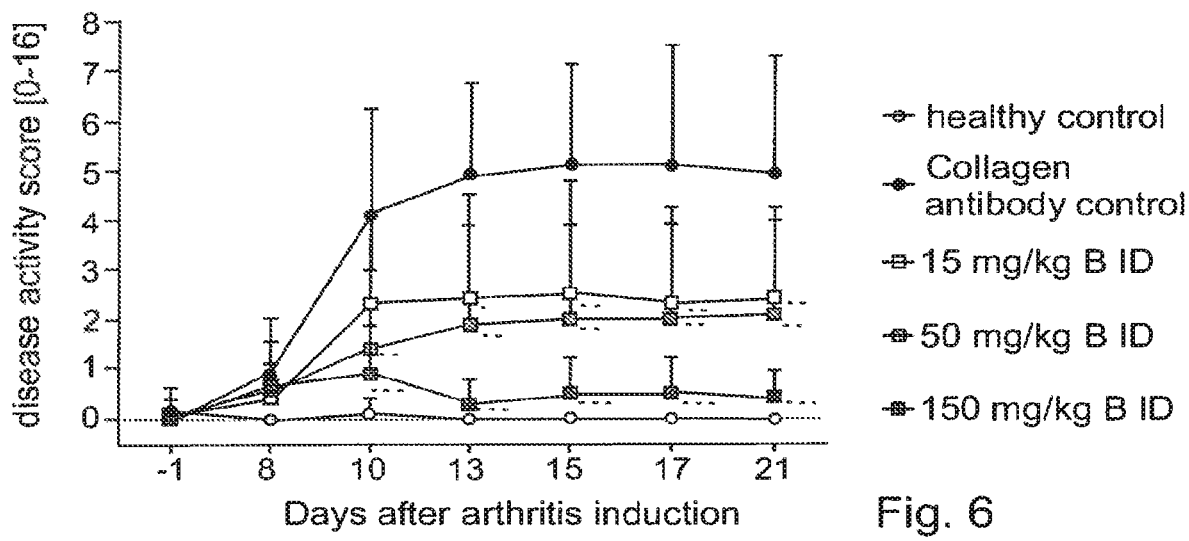

The i.v. administration of a collagen antibody cocktail including the subsequent i.p. administration of LPS in mice leads to acute arthritis with distinct joint inflammation. This induced arthritis was inhibited by the treatment with Example Compound 12. This is illustrated by FIG. 6.

In Vivo NASH Mouse Model

To experimentally induce NASH, 200 µg streptozotocin (STZ; Sigma-Aldrich, USA) is each injected subcutaneously in 45 male 2-day-old C57BL/6 mice. Starting at 4 weeks of age, these animals are fed ad libitum with a high-fat diet (HFD; 57 kcal % fat, #HFD32 from CLEA, Japan). At an age of 6 weeks, the animals are randomized into 3 groups (15 animals per group). While one of the groups does not receive any treatment, the other 2 groups are daily orally treated either with vehicle or the test substance over 4 weeks. After the 4-week treatment, all animals are sacrificed painlessly under anaesthesia, and the livers are removed and fixed for the histological study in Bouin's solution (H. Denk, "Fixierung histologischer Praparate" [Fixing of Histological Preparations], in: P. Böck (ed.): "Romeis Mikroskopische Technik" [Romei's Microscopy Techniques], Urban & Schwarzenberg, Munich-Vienna-Baltimore 1989, 17th edition, page 97, ISBN 3-541-11227-1). Thereafter, the liver samples are embedded in paraffin and 5 µm-thick paraffin sections are produced. Histological sections of each liver are stained a) for the determination of the NAFLD activity score (NAS) with haematoxylin-eosin (HC), and b) for the determination of liver fibrosis with Picro-Sirius red (Waldeck, Germany). The NAFLD activity score is determined in the haematoxylin-eosin sections on the basis of the criteria recommended by D. E. Kleiner et al., Hepatology 41 (2005), 1313-1321 (Table 1). For the histological quantification of fibrotic areas, 5 digital photos (DFC280; Leica, Germany) are taken for each section under 200-fold microscope enlargement and the percentage of fibrosis is determined using the ImageJ Software (National Institute of Health, USA).

In Vivo db/db Mouse Model 30 male 8-week-old db/db mice are used. This model is a well accepted model for obesity, insulin resistance and type 2 diabetes (Aileen J F King; The use of animal models in diabetes research; British Journal of Pharmacology 166 (2012), 877-894). During the experiment, the animals receive a standard diet (RM1(E) 801492, SDS) and tap water ad libitum. The animals are randomized into 3 groups (10 animals per group) and treated orally with the test substance over 6 weeks. During the study period, blood is taken from the animals at different time points (before start of treatment, 3 weeks after start of treatment and 2 days before the end of treatment) to determine insulin sensitivity parameters (e.g. HbA1c, glucose content, insulin content). In addition, an OGTT (oral glucose tolerance test) as a parameter for determination of insulin sensitivity is conducted 1 day before start of treatment and 2 days after the end of treatment. In addition, the HOMA-IR index (fasting insulin level (mU/l)*fasting glucose level (mmol/l)/22.5) is calculated.

In Vivo B-Cell Lymphoma-Associated Xenotransplantation Model

The anti-tumour activity of the present compounds of the general formula (I) is studied in murine xenotransplantation models. For this purpose, female C.B-17 SCID mice are implanted subcutaneously with human B-cell lymphoma cell lines, e.g. TMD-8. At a mean tumour size of 20-30 mm$^2$, oral monotherapeutic treatment is started with an present compound or by administration of an present compound in combination with a standard therapy, each administered orally. However, the animals are randomized beforehand. The treatment is ended as soon as the untreated control group has large tumours. The tumour size and body weight are determined three times per week. Decreases in body weight are a measure of treatment-related toxicity (>10%=critical, stoppage in treatment until recovery, >20%=toxic, termination). The tumour area is detected by an electronic caliper gauge [length (mm)×width (mm)]. At the end of the study, the tumour weight is also determined. The anti-tumour efficacy defines the ratio of tumour weight of treatment vs. control (T/C) [tumour weight of the treatment group on day x/tumour weight of the control group on day x] or the ratio of the tumour area of treatment vs. control [tumour area of the treatment group on day x/tumour area of the control group on day x]. A compound having a T/C greater than 0.5 is defined as active (effective). Statistical analysis is preformed using single-factor ANOVA and by comparison with the control group by means of pair-by-pair comparative analysis (Dunnett's test).

Canine IRAK4 Kinase Assay

The IRAK4-inhibitory activity of the present compounds on canine IRAK4 was measured in the Irak4 TR-FRET assay (TR-FRET=Time Resolved Fluorescence Resonance Energy Transfer) described hereinafter.

Recombinant fusion protein from N-terminal HIS (Polyhistidine) and canine Irak4, expressed in baculovirus-infected insect cells (Hi5, BTI-TN-5B1-4, cell line purchased from Invitrogen, catalogue No. B855-02) and purified via affinity chromatography, was used as enzyme. The substrate used for the kinase reaction was the biotinylated peptide biotin-Ahx-KKARFSRFAGSSPSQASFAEPG (SEQ ID NO: 1) (C-terminus in amide form) which can be purchased, for example, from Biosyntan GmbH (Berlin-Buch).

For the assay, 11 different concentrations in the range from 20 µM to 0.073 nM were prepared from a 2 mM solution of the test substance in DMSO. 50 nl of the respective solution were pipetted into a black low-volume 384-well microtitre plate (Greiner Bio-One, Frickenhausen, Germany), 2 µl of a solution of Irak4 in assay buffer [50 mM HEPES pH 7.5, 5 mM MgCl2, 1.0 mM dithiothreitol, 30 µM activated sodium orthovanadate, 0.1% (w/v) of bovine gamma-globulin (BGG) 0.04% (v/v) nonidet-P40 (Sigma)] were added and the mixture was incubated for 15 min to allow prebinding of the substances to the enzyme prior to the kinase reaction. The kinase reaction was then started by addition of 3 µl of a solution of adenosine triphosphate (ATP, 1.67 mM=final concentration in 5 µl of assay volume: 1 mM) and peptide substrate (0.83 µM=final concentration in 5 µl assay volume: 0.5 µM) in assay buffer, and the resulting mixture was incubated at 22° C. for the reaction time of 45 min. The concentration of the Irak4 was adjusted to the respective activity of the enzyme and set such that the assay was carried out in the linear range. Typical concentrations were in the order of about 0.1 nM. The reaction was stopped by addition of 5 µl of a solution of TR-FRET detection reagents [0.1 µM streptavidin-XL665 (Cisbio Bioassays; France, catalogue No. 610SAXLG)] and 1.5 nM anti-phosphoserine antibody [Merck Millipore, "STK Antibody", catalogue No. 35-002] and 0.6 nM LANCE EU-W1024-labelled anti-mouse-IgG antibody (Perkin-Elmer, product No. AD0077; alternatively, it is possible to use a terbium cryptate-labelled anti-mouse-IgG antibody from Cisbio Bioassays) in aqueous EDTA solution (100 mM EDTA, 0.4% [w/v] bovine serum albumin [BSA] in 25 mM HEPES pH 7.5).

The resulting mixture was incubated at 22° C. for 1 h to allow formation of a complex of the biotinylated phosphorylated substrate and the detection reagents. The amount of the phosphorylated substrate was then evaluated by measuring the resonance energy transfer from europium chelate-labelled anti-mouse-IgG antibody to streptavidin-XL665. To this end, the fluorescence emissions at 620 nm and 665 nm were measured after excitation at 350 nm in a TR-FRET measuring instrument, for example a Rubystar (BMG Labtechnologies, Offenburg, Germany) or a Viewlux (Perkin-Elmer). The ratio of the emissions at 665 nm and 622 nm was taken as a measure of the amount of phosphorylated substrate. The data were normalized (enzyme reaction without test substance=0% inhibition; all other assay components but no enzyme=100% inhibition). Typically, the test substances were tested on the same microtitre plates at 11 different concentrations in the range from 20 µM to 0.073 nM (20 µM, 5.7 µM, 1.6 µM, 0.47 µM, 0.13 µM, 38 nM, 11 nM, 3.1 nM, 0.89 nM, 0.25 nM and 0.073 nM). The dilution series were prepared prior to the assay (2 mM to 7.3 nM in 100% DMSO) by serial dilutions. The $IC_{50}$ values were calculated by a 4-parameter fit.

TABLE 3

IC$_{50}$-values from two experiments of example compounds in the IRAK4 canine kinase assay

| Example Compound | IC$_{50}$ [nM] |
| --- | --- |
| 11 | 1.48 |
|  | 1.86 |
| 12 | 8.99 |
|  | 9.34 |
| 13 | 1.75 |
|  | 2.68 |
| 19 | 8.46 |
|  | 6.75 |

In Vitro Lipopolysaccharide (LPS)-Induced Cytokine Production by Canine Peripheral Blood Mononuclear Cells (PBMCs)

The effect of the present compounds of the general formula (I) on induced cytokine production in canine PBMCs was examined. Cytokine production was induced here by LPS, a TLR4 ligand, which leads to activation of the IRAK4-mediated signal path.

The canine PBMCs were obtained from anti-coagulated dog whole blood. For this purpose, canine leucocyte rich plasma was prepared from 15 ml dog blood by centrifugation at 400 g for 15 min at 4° C., followed by harvest and then suspension of the canine PBMC buffy coat in plasma. Seven (7) ml Ficoll-Paque Plus (Fischer Scientific, Cat. No. 11778538) were pipetted in a centrifugation tube and 7 ml canine leucocyte rich plasma then layered on top of the Ficoll-Paque Plus. After centrifugation of the tube at 400 g for 20 min at 4° C., canine PBMCs were harvested from the interface of the canine plasma and Ficoll-Paque Plus. PBMCs were transferred into a fresh centrifugation tube and made up with Hanks' Balanced Salt Solution 1×(HBSS) without $Ca^{2+}/Mg^{2+}$ (Sigma-Aldrich, Cat. No. H9394). The cell suspension was centrifuged at 400 g for 5 min at 4° C. and the supernatant was discarded. The cell pellet was then re-suspended in 0.2% hypotonic saline to lyse any remaining red blood cells. After 30 seconds the cell suspension was made isotonic and centrifuged at 400 g for 5 min at 4° C. The cell pellet was then re-suspended in HBSS without $Ca^{2+}/Mg^{2+}$ for a final wash and centrifuged at 400 g for 5 min at 4° C. The PBMCs were then re-suspended in complete medium (RPMI 1640 with GlutaMAX (Sigma-Aldrich, Cat. No. R0883), 10% FCS; 50 U/ml penicillin, 50 µg/ml streptomycin (Sigma-Aldrich, Cat. No. P4333)).

The assay was also carried out in complete medium. The PBMCs were seeded in 96-well plates at a cell density of 2.5×10$^5$ cells/well. The present compounds were dissolved in DMSO and subjected to serial dilution in complete medium. The compound examples were used in the assay at 8 different concentrations in the range from 3 nM to 10 µM such that the final DMSO concentration was 0.0003-0.4%. To induce cytokine secretion, the cells were stimulated with 0.1 µg/ml LPS (Sigma-Aldrich, *Escherichia coli* 0111:B4, Cat. No. L3024) for 24 hours. Cell viability was determined using 0.2% trypan blue (Sigma-Aldrich, Cat. No. T8154). The amount of secreted TNF-α in the cell culture supernatant was determined using canine TNFα DuoSet Elisa (R&D Systems, Cat. No. DY1507) in accordance with the instructions of the manufacturer. By way of example, Example Compound 12 inhibited the production of TNFα by canine PBMCs stimulated with LPS. This is illustrated by FIG. 7.

In Vitro Lipopolysaccharide (LPS)-Induced Cytokine Production by Bovine Peripheral Blood Mononuclear Cells (PBMCs)

The effect of the present compounds of the general formula (I) on induced cytokine production in bovine PBMCs was examined. Cytokine production was induced here by LPS, a TLR4 ligand, which leads to activation of the IRAK4-mediated signal path.

The bovine PBMCs were obtained from anti-coagulated cattle whole blood. For this purpose, bovine leucocyte rich plasma was prepared from 500 ml cattle blood by centrifugation at 1000 g for 20 min at room temperature (RT), followed by harvest and then suspension of the bovine PBMC buffy coat in equal volume of PBS/5 mM EDTA (RT). Thirty (30) ml Ficoll-Paque Plus (Fischer Scientific, Cat. No. 11778538) were pipetted in a Leucosep tube and 30 ml bovine PBMC buffy coat/PBS/EDTA mixture then layered on top of the Ficoll-Paque Plus. After centrifugation of the tube at 800 g for 25 min at RT, bovine PBMCs were harvested from the interface of the bovine plasma and Ficoll-Paque Plus. PBMCs were transferred into a fresh centrifugation tube and made up with cold PBS/5 mM EDTA. The cell suspension was centrifuged at 350 g for 10 min at 4° C. and the supernatant was discarded. The cell pellet was then re-suspended in 0.2% hypotonic saline to lyse any remaining red blood cells. After 30 seconds the cell suspension was made isotonic and centrifuged at 500 g for 5 min at 4° C. The PBMC cell pellet was then resuspended in complete medium (DMEM with GlutaMAX (ThermoFisher, Cat. No. 32430100), 10% horse serum (ATCC® 30-2040™), 20 μM β-mercaptoethanol (ThermoFisher Cat. No. 31350010 [stock solution: 50 mM]). The assay was also carried out in complete medium. The PBMCs were seeded in 24-well plates at a cell density of $1\times10^6$ cells/well. The present compounds were dissolved in DMSO and subjected to serial dilution in complete medium. The compound examples were used in the assay at 8 different concentrations in the range from 0.003 μM to 10 M such that the final DMSO concentration was 0.5%. To induce cytokine secretion, the cells were stimulated with 1 μg/ml (FIG. 8) and 0.1 μg/ml LPS (FIG. 9) (LPS from *E. coli* K12; Invivogen #tlr1-eklps) for 24 hours. Cell viability was determined using Turk solution (Merck Millipore #1092770100).

The amount of secreted TNFα in the cell culture supernatant of LPS-exposed bovine PBMCs was determined using a rabbit anti-bovine TNFα antibody based ELISA read-out. The ELISA assay was performed in 384 well ELISA plates, which were coated with 5 μg/ml rabbit anti-bovine TNFα antibody (BioRad, AHP2383) in 50 mM $Na_2CO_3$/$NaHCO_3$ pH 9.6 buffer in 10 μl/well overnight at 4° C. After removal of antibody and rinsing of wells for three times with 50 μl of wash buffer (PBS, 0.05% (v/v) Tween 20), the wells were incubated for 90 min at 37° C. with 40 μl blocking buffer (PBS, 0.05% (v/v) Tween 20, 1% (w/v) bovine serum albumin). Thereafter, blocking buffer was removed and culture supernatant samples were added (20 μl/well). After an incubation for 90 min at 37° C., the samples were removed and the wells were rinsed for three times with 50 μl wash buffer. A 1 μg/ml rabbit anti-bovine TNFα-biotin conjugated antibody (BioRad, AHP2383B) in blocking buffer was added to the plates (20 μl/well) which were incubated for 60 min at 37° C. After removal of the biotinylated antibody and rinsing of the wells with 50 μl wash buffer for three times, 20 μl/well of ExtrAvidin™-alkaline phosphatase (Sigma, E2636), 1:10.000 diluted in blocking buffer, was added for 1 h at 37° C. After removal of ExtrAvidin™-alkaline phosphatase and rinsing of the wells with 50 μl wash buffer for three times, the enzymatic reaction/colour development was initiated by adding 50 μl/well of development buffer (5 mM para-nitrophenyl phosphate (pNPP) in 50 mM $Na_2CO_3$/$NaHCO_3$ pH 9.6, 2 mM $MgCl_2$). Optical density was recorded at 405 nm wavelength. For kinetic measurements data points were recorded every 5 minutes for 1 hour, endpoint measurements were taken after 2 hours. By way of example, Example Compound 12 inhibited the production of TNFα by bovine PBMCs stimulated with LPS. This is illustrated by FIGS. 8 and 9.

In Vitro Lipopolysaccharide (LPS)-Induced Cytokine Production by Porcine Peripheral Blood Mononuclear Cells (PBMCs)

As a further example, the effect of the present compounds of the general formula (I) on induced cytokine production in porcine PBMCs was examined. Cytokine production was induced here by LPS, a TLR4 ligand, which leads to activation of the IRAK4-mediated signal path.

The porcine PBMCs were obtained from anti-coagulated porcine whole blood. For this purpose, porcine leucocyte rich plasma was prepared from 36 ml pig blood by centrifugation at 1000 g for 20 min at room temperature (RT), followed by harvest and then suspension of the porcine PBMC buffy coat in equal volume of PBS/5 mM EDTA (RT). Thirty (30) ml Ficoll-Paque Plus (Fischer Scientific, Cat. No. 11778538) were pipetted in a Leucosep tube and 30 ml bovine PBMC buffy coat/PBS/EDTA mixture then layered on top of the Ficoll-Paque Plus. After centrifugation of the tube at 800 g for 25 min at RT, porcine PBMCs were harvested from the interface of the porcine plasma and Ficoll-Paque Plus. PBMCs were transferred into a fresh centrifugation tube and made up with cold PBS/5 mM EDTA. The cell suspension was centrifuged at 350 g for 10 min at 4° C. and the supernatant was discarded. The cell pellet was then re-suspended in 0.2% hypotonic saline to lyse any remaining red blood cells. After 30 seconds the cell suspension was made isotonic and centrifuged at 500 g for 5 min at 4° C. The PBMC cell pellet was then resuspended in complete medium (DMEM with GlutaMAX (ThermoFisher, Cat. No. 32430100), 10% horse serum (ATCC® 30-2040™), 20 μM β-mercaptoethanol (ThermoFisher Cat. No. 31350010 [stock solution: 50 mM]). The assay was also carried out in complete medium. The PBMCs were seeded in 24-well plates at a cell density of $1\times10^6$ cells/well. The present compounds were dissolved in DMSO and subjected to serial dilution in complete medium. The compound examples were used in the assay at 8 different concentrations in the range from 0.003 μM to 10 μM such that the final DMSO concentration was 0.5%. To induce cytokine secretion, the cells were stimulated with LPS (LPS from *E. coli* K12; Invivogen #tlr1-eklps) in a concentration range of 0.01 to 1 ng/ml for 24 hours. Cell viability was determined using TUrk solution (Merck Millipore #1092770100).

The amount of secreted TNFα in the cell culture supernatant of LPS-exposed porcine PBMCs was determined using a rabbit anti-porcine TNFα antibody based ELISA read-out. The ELISA assay was performed in 384 well ELISA plates, which were coated with 3 μg/ml rabbit anti-porcine TNFα antibody (BioRad, AHP2397) in 50 mM $Na_2CO_3$/$NaHCO_3$ pH 9.6 buffer in 10 μl/well for 48 h at 4° C. After removal of antibody and rinsing of wells for three times with 50 μl of wash buffer (PBS, 0.05% (v/v) Tween 20), the wells were incubated for 60 min at 37° C. with 50 μl blocking buffer (PBS, 0.05% (v/v) Tween 20, 1% (w/v) bovine serum albumin). Thereafter, blocking buffer was removed and culture supernatant samples were added (20 μl/well). After an incubation for 90 min at 37° C., the samples were removed and the wells were rinsed for three times with 50 μl wash buffer. A 0.25 μg/ml rabbit anti-porcine TNFα-biotin conjugated antibody (BioRad, AHP2397B) in blocking buffer was added to the plates (20 μl/well) which were incubated for 60 min at 37° C. After removal of the biotinylated antibody and rinsing of the wells with 50 μl wash buffer for three times, 20 μl/well of ExtrAvidin™-alkaline phosphatase (Sigma, E2636), 1:10.000 diluted in blocking buffer, was added for 1 h at 37° C. After removal of ExtrAvidin™-alkaline phosphatase and rinsing of the wells with 50 μl wash buffer for three times, the enzymatic reaction/colour development was initiated by adding 90 μl/well of development buffer (5 mM paranitrophenyl phosphate (pNPP) in 50 mM $Na_2CO_3$/$NaHCO_3$ pH 9.6, 2 mM $MgCl_2$). Optical density was recorded at 405 nm wavelength. For kinetic measurements data points were recorded every 5 minutes for 1 hour, endpoint measurements were taken after 2 hours. By way of example, at 10 μM Example Compound 12 inhibited the production of TNFα by bovine PBMCs stimulated with 0.1 ng/ml LPS. This is illustrated by FIG. 10.

In Vivo Model of House Dust Mite Induced Canine Allergic Dermatitis

To evaluate the potential anti-allergic/anti-inflammatory efficacy of the present compounds of the general formula (I) a model of house dust mites (HDM)-sensitized Beagle dogs was used. Therein, HDM-sensitization consisted of a series of subcutaneous injections of HDM antigen (10 μg, Greer Laboratories, Lenoir, NC, USA) and Alhydrogel® (0.2 mL, InvivoGen, San Diego, CA 921221, USA) as adjuvant in time intervals of approximately two weeks. The sensitization process was monitored and confirmed by intradermal skin testing. Once the dogs were positive to HDM skin intradermal testing, one month apart from the last sensitization, HDM antigen (135 μg) was topically applied and pricked into the skin (with 2 mm long micro needles) of the adult beagle dogs in the inner part of the posterior legs and the effect of the present compounds on signs of allergic dermatitis, e.g. erythema and edema, was examined. There were 2 groups of 4 animals each: 1 placebo control group and 1 group treated with Example Compound 12. The control group was orally treated with gelatin capsules containing micro cellulose while the group treated with Example Compound 12 was orally treated with gelatin capsules containing Example Compound 12 and micro cellulose. The administration of Example Compound 12 or the placebo started 5 days before the challenge with HDM antigen and continued until 2 days after the challenge. The treatment frequency was once daily, with a dose of 10 mg/kg body weight in the case of Example Compound 12. Starting 30 min after challenge and at different time points for 48 h, erythema and edema were evaluated using VAS (Visual Analogue Scale) in the 2 groups. Plasma samples were analyzed to determine exposure to the compound in relationship to the clinical evaluations. Edema and erythema were significantly reduced after treatment with Example Compound 12. This is illustrated by Tables 4 and 5, and by FIGS. 11 and 12.

TABLE 4

Erythema (in VAS units) after treatment with Example Compound 12 versus placebo

| Time post challenge [hours] | Placebo Control [VAS units] | Example Compound 12 [VAS units] |
|---|---|---|
| 0 | 0.0 | 0.0 |
| 0.5 | 5.7 | 2.2 |
| 1 | 5.8 | 1.2 |
| 4 | 5.1 | 0.7 |
| 6 | 4.7 | 0.8 |
| 24 | 3.9 | 0.5 |
| 48 | 1.4 | 0.2 |

TABLE 5

Edema (in VAS units) after treatment with Example Compound 12 versus placebo

| Time post challenge [hours] | Placebo Control [VAS units] | Example Compound 12 [VAS units] |
|---|---|---|
| 0 | 0.0 | 0.0 |
| 0.5 | 6.7 | 3.8 |
| 1 | 5.0 | 1.9 |
| 4 | 0.8 | 0.3 |
| 6 | 0.9 | 0.1 |
| 24 | 0.6 | 0.2 |
| 48 | 0.1 | 0.0 |

In Vivo Pruritic Model of Flea Allergy Dermatitis

To evaluate the potential anti-pruritic effect of the present compounds of the general formula (I) a model of Flea Allergy Dermatitis (FAD) was used. Only adult dogs with a history of FAD were enrolled in the study. The in-life phase of the study consisted of two phases: a Pruritus Induction Phase (2 weeks) followed by a Treatment Phase (2 weeks). Dogs were infested with *Ctenocephalides* fleas (first challenge with 100 fleas/dog, all subsequent challenges with 30 fleas/dog) twice weekly during both study phases. There were 2 groups of 12 animals each: 1 placebo control group and 1 group treated with Example Compound 12. The control group was orally treated with gelatin capsules containing micro cellulose while the group treated with Example Compound 12 was orally treated with gelatin capsules containing Example Compound 12 and micro cellulose. The treatment frequency was once daily, with a dose of 20 mg/kg body weight in the case of Example Compound 12. Starting 1 day after treatment and at every third day, dogs were recorded for 4 hours and time spent in pruritic behavior was determined as seconds spent in scratching, licking, biting. Plasma samples were analyzed to determine exposure to the compound in relationship to the clinical evaluations. Pruritus was substantially reduced after 10 days of treatment with Example Compound 12. This is illustrated by Table 6 and FIG. 13.

TABLE 6

Reduction of puritic behavior compared to baseline after treatment with Example Compound 12 versus placebo (shown as percent-change from baseline at the listed day after treatment)

| | Day 4 | Day 7 | Day 10 | Day 13 |
|---|---|---|---|---|
| Placebo Control | −12.0% | −9.9% | 1.7% | −20.0% |
| Example Compound 12 | −26.7% | 5.7% | −57.7% | −48.0% |

FIG. 1: Inhibition of IL-23 in human monocyte-generated DCs for Example Compound 12. Data are shown as mean values with standard deviations.

Figure 2A:
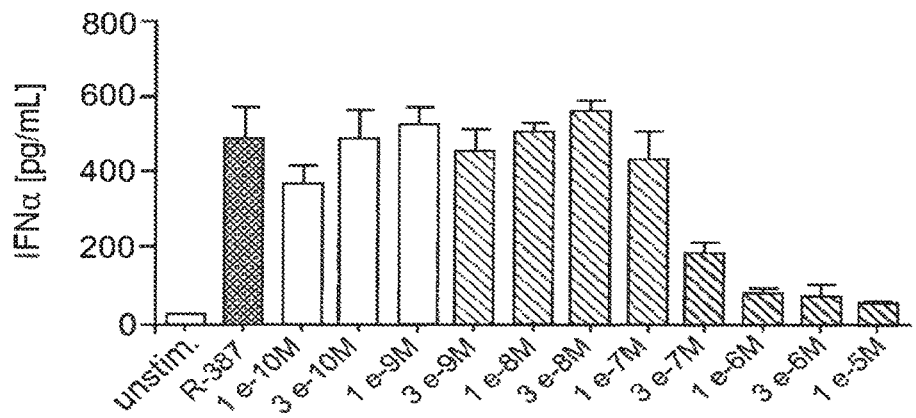
Figure 2B:
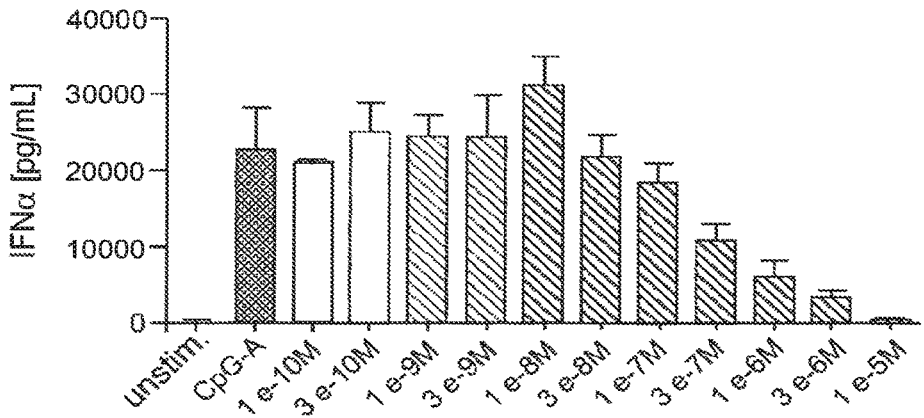

FIGS. 2A and 2B: Inhibition of INF-α in (FIG. 2A) imiquimod (R837)- or (FIG. 2B) CpG-A-stimulated human plasmacytoid DCs for Example Compound 12. Data are shown as mean values with standard deviations.

FIG. 3: Treatment of an LPS-induced inflammation with Example Compound 11 leads to a reduced amount of secreted TNF-α. Data are shown as mean values with standard deviations.

FIG. 4: Treatment of an IL-1β-induced inflammation with Example Compounds 11 (left) and 12 (right) leads to a dose-dependent reduction in the amount of secreted TNF-α. Data are shown as mean values with standard deviations.

FIG. 5: Anti-inflammatory effects of Example Compound 11 in an animal model of rheumatoid arthritis (adjuvant-induced rat model). Significant and dose-dependent inhibition of rheumatic joint inflammation measured on the basis of the disease activity score. The data corresponds to the mean values+standard deviations. Single-factor ANOVA variance analysis with subsequent multiple comparative analysis with the CFA control group by means of Dunnett's test; *p<0.05; p<0.01;*p<0.001; ****p<0.0001.

FIG. 6: Anti-inflammatory effects of Example Compound 12 in an animal model of rheumatoid arthritis (collagen antibody-induced mouse model). Significant and dose-dependent inhibition of rheumatic joint inflammation measured on the basis of the disease activity score. The data corresponds to the mean values+standard deviations. The statistical significances between collagen antibody (AK) control and the treatment groups were calculated by means of single-factor ANOVA variance analysis with subsequent multiple comparative analysis (Dunnett's test) (*p<0.05; p<0.01;*p<0.001; ****p<0.0001).

FIG. 7: Inhibition of LPS-induced TNFα production by canine PBMCs for Example Compound 12. Data are shown as mean values with standard deviations.

FIG. 8: Dose-dependent inhibition by Example Compound 12 of TNFα production by bovine PBMCs induced by 1 μg/ml LPS (kinetic measurement). Data show the mean values with standard deviations of biological triplicates each measured in duplicate. The IC50 value determined from this curve is 120 nM.

FIG. 9: Dose-dependent inhibition by Example Compound 12 of TNFα production by bovine PBMCs induced by 0.1 μg/ml LPS (kinetic measurement). Data show the mean values with standard deviations of biological triplicates each measured in duplicate. The IC50 value determined from this curve is 70.5 nM.

FIG. 10: Inhibition by 10 μM of Example Compound 12 of TNFα production by porcine PBMCs induced by 0.1 ng/ml LPS (kinetic measurement). Data show the mean values with standard deviations of biological triplicates each measured in duplicate.

FIG. 11: Treatment of a House Dust Mite induced Canine Allergic Dermatitis model with Example Compound 12 leads to reduction of erythema (a). Data are shown as mean values with standard deviations.

FIG. 12: Treatment of a House Dust Mite induced Canine Allergic Dermatitis model with Example Compound 12 leads to reduction of edema (b). Data are shown as mean values with standard deviations.

FIG. 13: Anti-pruritic effect of Example Compound 12 in an animal model of Flea Allergy Dermatitis. The data is expressed as Percent Change from Baseline corresponding to median values.

The invention claimed is:

1. A method for the treatment, and/or prophylaxis of allergic diseases in a dog, comprising administering to the dog a compound of the general formula (I)

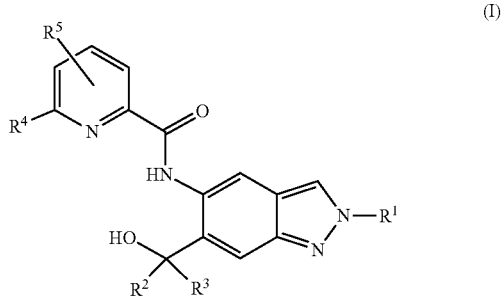

wherein $R^1$ is $C_1$-$C_6$-alkyl, wherein the $C_1$-$C_6$-alkyl group is unsubstituted or mono- or polysubstituted identically or differently by halogen, hydroxyl, an unsubstituted or mono- or poly-halogen-substituted $C_3$-$C_6$-cycloalkyl, or an $R^6$, $R^7SO_2$, $R^7SO$ or $R^8O$ group, or a group selected from:

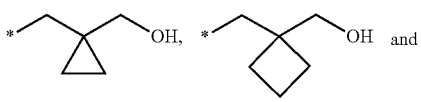

-continued

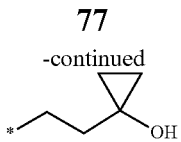

wherein * represents the bonding site of the group to the rest of the molecule;
$R^2$ and $R^3$ always have the same definition and are either hydrogen or $C_1$-$C_6$-alkyl;
$R^4$ is halogen, cyano, an unsubstituted or a singly or multiply, identically or differently substituted $C_1$-$C_6$-alkyl or an unsubstituted or a singly or multiply, identically or differently substituted $C_3$-$C_6$-cycloalkyl, and the substituents are selected from the group of halogen and hydroxyl;
$R^5$ is hydrogen, halogen or an unsubstituted or mono- or poly-halogen-substituted $C_1$-$C_6$-alkyl;
$R^6$ is an unsubstituted or mono- or di-methyl-substituted monocyclic saturated heterocycle having 4 to 6 ring atoms, which contains a heteroatom or a heterogroup from the group of O, S, SO and $SO_2$;
$R^7$ is $C_1$-$C_6$-alkyl, wherein the $C_1$-$C_6$-alkyl group is unsubstituted or mono- or polysubstituted identically or differently by halogen, hydroxyl or $C_3$-$C_6$-cycloalkyl; or $R^7$ is $C_3$-$C_6$-cycloalkyl;
$R^8$ is $C_1$-$C_6$-alkyl, wherein the $C_1$-$C_6$-alkyl group is unsubstituted or mono- or polysubstituted identically or differently by halogen;
or a diastereomer, an enantiomer, a metabolite, a salt, a solvate, a solvate of the salt thereof.

2. The method of claim 1, wherein
$R^1$ is $C_1$-$C_6$-alkyl, wherein the $C_1$-$C_6$-alkyl group is unsubstituted or mono- or polysubstituted identically or differently by fluorine, hydroxyl or an $R^6$, $R^7SO_2$, $R^7SO$ or $R^8O$ group;
$R^2$ and $R^3$ always have the same definition and are either hydrogen or $C_1$-$C_3$-alkyl;
$R^4$ is halogen, cyano or $C_1$-$C_3$-alkyl, wherein the $C_1$-$C_3$-alkyl group is unsubstituted or mono- or polysubstituted identically or differently by halogen or hydroxyl;
$R^5$ is hydrogen, fluorine, chlorine or $C_1$-$C_3$-alkyl;
$R^6$ is oxetanyl or tetrahydrofuranyl;
$R^7$ is $C_1$-$C_4$-alkyl, wherein the $C_1$-$C_4$-alkyl group is unsubstituted or monosubstituted by hydroxyl or by cyclopropyl or substituted by three fluorine atoms; and
$R^8$ is an unsubstituted $C_1$-$C_4$-alkyl group or a tri-fluorine-substituted $C_1$-$C_4$-alkyl group.

3. The method of claim 2, wherein
$R^1$ is $C_2$-$C_6$-alkyl, wherein the $C_2$-$C_6$-alkyl group is unsubstituted, or the $C_2$-$C_6$-alkyl group is mono-, di- or tri-fluorine-substituted or the $C_2$-$C_6$-alkyl group is monosubstituted by hydroxyl, $R^6$, $R^7SO_2$, or $R^8O$, or $R^1$ is an oxetanyl-substituted $C_1$-$C_3$-alkyl group;
$R^2$ and $R^3$ always have the same definition and are either hydrogen or methyl;
$R^4$ is an unsubstituted or mono- or poly-halogen-substituted $C_1$-$C_3$-alkyl group or a $C_1$-$C_3$-alkyl group substituted by one hydroxyl group or a $C_1$-$C_3$-alkyl group substituted by one hydroxyl group and three fluorine atoms;
$R^5$ is hydrogen, fluorine or $C_1$-$C_3$-alkyl;
$R^7$ is $C_1$-$C_3$-alkyl; and
$R^8$ is $C_1$-$C_4$-alkyl, wherein the $C_1$-$C_4$-alkyl group is unsubstituted or mono-, di- or tri-fluorine-substituted.

4. The method of claim 3, wherein
$R^1$ is a $C_2$-$C_5$-alkyl group substituted by hydroxyl or $C_1$-$C_3$-alkoxy or trifluoromethoxy or 2,2,2-trifluoroethoxy or trifluoromethyl or is a methyl-$SO_2$-substituted $C_2$-$C_4$-alkyl group or is an oxetan-3-yl-substituted $C_1$-$C_2$-alkyl group;
$R^2$ and $R^3$ always have the same definition and are hydrogen or methyl;
$R^4$ is methyl, ethyl, trifluoro-$C_1$-$C_3$-alkyl, difluoro-$C_1$-$C_3$-alkyl, hydroxymethyl, 1-hydroxyethyl, 2-hydroxypropan-2-yl and 2,2,2-trifluoro-1-hydroxyethyl; and
$R^5$ is hydrogen, fluorine or methyl.

5. The method of claim 4, wherein
$R^1$ is 4,4,4-trifluorobutyl, 3-hydroxy-3-methylbutyl, 3-hydroxybutyl, 3-methoxypropyl, 3-hydroxypropyl, 3-hydroxy-2-methylpropyl, 3-hydroxy-2,2-dimethylpropyl, 3-trifluoromethoxypropyl, 2-methoxyethyl, 2-hydroxyethyl, 2-(methylsulphonyl)ethyl or 3-(methylsulphonyl) propyl;
$R^2$ and $R^3$ are methyl or hydrogen;
$R^4$ is difluoromethyl, trifluoromethyl or methyl; and
$R^5$ is hydrogen or fluorine.

6. The method of claim 5, wherein
$R^1$ is 3-hydroxy-3-methylbutyl, 3-hydroxybutyl, 3-hydroxy-2-methylpropyl, 3-hydroxy-2,2-dimethylpropyl, 3-(methylsulphonyl) propyl or 2-(methylsulphonyl) ethyl;
$R^2$ and $R^3$ are methyl;
$R^4$ is difluoromethyl or trifluoromethyl; and
$R^5$ is hydrogen.

7. The method of claim 5, wherein
$R^1$ is 3-hydroxy-3-methylbutyl, 3-hydroxybutyl, 3-hydroxy-2-methylpropyl, 3-hydroxy-2,2-dimethylpropyl, 3-(methylsulphonyl) propyl or 2-(methylsulphonyl) ethyl;
$R^2$ and $R^3$ are methyl;
$R^4$ is methyl; and
$R^5$ is fluorine, wherein $R^5$ is in the ortho position to $R^4$.

8. The method of claim 1, wherein $R^4$ is difluoromethyl, trifluoromethyl or methyl.

9. The method of claim 1, wherein $R^5$ is hydrogen or fluorine.

10. The method of claim 1, wherein $R^2$ and $R^3$ are either hydrogen or methyl.

11. The method of claim 1, wherein the compound is selected from the group consisting of:
1) N-[6-(2-Hydroxypropan-2-yl)-2-(2-methoxyethyl)-2H-indazol-5-yl]-6-(trifluoromethyl)pyridine-2-carboxamide;
2) N-[6-(Hydroxymethyl)-2-(2-methoxyethyl)-2H-indazol-5-yl]-6-(trifluoromethyl)pyridine-2-carboxamide;
3) N-[6-(2-Hydroxypropan-2-yl)-2-(3-methoxypropyl)-2H-indazol-5-yl]-6-(trifluoromethyl)pyridine-2-carboxamide;
4) N-[6-(Hydroxymethyl)-2-(3-methoxypropyl)-2H-indazol-5-yl]-6-(trifluoromethyl)pyridine-2-carboxamide;
5) N-[2-(2-Hydroxyethyl)-6-(2-hydroxypropan-2-yl)-2H-indazol-5-yl]-6-(trifluoromethyl)pyridine-2-carboxamide;
6) N-[6-(2-Hydroxypropan-2-yl)-2-(3-hydroxypropyl)-2H-indazol-5-yl]-6-(trifluoromethyl)pyridine-2-carboxamide;
7) N-[2-(2-Hydroxyethyl)-6-(hydroxymethyl)-2H-indazol-5-yl]-6-(trifluoromethyl)pyridine-2-carboxamide;
8) N-[6-(2-Hydroxypropan-2-yl)-2-(oxetan-3-ylmethyl)-2H-indazol-5-yl]-6-(trifluoromethyl)pyridine-2-carboxamide;

9) N-[6-(Hydroxymethyl)-2-(oxetan-3-ylmethyl)-2H-indazol-5-yl]-6-(trifluoromethyl)pyridine-2-carboxamide;
10) N-{6-(2-Hydroxypropan-2-yl)-2-[3-(methylsulphonyl)propyl]-2H-indazol-5-yl}-6-(trifluoromethyl)pyridine-2-carboxamide;
11) N-[2-(3-Hydroxy-3-methylbutyl)-6-(2-hydroxypropan-2-yl)-2H-indazol-5-yl]-6-(trifluoromethyl)pyridine-2-carboxamide;
12) N-{6-(2-Hydroxypropan-2-yl)-2-[2-(methylsulphonyl)ethyl]-2H-indazol-5-yl}-6-(trifluoromethyl)pyridine-2-carboxamide;
13) 6-(Difluoromethyl)-N-[2-(3-hydroxy-3-methylbutyl)-6-(2-hydroxypropan-2-yl)-2H-indazol-5-yl]pyridine-2-carboxamide;
14) 6-(Difluoromethyl)-N-{6-(2-hydroxypropan-2-yl)-2-[2-(methylsulphonyl)ethyl]-2H-indazol-5-yl}pyridine-2-carboxamide;
15) 6-(Difluoromethyl)-N-[6-(2-hydroxypropan-2-yl)-2-(3-hydroxypropyl)-2H-indazol-5-yl]pyridine-2-carboxamide;
16) N-[6-(2-Hydroxypropan-2-yl)-2-(4,4,4-trifluorobutyl)-2H-indazol-5-yl]-6-(trifluoromethyl)pyridine-2-carboxamide;
17) N-{6-(2-Hydroxypropan-2-yl)-2-[3-(trifluoromethoxy)propyl]-2H-indazol-5-yl}-6-(trifluoromethyl)pyridine-2-carboxamide;
18) N-{6-(2-Hydroxypropan-2-yl)-2-[3-(2,2,2-trifluoroethoxy)propyl]-2H-indazol-5-yl}-6-(trifluoromethyl)pyridine-2-carboxamide;
19) 5-Fluoro-N-[2-(3-hydroxy-3-methylbutyl)-6-(2-hydroxypropan-2-yl)-2H-indazol-5-yl]-6-methylpyridine-2-carboxamide;
20) N-[2-(3-Hydroxy-3-methylbutyl)-6-(2-hydroxypropan-2-yl)-2H-indazol-5-yl]-6-methylpyridine-2-carboxamide;
21) 6-(2-Hydroxypropan-2-yl)-N-[6-(2-hydroxypropan-2-yl)-2-(4,4,4-trifluorobutyl)-2H-indazol-5-yl]pyridine-2-carboxamide; and
22) N-{2-[2-(1-Hydroxycyclopropyl)ethyl]-6-(2-hydroxypropan-2-yl)-2H-indazol-5-yl}-6-(trifluoromethyl)pyridine-2-carboxamide; or
a diastereomer, an enantiomer, a metabolite, a salt, a solvate, and a solvate of the salt thereof.

12. The method of claim 1, wherein the allergic disease is allergic dermatitis, atopic dermatitis, or Flea Allergy Dermatitis.

13. A method for the treatment of allergic disease in a dog, the method comprising orally administering to the dog an effective amount of compound 12,

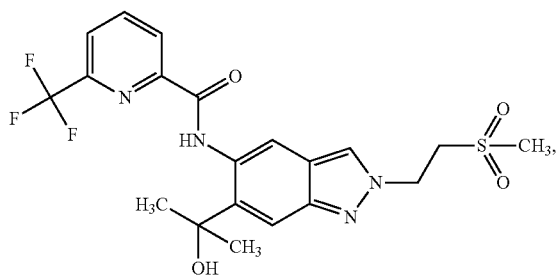 [SMILES: CC(C)(O)c1cc2nn(CCS(C)(=O)=O)cc2cc1NC(=O)c1cccc(C(F)(F)F)n1]

or a salt, a solvate, a solvate of the salt thereof, wherein the allergic disease is allergic dermatitis, atopic dermatitis, flea allergy dermatitis, or pruritus associated with allergic disease.

14. The method of claim 1, wherein the allergic disease is Canine Atopic Dermatitis.

15. The method of claim 1, wherein the allergic disease is Flea Allergy Dermatitis.

16. A method for the treatment and/or prophylaxis of allergic diseases in a dog, wherein the method comprises administering to the dog, a pharmaceutical composition comprising the compound of claim 1 and an inert, non-toxic, pharmaceutically suitable excipient.

17. The method of claim 16, wherein the disease is allergic dermatitis, atopic dermatitis, or Flea Allergy Dermatitis.

18. The method of claim 17, wherein disease is Canine Atopic Dermatitis.

19. The method of claim 17, wherein the allergic disease is Flea Allergy Dermatitis.

20. The method of claim 1, wherein an effective amount of the compound is administered to a dog in need thereof.

21. A method for the treatment, and/or prophylaxis of symptoms of allergic diseases in a dog comprising administering to the dog a compound of the general formula (III)

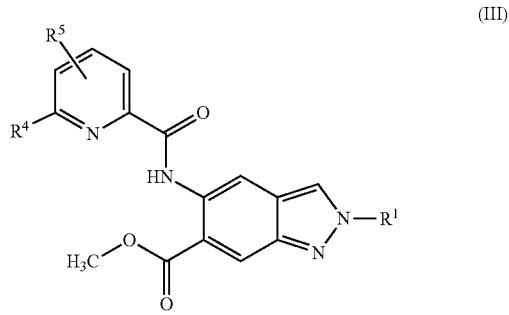

wherein
$R^1$ is 4,4,4-trifluorobutyl, 3-hydroxy-3-methylbutyl, 3-methoxypropyl, 3-hydroxypropyl, 3-hydroxybutyl, 3-hydroxy-2-methylpropyl, 3-hydroxy-2,2-dimethylpropyl, 3-trifluoromethoxypropyl, 2-methoxyethyl, 2-hydroxyethyl, 2-(methylsulphonyl)ethyl, 3-(methylsulphonyl) propyl or 2-(1-hydroxycyclopropyl)ethyl;
$R^4$ is difluoromethyl, trifluoromethyl or methyl; and
$R^5$ is hydrogen or fluorine;
or a diastereomer, an enantiomer, a metabolite, a salt, a solvate or a solvate of the salt thereof.

22. The method of claim 21, wherein the compound is selected from the group consisting of:
methyl 5-{[(5-fluoro-6-methylpyridin-2-yl) carbonyl] amino}-2-(3-hydroxy-3-methylbutyl)-2H-indazole-6-carboxylate, and
methyl 2-(3-hydroxy-3-methylbutyl)-5-({[6-(trifluoromethyl) pyridin-2-yl]carbonyl}amino)-2H-indazole-6-carboxylate.

* * * * *

```
                       SEQUENCE LISTING

<160> NUMBER OF SEQ ID NOS: 1

<210> SEQ ID NO 1
<211> LENGTH: 22
<212> TYPE: PRT
<213> ORGANISM: Artificial Sequence
<220> FEATURE:
<223> OTHER INFORMATION: Synthetic
<220> FEATURE:
<221> NAME/KEY: N-terminus linked to biotin-Ahx
<222> LOCATION: (1)..(1)
<220> FEATURE:
<221> NAME/KEY: C-terminus in amide form
<222> LOCATION: (22)..(22)

<400> SEQUENCE: 1

Lys Lys Ala Arg Phe Ser Arg Phe Ala Gly Ser Ser Pro Ser Gln Ala
1               5                   10                  15

Ser Phe Ala Glu Pro Gly
            20
```